US012671824B2

(12) United States Patent
Itsumi et al.

(10) Patent No.: US 12,671,824 B2
(45) Date of Patent: Jun. 30, 2026

(54) REGION IMPORTANCE ESTIMATION

(71) Applicant: NEC Corporation, Tokyo (JP)

(72) Inventors: Hayato Itsumi, Tokyo (JP); Koichi Nihei, Tokyo (JP); Florian Beye, Tokyo (JP); Charvi Vitthal, Tokyo (JP); Takanori Iwai, Tokyo (JP); Yusuke Shinohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 18/277,723

(22) PCT Filed: Feb. 14, 2022

(86) PCT No.: PCT/JP2022/005530
§ 371 (c)(1),
(2) Date: Aug. 17, 2023

(87) PCT Pub. No.: WO2022/181367
PCT Pub. Date: Sep. 1, 2022

(65) Prior Publication Data
US 2024/0135560 A1    Apr. 25, 2024
US 2024/0236317 A9    Jul. 11, 2024

(30) Foreign Application Priority Data

Feb. 24, 2021    (WO) .................. PCT/JP2021/006866

(51) Int. Cl.
*H04N 19/167*    (2014.01)
*G06T 7/10*    (2017.01)
(Continued)

(52) U.S. Cl.
CPC ............. *H04N 19/167* (2014.11); *G06T 7/10* (2017.01); *G06T 7/50* (2017.01); *G06V 10/25* (2022.01);
(Continued)

(58) Field of Classification Search
CPC .. H04N 19/167; H04N 19/119; H04N 19/124; H04N 19/127; H04N 19/17;
(Continued)

(56) References Cited

U.S. PATENT DOCUMENTS

| 11,048,973 B1 | 6/2021 | Ramanathan et al. |
| 2011/0216977 A1 | 9/2011 | Yu et al. |

(Continued)

FOREIGN PATENT DOCUMENTS

| CN | 102819023 A | 12/2012 |
| CN | 112231516 A | 1/2021 |

(Continued)

OTHER PUBLICATIONS

Li, Mu, et al. "Learning Convolutional Networks for Content-Weighted Image Compression." 2018 IEEE/CVF Conference on Computer Vision and Pattern Recognition. IEEE, 2018. (Year: 2018).*

(Continued)

*Primary Examiner* — Geoffrey E Summers
(74) *Attorney, Agent, or Firm* — .Sughrue Mion, PLLC

(57) ABSTRACT

To provide a technique which makes it possible to suitably estimate an important region and a non-important region in an image, an information processing apparatus includes: an obtaining means for obtaining input data which includes at least one of image data and point cloud data; an estimating means for estimating levels of importance with respect to a respective plurality of regions which are included in a frame indicated by the input data; a replacing means for generating replaced data by replacing at least one of the plurality of regions, which are included in the input data, with alternative data in accordance with the levels of importance; an evaluating means for deriving an evaluation value by refer- (Continued)

ring to the replaced data; and a training means for training the estimating means with reference to the evaluation value.

17 Claims, 31 Drawing Sheets

(51) Int. Cl.

| | |
|---|---|
| *G06T 7/50* | (2017.01) |
| *G06V 10/25* | (2022.01) |
| *G06V 10/82* | (2022.01) |
| *G06V 20/56* | (2022.01) |
| *G06V 20/70* | (2022.01) |
| *H04N 19/119* | (2014.01) |
| *H04N 19/124* | (2014.01) |
| *H04N 19/127* | (2014.01) |
| *H04N 19/17* | (2014.01) |

(52) U.S. Cl.
CPC .............. *G06V 10/82* (2022.01); *G06V 20/70* (2022.01); *H04N 19/119* (2014.11); *H04N 19/124* (2014.11); *H04N 19/127* (2014.11); *H04N 19/17* (2014.11); *G06T 2207/20081* (2013.01); *G06V 20/56* (2022.01)

(58) Field of Classification Search
CPC . G06T 2207/20081; G06T 2207/20084; G06T 7/10–13; G06T 7/50–596; G06T 2207/10028; G06T 2207/30252–30264; G06N 3/02–0985; G06V 10/82; G06V 10/454; G06V 20/70; G06V 20/56; G06V 10/25
See application file for complete search history.

(56) References Cited

U.S. PATENT DOCUMENTS

| | | | |
|---|---|---|---|
| 2013/0294699 A1 | 11/2013 | Yu et al. | |
| 2016/0057432 A1 | 2/2016 | Shibayama et al. | |
| 2016/0086342 A1 | 3/2016 | Yamaji | |
| 2016/0212405 A1 | 7/2016 | Zhang et al. | |
| 2019/0075302 A1 | 3/2019 | Huang et al. | |
| 2019/0198540 A1 | 6/2019 | Shibata et al. | |
| 2020/0174472 A1 | 6/2020 | Zhang et al. | |
| 2020/0298847 A1* | 9/2020 | Tawari | B60W 30/0953 |
| 2020/0326526 A1 | 10/2020 | Yeh | |
| 2020/0327350 A1* | 10/2020 | Anand | G06V 20/56 |
| 2021/0174482 A1 | 6/2021 | Ji et al. | |
| 2021/0368186 A1 | 11/2021 | Sugio et al. | |
| 2022/0019821 A1* | 1/2022 | Brickwedde | G06V 10/82 |
| 2022/0021887 A1* | 1/2022 | Banerjee | H04N 19/115 |
| 2022/0107497 A1 | 4/2022 | Murata et al. | |
| 2022/0277548 A1* | 9/2022 | Nakao | G06V 10/771 |
| 2023/0119685 A1* | 4/2023 | Kim | H04N 19/139 |
| | | | 382/103 |
| 2023/0300333 A1* | 9/2023 | Kubota | H04N 19/124 |
| | | | 375/240.03 |
| 2024/0155142 A1 | 5/2024 | Sugio et al. | |
| 2026/0039846 A1 | 2/2026 | Sugio et al. | |

FOREIGN PATENT DOCUMENTS

| | | |
|---|---|---|
| CN | 112257647 A | 1/2021 |
| JP | 2003-274393 A | 9/2003 |
| JP | 2012-103850 A | 5/2012 |
| JP | 2015-521820 A | 7/2015 |
| JP | 2016-046707 A | 4/2016 |
| JP | 2018-056838 A | 4/2018 |
| JP | 2019-083491 A | 5/2019 |
| JP | 2020-083309 A | 6/2020 |
| WO | 2010/032297 A1 | 3/2010 |
| WO | 2018/121690 A1 | 7/2018 |
| WO | 2019/128971 A1 | 7/2019 |
| WO | 2020/110580 A1 | 6/2020 |
| WO | 2020/162495 A1 | 8/2020 |

OTHER PUBLICATIONS

Ramachandran, Prajit, et al. "Stand-alone self-attention in vision models." Advances in neural information processing systems 32 (2019). (Year: 2019).*

Sallab, Ahmad EL, et al. "Deep reinforcement learning framework for autonomous driving." arXiv preprint arXiv:1704.02532v1 (2017). (Year: 2017).*

Ohn-Bar, Eshed, and Mohan M. Trivedi. "What makes an on-road object important?." 2016 23rd International Conference on Pattern Recognition (ICPR). IEEE, 2016. (Year: 2016).*

Rahimpour, Alireza, et al. "Context aware road-user importance estimation (iCARE)." 2019 IEEE Intelligent Vehicles Symposium (IV). IEEE, 2019. (Year: 2019).*

Sandri, Gustavo, et al. "Point cloud compression incorporating region of interest coding." 2019 IEEE International Conference on Image Processing (ICIP). IEEE, 2019. (Year: 2019).*

International Search Report for PCT Application No. PCT/JP2022/005530, mailed on Apr. 5, 2022.

Yusuke Shinohara et al., "Video Compression Estimating Recognition Accuracy for Remote Site Object Detection", 2020 International Wireless Communications and Mobile Computing (IWCMC), Jul. 27, 2020, pp. 285-290, <URL: https://ieeexplore.ieee.org/document/9148347>.

Tomonori Kubota et al., "A high-compression video coding method for video analysis using Deep Learning", IEICE Technical Report, May 11, 2020 (received date), pp. 121-126.

Takanori Nakao et al., "Moving image coding method for AI analysis", IPSJ Technical Report, Feb. 20, 2020 (received date), pp. 1-6, <URL: https://ipsj.ixsq.nii.ac.jp/ej/?action=repository_uri&item_id=203339&file_id=1&file_no=1>.

Leonardo Galteri et al., "Video Compression for Object Detection Algorithms", 2018 24th International Conference on Pattern Recognition (ICPR), Nov. 29, 2018, pp. 3007-3012, <URL: https://ieeexplore.ieee.org/document/8546064>.

International Search Report for PCT Application No. PCT/JP2021/006866, mailed on May 11, 2021.

US Office Action for U.S. Appl. No. 18/277,719, mailed on Mar. 4, 2026.

Wong et al., "Characterization of perceptual importance for object-based image segmentation," Proceedings 2000 international Conference on Image Processing (Cat. No.00CH37101), Vancouver, BC, Canada, 2000, pp. 54-57, vol. 3, doi: 10.1109/ICIP.2000.899287. (Year: 2000).

Shibata et al., "Unified Image Fusion Framework With Learning-Based Application-Adaptive Importance Measure," in IEEE Transactions on Computational Imaging, vol. 5, No. 1, pp. 82-96, Mar. 2019, doi: 10.1109/TC !.2018.2879021. (Year: 2019).

Pan et al., "Label and Sample: Efficient Training of Vehicle Object Detector from Sparsely Labeled Data," arXiv: 1808.08603, Aug. 26, 2018. (Year: 2018).

Jyothi et al., "Research study of neural networks for image categorization and retrieval," 2010 The 2nd international Conference on Computer and Automation Engineering (ICCAE), Singapore, 2010, pp. 686-690, doi: 10.1109/ICCAE.2010.5451728. (Year: 2010).

\* cited by examiner

FIG. 10

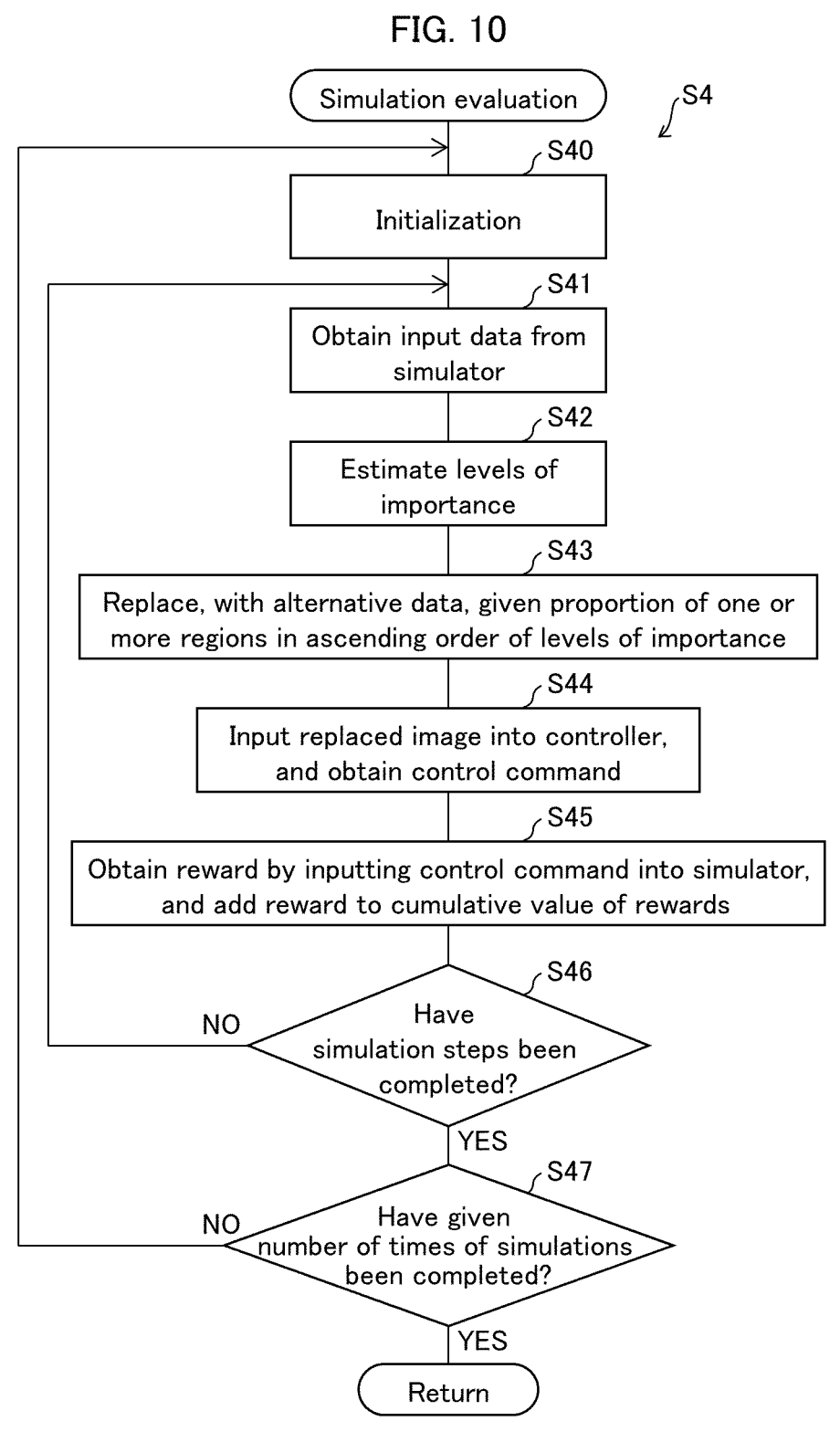

Simulation evaluation   S4

S40

Initialization

S41

Obtain input data from simulator

S42

Estimate levels of importance

S43

Replace, with alternative data, given proportion of one or more regions in ascending order of levels of importance

S44

Input replaced image into controller, and obtain control command

S45

Obtain reward by inputting control command into simulator, and add reward to cumulative value of rewards

S46

NO    Have simulation steps been completed?

YES

S47

NO    Have given number of times of simulations been completed?

YES

Return

FIG. 11

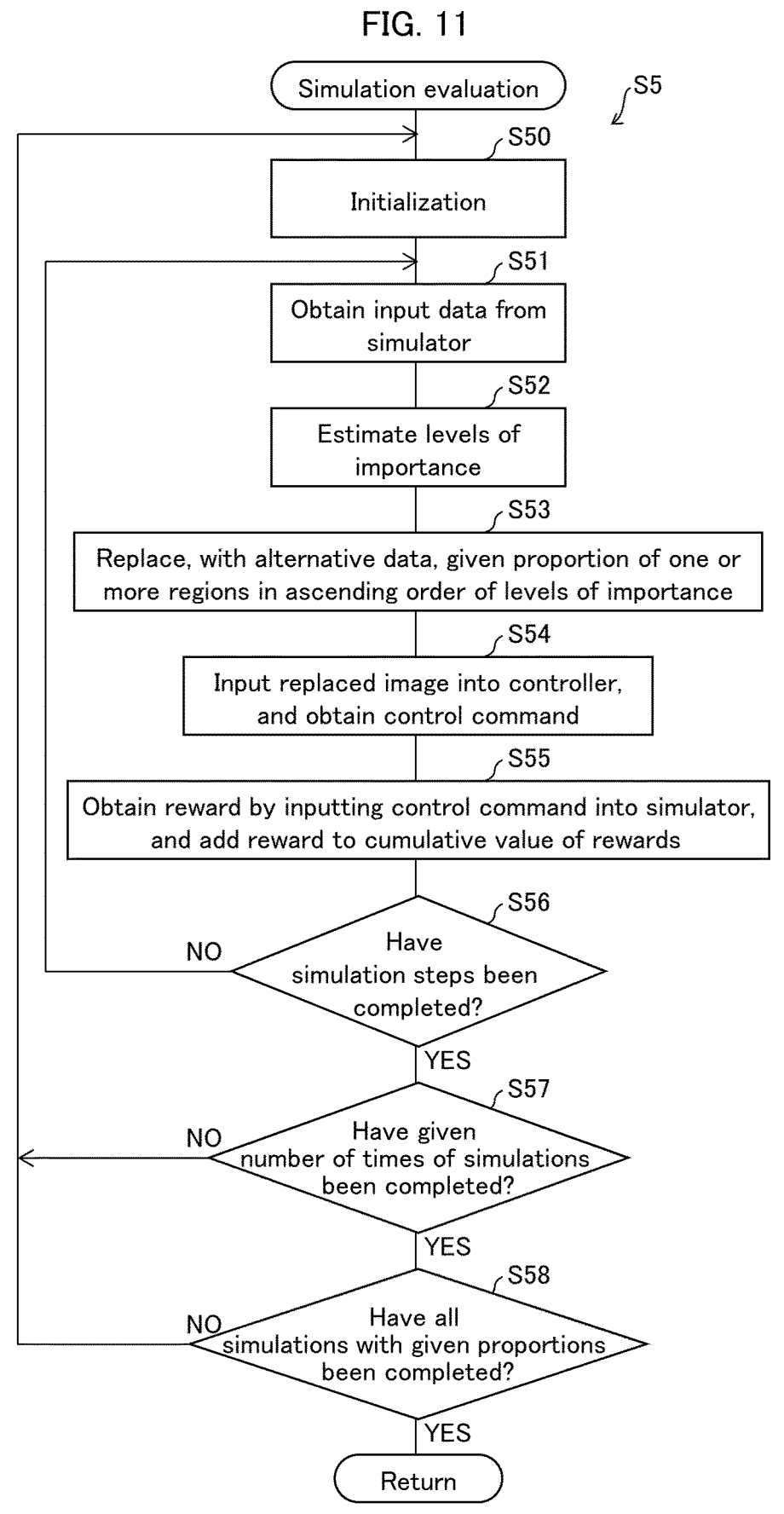

Simulation evaluation $\quad$ S5

S50

Initialization

S51

Obtain input data from simulator

S52

Estimate levels of importance

S53

Replace, with alternative data, given proportion of one or more regions in ascending order of levels of importance

S54

Input replaced image into controller, and obtain control command

S55

Obtain reward by inputting control command into simulator, and add reward to cumulative value of rewards

S56

Have simulation steps been completed?

NO

YES

S57

Have given number of times of simulations been completed?

NO

YES

S58

Have all simulations with given proportions been completed?

NO

YES

Return

S100b ( START )

S102b

Obtain image

S104b

Estimate levels of importance

S105b

Estimate quality parameters

S106b

Determine quality parameters

S108b

Encode image

S110b

Transmit encoded data ( END )

S200b ( START )

S202b

Receive encoded data

S204b

Decode encoded data

S206b

Display image ( END )

702

| | | | | | |
|---|---|---|---|---|---|
| 0.1 | 0.1 | 0.1 | 0.1 | 0.1 | 0.1 |
| 0.2 | 0.2 | 0.3 | 0.3 | 0.3 | 0.2 |
| 0.2 | 0.3 | 0.6 | 0.9 | 0.6 | 0.3 |
| 0.3 | 0.3 | 0.9 | 0.9 | 0.5 | 0.3 |

NIR

704

IR

| | | | | | |
|---|---|---|---|---|---|
| 40 | 40 | 40 | 40 | 40 | 40 |
| 30 | 30 | 30 | 30 | 30 | 30 |
| 20 | 20 | 20 | 10 | 10 | 20 |
| 20 | 20 | 30 | 30 | 20 | 20 |

706

S1060a

S1061a

Start of loop with respect to plurality of regions

S1062a

Is level of importance of target region equal to or higher than threshold?

NO

YES

S1063a

Determine quality parameter so that image quality of target region is reduced

End of loop with respect to plurality of regions   S1065a

FIG. 21B

| | | | | | |
|---|---|---|---|---|---|
| 50 | 50 | 50 | 50 | 50 | 50 |
| 40 | 40 | 40 | 40 | 40 | 40 |
| 30 | 30 | 20 | 10 | 10 | 30 |
| 30 | 30 | 30 | 30 | 20 | 30 |

NIR

Figure 27:
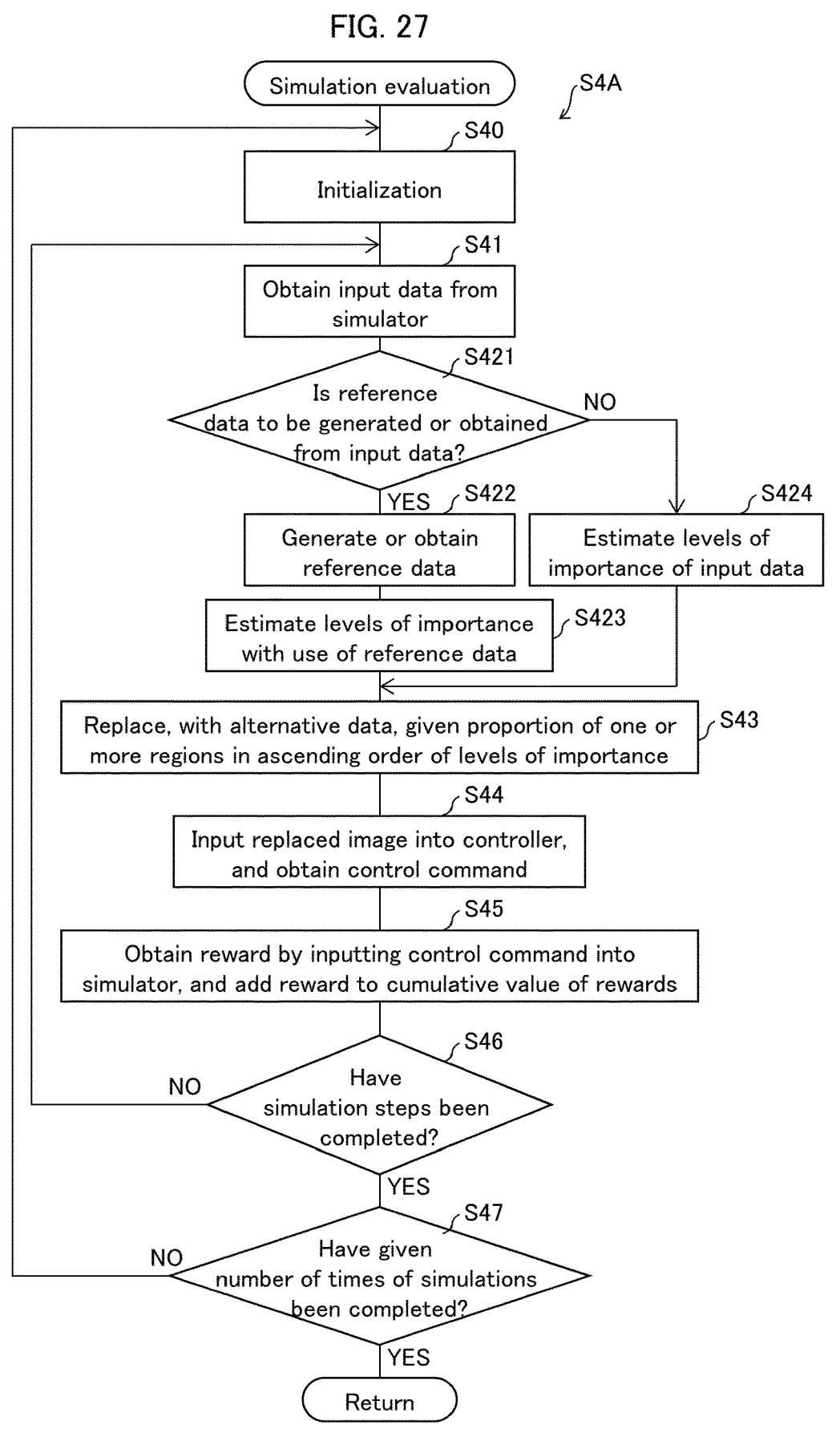

( Simulation evaluation )    S4A

S40

Initialization

S41

Obtain input data from simulator

S421

Is reference data to be generated or obtained from input data?    NO

YES    S422

Generate or obtain reference data

S424

Estimate levels of importance of input data

S423

Estimate levels of importance with use of reference data

S43

Replace, with alternative data, given proportion of one or more regions in ascending order of levels of importance

S44

Input replaced image into controller, and obtain control command

S45

Obtain reward by inputting control command into simulator, and add reward to cumulative value of rewards

S46

NO    Have simulation steps been completed?

YES

S47

NO    Have given number of times of simulations been completed?

YES ( Return )

FIG. 28

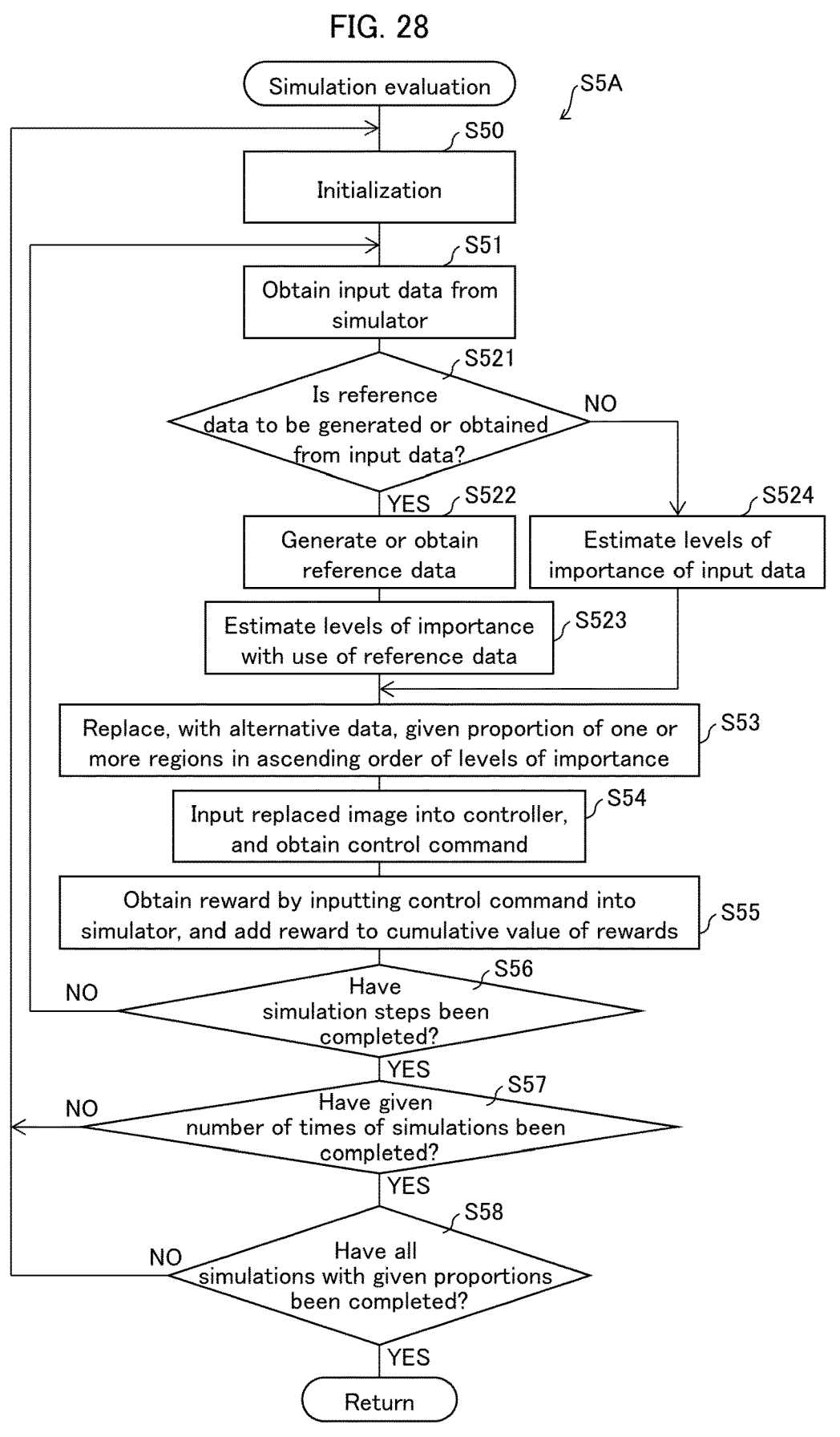

Simulation evaluation    S5A

S50

Initialization

S51

Obtain input data from simulator

S521

Is reference data to be generated or obtained from input data?    NO

YES    S522

Generate or obtain reference data

S524

Estimate levels of importance of input data

Estimate levels of importance with use of reference data    S523

Replace, with alternative data, given proportion of one or more regions in ascending order of levels of importance    S53

Input replaced image into controller, and obtain control command    S54

Obtain reward by inputting control command into simulator, and add reward to cumulative value of rewards    S55

S56

NO    Have simulation steps been completed?

YES    S57

NO    Have given number of times of simulations been completed?

YES    S58

NO    Have all simulations with given proportions been completed?

YES

Return

FIG. 29

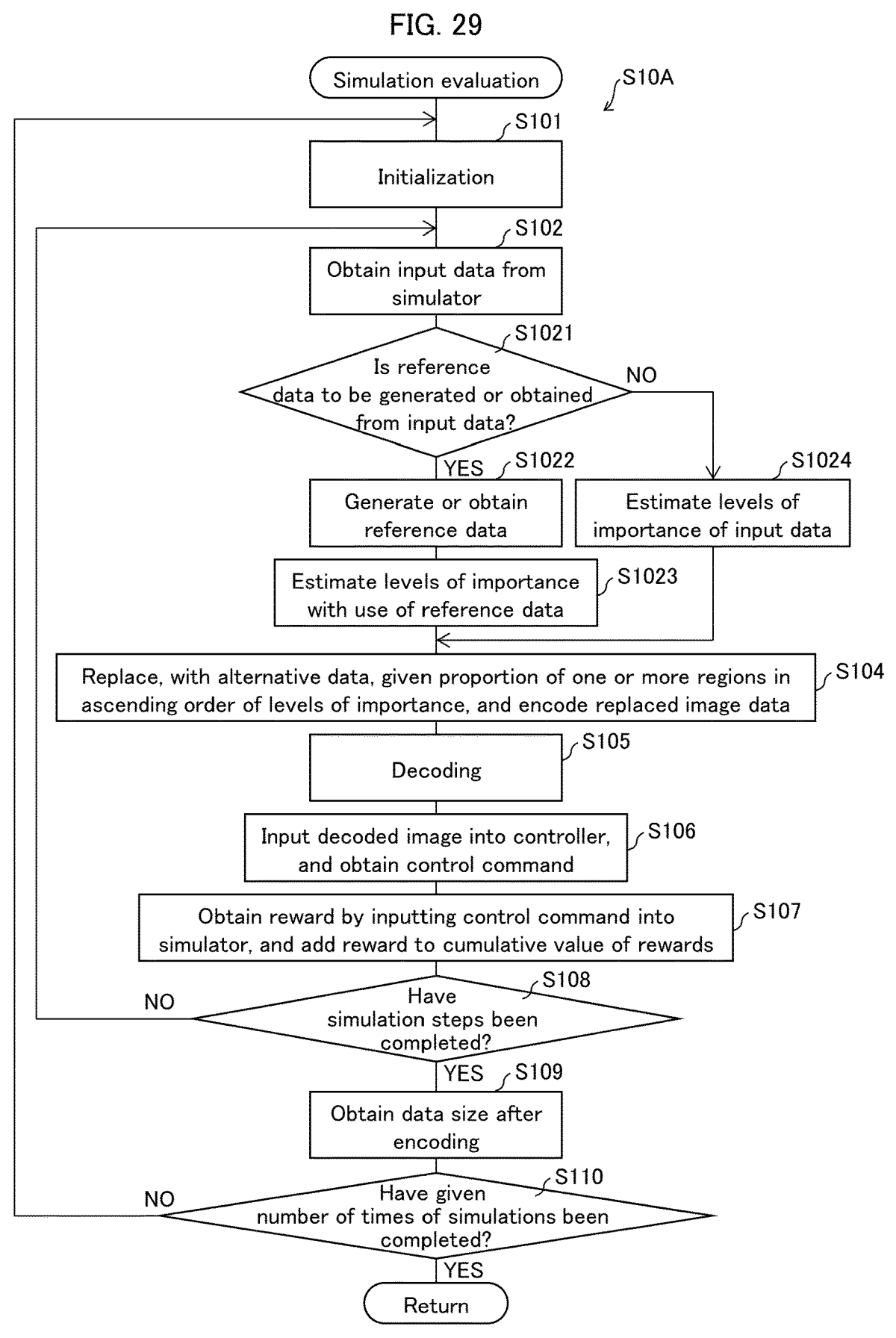

```
                    ( Simulation evaluation )        ⌐S10A
                              │
                              ▼                    ⌐S101
                    ┌──────────────────┐
                    │   Initialization  │
                    └──────────────────┘
                              │
                              ▼                    ⌐S102
                    ┌──────────────────┐
                    │ Obtain input data from│
                    │     simulator      │
                    └──────────────────┘
                              │
                              ▼                    ⌐S1021
                        Is reference
                  data to be generated or obtained ──── NO
                        from input data?
                              │ YES                         │
                              ▼  ⌐S1022                      ▼  ⌐S1024
                    ┌──────────────────┐        ┌──────────────────┐
                    │  Generate or obtain│        │  Estimate levels of│
                    │   reference data   │        │ importance of input data│
                    └──────────────────┘        └──────────────────┘
                              │
                              ▼  ⌐S1023
                    ┌──────────────────────┐
                    │ Estimate levels of importance│
                    │   with use of reference data │
                    └──────────────────────┘
                              │
                              ▼
  ┌────────────────────────────────────────────────────────────────┐ ⌐S104
  │ Replace, with alternative data, given proportion of one or more regions in│
  │ ascending order of levels of importance, and encode replaced image data│
  └────────────────────────────────────────────────────────────────┘
                              │
                              ▼  ⌐S105
                    ┌──────────────────┐
                    │      Decoding      │
                    └──────────────────┘
                              │
                              ▼  ⌐S106
                    ┌──────────────────────┐
                    │ Input decoded image into controller,│
                    │   and obtain control command │
                    └──────────────────────┘
                              │
                              ▼  ⌐S107
              ┌──────────────────────────────────────┐
              │ Obtain reward by inputting control command into│
              │ simulator, and add reward to cumulative value of rewards│
              └──────────────────────────────────────┘
                              │
                              ▼  ⌐S108
                 NO ────   Have
                      simulation steps been
                         completed?
                              │ YES  ⌐S109
                              ▼
                    ┌──────────────────┐
                    │ Obtain data size after│
                    │     encoding       │
                    └──────────────────┘
                              │
                              ▼  ⌐S110
                 NO ────   Have given
                      number of times of simulations been
                          completed?
                              │ YES
                              ▼
                         ( Return )
```

FIG. 31

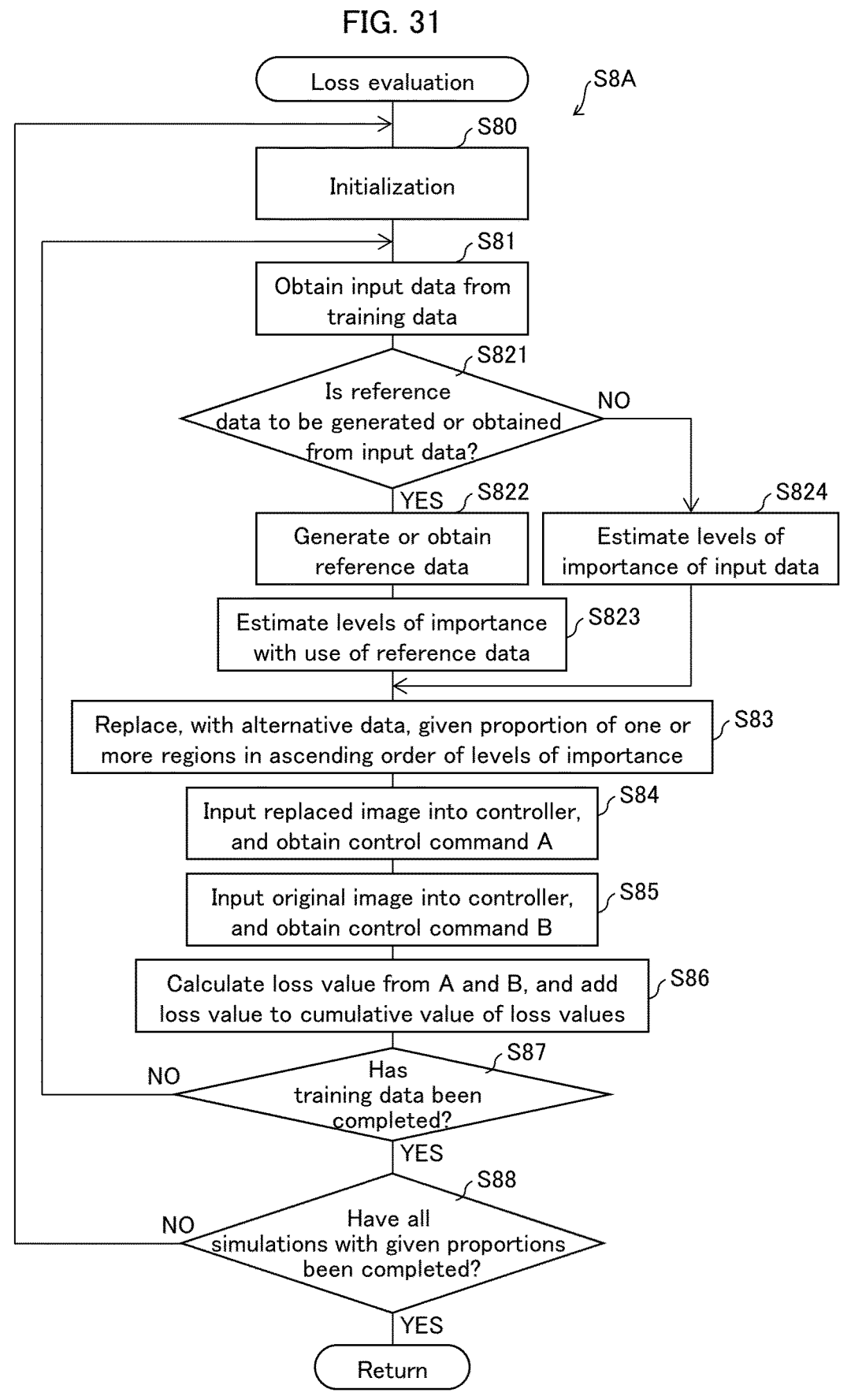

```
                    ( Loss evaluation )          ⌐S8A
                           │                     ⌐
                           ▼                  ⌐S80
        ┌──────────────────────────────┐
        │        Initialization        │
        └──────────────────────────────┘
                           │                  ⌐S81
        ┌──────────────────────────────┐
        │   Obtain input data from     │
        │        training data         │
        └──────────────────────────────┘
                           │              ⌐S821
                      ◇─────────────◇
            Is reference                    NO
    < data to be generated or obtained >─────────┐
           from input data?                       │
                      ◇─────────────◇             │
                  YES  ⌐S822                   ⌐S824
        ┌──────────────────────┐   ┌──────────────────────────┐
        │   Generate or obtain │   │     Estimate levels of   │
        │    reference data    │   │  importance of input data│
        └──────────────────────┘   └──────────────────────────┘
   ┌──────────────────────────────┐ ⌐S823       │
   │ Estimate levels of importance│             │
   │   with use of reference data │             │
   └──────────────────────────────┘             │
                           │◄────────────────────┘
   ┌──────────────────────────────────────────────────────┐ ⌐S83
   │ Replace, with alternative data, given proportion of one or│
   │ more regions in ascending order of levels of importance │
   └──────────────────────────────────────────────────────┘
            ┌──────────────────────────────────┐ ⌐S84
            │ Input replaced image into controller,│
            │   and obtain control command A   │
            └──────────────────────────────────┘
            ┌──────────────────────────────────┐ ⌐S85
            │ Input original image into controller,│
            │   and obtain control command B   │
            └──────────────────────────────────┘
        ┌──────────────────────────────────────────┐ ⌐S86
        │ Calculate loss value from A and B, and add│
        │ loss value to cumulative value of loss values│
        └──────────────────────────────────────────┘
                           │              ⌐S87
              NO      ◇─────────────◇
        ┌─────────<    training data been    >
        │            completed?
        │              ◇─────────────◇
        │                  YES
        │                   │          ⌐S88
        │    NO        ◇─────────────◇
        │  ┌──────< Have all                >
        │  │      simulations with given proportions
        │  │         been completed?
        │  │           ◇─────────────◇
        │  │               YES
        │  │                │
        │  │          ( Return )
```

REGION IMPORTANCE ESTIMATION

This application is a National Stage Entry of PCT/JP2022/005530 filed on Feb. 14, 2022, which claims priority from Japanese Patent Application PCT/JP2021/006866 filed on Feb. 24, 2021, the contents of all of which are incorporated herein by reference, in their entirety.

TECHNICAL FIELD

The present invention relates to an information processing apparatus, an information processing method, and a recording medium.

BACKGROUND ART

As a technique of image processing, known is a technique of reducing the data volume of encoded data by varying the quality of an image for each region included in the image. For example, Patent Literature 1 discloses that, in an image captured by an image capturing apparatus, a resolution of a region other than a first partial region is lowered while a resolution of the first partial region is maintained.

In such a technique, it is attempted to lower the quality of a region which has a low level of importance, without lowering the quality of a region which has a high level of importance.

CITATION LIST

Patent Literature

[Patent Literature 1]
Japanese Patent Application Publication, Tokukai, No. 2018-056838

SUMMARY OF INVENTION

Technical Problem

However, in the technique of Patent Literature 1, there is room for improvement in terms of which region is set to have a high quality and which region is caused to have a lowered quality, i.e., how to estimate (i) an important region of which the quality is kept high and (ii) a non-important region of which the quality is lowered.

An example aspect of the present invention is for providing a technique which makes it possible to suitably estimate an important region and a non-important region in an image.

Solution to Problem

An information processing apparatus in accordance with an example aspect of the present invention is an information processing apparatus including at least one processor, the at least one processor carrying out: an obtaining process of obtaining input data which includes at least one of image data and point cloud data; an estimating process of estimating, with use of an estimation model, levels of importance with respect to a respective plurality of regions which are included in a frame indicated by the input data; a replacing process of generating replaced data by replacing at least one of the plurality of regions, which are included in the input data, with alternative data in accordance with the levels of importance; an evaluating process of deriving an evaluation value by referring to the replaced data; and a training process of training the estimation model with reference to the evaluation value.

An information processing method in accordance with an example aspect of the present invention is an information processing method including: obtaining input data which includes at least one of image data and point cloud data; estimating levels of importance with respect to a respective plurality of regions which are included in a frame indicated by the input data; generating replaced data by replacing at least one of the plurality of regions, which are included in the input data, with alternative data in accordance with the levels of importance; deriving an evaluation value by referring to the replaced data; and training an estimating means with reference to the evaluation value.

A recording medium in accordance with an example aspect of the present invention is a computer-readable non-transitory recording medium in which a program is recorded, the program being for causing a computer to function as: an obtaining means for obtaining input data which includes at least one of image data and point cloud data; an estimating means for estimating levels of importance with respect to a respective plurality of regions which are included in a frame indicated by the input data; a replacing means for generating replaced data by replacing at least one of the plurality of regions, which are included in the input data, with alternative data in accordance with the levels of importance; an evaluating means for deriving an evaluation value by referring to the replaced data; and a training means for training the estimating means with reference to the evaluation value.

Advantageous Effects of Invention

According to an example aspect of the present invention, it is possible to provide a technique which makes it possible to suitably estimate an important region and a non-important region in an image.

BRIEF DESCRIPTION OF DRAWINGS

FIG. 10 is a flowchart of a simulation evaluating step illustrated in FIG. 9.

FIG. 11 is a flowchart of another example of the simulation evaluating step illustrated in FIG. 9.

FIG. 21B is a schematic view illustrating quality parameters by the example process 1 in the flow S106*b* in the processing method in accordance with the fifth example embodiment of the present invention.

FIG. 27 illustrates an example of a flowchart illustrating a flow of a simulation evaluating method S4A in a training method of training an estimating section.

FIG. 28 illustrates an example of a flowchart illustrating a flow of a simulation evaluating method S5A.

FIG. 29 illustrates an example of a flowchart illustrating a flow of a simulation evaluating method S10A.

FIG. 31 illustrates an example of a flowchart illustrating a flow of a loss evaluating method S8A in a simulation.

DESCRIPTION OF EMBODIMENTS

First Example Embodiment

The following description will discuss, in detail, a first example embodiment of the present invention with reference to drawings. The present example embodiment is made the basis of example embodiments described later. An information processing apparatus 1 in accordance with the present example embodiment is an apparatus which trains a method of replacing, with alternative data in accordance with levels of importance, a part of regions that are included in input data including at least one of image data and point cloud data.

(Configuration of Information Processing Apparatus 1)

Figure 1:
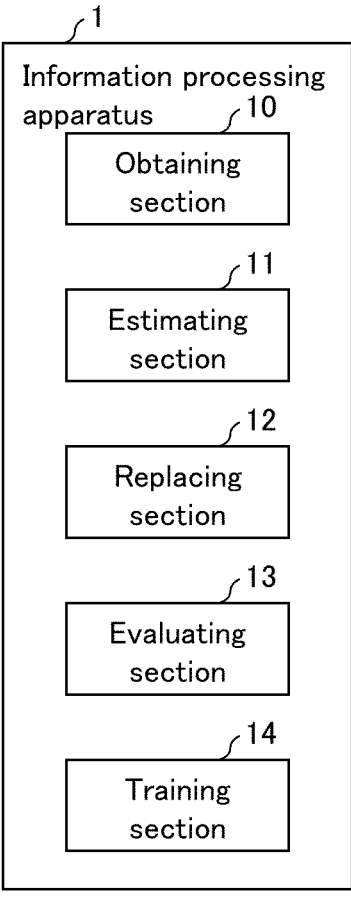
FIG. 1 is a block diagram illustrating a configuration of an information processing apparatus in accordance with a first example embodiment of the present invention.

A configuration of the information processing apparatus 1 in accordance with the first example embodiment is described with reference to FIG. 1. FIG. 1 is a block diagram illustrating the configuration of the information processing apparatus 1. As illustrated in FIG. 1, the information processing apparatus 1 includes an obtaining section 10, an estimating section 11, a replacing section 12, an evaluating section 13, and a training section 14. Note that the obtaining section 10 is an embodiment of an obtaining means recited in the claims. The estimating section 11 is an embodiment of an estimating means recited in the claims. The replacing section 12 is an embodiment of a replacing means recited in the claims. The evaluating section 13 is an embodiment of an evaluating means recited in the claims. The training section 14 is an embodiment of a training means recited in the claims.

As an example, the information processing apparatus 1 can be used to process image data or point cloud data each of which has been obtained from a point of view of a movable body such as a self-driving vehicle, a robot, or a drone. More specifically, the information processing apparatus 1 can be used to process image data or point cloud data each of which has been obtained by an image capturing apparatus, a distance measuring apparatus, or the like mounted on a movable body.

Each configuration included in the information processing apparatus 1 is described below.

The obtaining section 10 obtains input data which includes at least one of image data and point cloud data, for example. The input data obtained by the obtaining section 10 is, for example, image data which has been obtained by a camera or the like or point cloud data which has been obtained by a distance measuring apparatus such as three-dimensional light detection and ranging (Lidar). The image data may be still image data or may be alternatively moving image data. That is, the data may be a single piece of data or may alternatively include a plurality of pieces of data which have been successively obtained. A method in which the obtaining section 10 obtains the image data or the point cloud data from the camera, the three-dimensional Lidar, or the like is not limited. As an example, the obtaining section 10 can obtain the data with use of wired communication, wireless communication, or a combination of wired communication and wireless communication.

The estimating section 11 estimates levels of importance with respect to a respective plurality of regions which are included in a frame indicated by the input data. In the present embodiment, a level of importance is an index which indicates how much information that is necessary to achieve a purpose of use of the input data is included in a region.

As an example, considered is a case where the input data is a video which is for remotely monitoring or operating operation of a movable body such as an automotive vehicle and which has been captured from the movable body. The movable body is not limited to vehicles in/on which people ride, but also includes apparatuses which transport articles without human intervention, such as drones. In such a case, a level of importance of a region that includes traffic information pertaining to a road on which the movable body travels, a region that includes a human, an object, or the like around the direction of traveling of the movable body, or the like is considered high so that a purpose of safely monitoring or operating the operation of the movable body is achieved. Examples of an index of the levels of importance include an evaluation value which is derived by the evaluating section (described later).

The estimating section 11 can use any of various algorithms, such as a neural network algorithm or a genetic algorithm, as an example. The estimating section 11 may include, as an example, a self-attention module.

The replacing section 12 generates replaced data by replacing at least one of the plurality of regions, which are included in the input data, with alternative data in accordance with the levels of importance. In the present embodiment, the alternative data is data which has a smaller volume than the input data when encoding is carried out.

Examples of the alternative data include (i) noise data such as Gaussian noise and (ii) image data in which a quantum parameter (QP) is set larger (an quantization error is made larger) than that in an image before replacement.

The evaluating section 13 derives the evaluation value by referring to the replaced data. In the present embodiment, the evaluation value is an index which indicates how much the purpose of the use of the input data is achieved in a case where the replaced data is referred to, e.g., the replaced data is used.

As an example, the evaluation value may be a reward value which is given in a case where the replaced data is inputted into a controller and a simulation of operation is carried out. Alternatively, the evaluation value may be a difference between (i) a value outputted by inputting the input data before replacement into the controller and (ii) a value outputted by inputting the replaced data into the controller.

The training section 14 trains the estimating section 11 with reference to the evaluation value. In the present embodiment, training means updating various parameters, which are used by the estimating section to estimate the levels of importance, so that a higher evaluation value is obtained.

As an example, the training section 14 may change regions or combinations of regions to be replaced with the alternative data, and then adjust and update the various parameters, which are used in estimation by the estimating section, so that the reward value, which is given by inputting the replaced data into the controller, becomes high. Alternatively, the training section 14 may adjust and update the various parameters, which are used in estimation by the estimating section, so that the difference between (i) the output obtained in a case where the data before replacement is inputted into the controller and (ii) the output obtained in a case where the replaced data is inputted into the controller becomes small.

Note that, in the example embodiment illustrated in FIG. 1, the obtaining section 10, the estimating section 11, the replacing section 12, the evaluating section 13, and the training section 14 are incorporated in a single information processing apparatus 1. However, these sections do not necessarily need to be incorporated in a single information processing apparatus. For example, a part or all of the obtaining section 10, the estimating section 11, the replacing section 12, the evaluating section 13, and the training section 14 may be disposed separately. Then, these sections may be connected to each other by wired communication or wireless communication. Note also that a part or all of the obtaining section 10, the estimating section 11, the replacing section 12, the evaluating section 13, and the training section 14 may be disposed on a cloud. This respect also applies to apparatus configurations described below.

(Effect of Information Processing Apparatus 1)

As has been described, the information processing apparatus 1 in accordance with the present example embodiment employs a configuration such that: levels of importance are estimated with respect to respective regions included in input data; an evaluation value is derived with reference to data obtained by carrying out replacement with alternative data in accordance with the levels of importance; and the estimating section is trained with reference to the evaluation value. Therefore, the information processing apparatus 1 in accordance with the present example embodiment brings about an effect that it is possible to provide a technique which makes it possible to suitably estimate an important region and a non-important region in an image.

(Flow of Information Processing Method S1)

Figure 2:
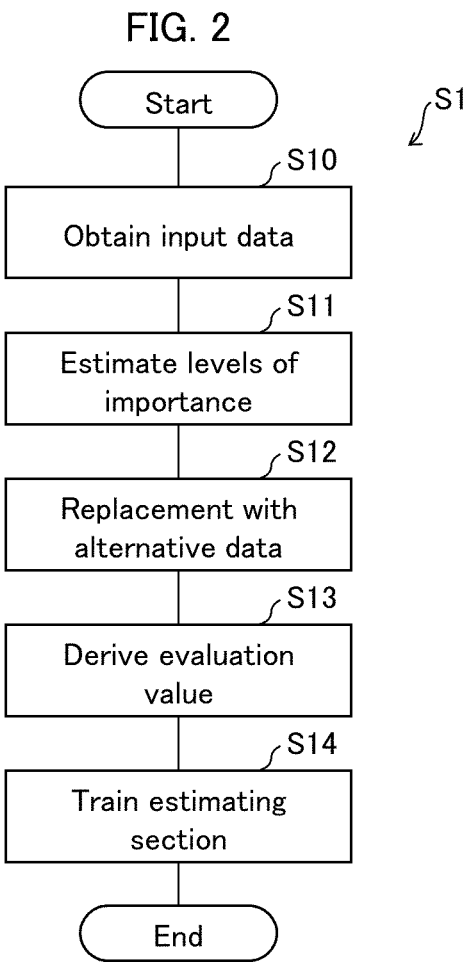
FIG. 2 is a flowchart illustrating a flow of an information processing method carried out by the information processing apparatus in accordance with the first example embodiment of the present invention.

A flow of an information processing method (training method) S1 in accordance with the present example embodiment is described with reference to FIG. 2. FIG. 2 is a flowchart illustrating the flow of the information processing method S1 carried out by the information processing apparatus 1. As illustrated in FIG. 2, the information processing method S1 includes the following steps. First, in a step S10, input data is obtained. Specifically, the obtaining section 10 obtains input data which includes at least one of image data and point cloud data. As an example, the obtaining section 10 can obtain, as the input data, image data of a still image or a moving image from a camera. The obtaining section 10 may obtain, as the input data, point cloud data from three-dimensional Lidar. A method in which the obtaining section 10 obtains the image data or the point cloud data from the camera, the three-dimensional Lidar, or the like is not limited. As an example, the obtaining section 10 can obtain the data with use of wired communication, wireless communication, or a combination of wired communication and wireless communication.

Next, in a step S11, levels of importance are estimated. Specifically, the estimating section 11 estimates levels of importance with respect to a respective plurality of regions which are included in a frame indicated by the input data. As an example, the estimating section 11 can use an algorithm such as a neural network algorithm or a genetic algorithm.

Next, in a step S12, replacement with alternative data is carried out. Specifically, the replacing section 12 generates replaced data by replacing at least one of the plurality of regions, which are included in the input data, with alternative data in accordance with the levels of importance. As an example, the replacing section 12 can replace at least one of the plurality of regions with noise data such as Gaussian noise, image data in which a quantum parameter is set larger than that in an image before replacement, or the like.

Next, in a step S13, an evaluation value is derived. Specifically, the evaluating section 13 derives an evaluation value by referring to the replaced data. As an example, the evaluating section 13 can derive, as the evaluation value, a reward value which is obtained by inputting the replaced data into the controller or a difference between (i) a value outputted in a case where the data before replacement is inputted into the controller and (ii) a value obtained in a case where the replaced data is inputted into the controller.

Next, in a step S14, the estimating section 11 is trained. Specifically, the training section 14 trains the estimating section 11 with reference to the evaluation value. As an example, the training section 14 can train the estimating section so that the reward value becomes high or the difference becomes small.

(Effect of Information Processing Method S1)

As has been described, the information processing method S1 in accordance with the present example embodiment employs a configuration such that: input data which includes at least one of image data and point cloud data is obtained; levels of importance are estimated with respect to a respective plurality of regions which are included in a frame indicated by the input data; replaced data is generated by replacing at least one of the plurality of regions, which are included in the input data, with alternative data in accordance with the levels of importance; an evaluation value is derived by referring to the replaced data; and the estimating section 11 is trained with reference to the evaluation value. Therefore, the information processing method S1 in accordance with the present example embodiment brings about an effect that it is possible to provide a technique which makes it possible to suitably estimate an important region and a non-important region in an image.

(Configuration of Information Processing Apparatus 2)

Figure 3:
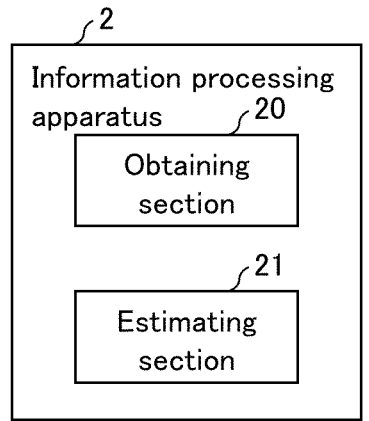
FIG. 3 is a block diagram illustrating a configuration of another information processing apparatus in accordance with the first example embodiment of the present invention.

A configuration of an information processing apparatus 2 in accordance with the first example embodiment is described with reference to FIG. 3. FIG. 3 is a block diagram illustrating the configuration of the information processing apparatus 2. As illustrated in FIG. 3, the information processing apparatus 2 includes an obtaining section 20 and an estimating section 21. Note that the obtaining section 20 is an embodiment of the obtaining means recited in the claims. The estimating section 21 is an embodiment of the estimating means recited in the claims.

The obtaining section 20 obtains input data which includes at least one of image data and point cloud data. That is, the obtaining section 20 may have the same configuration as the obtaining section 10 of the information processing apparatus 1 described above. The input data obtained by the obtaining section 20 may be similar to the input data obtained by the obtaining section 10.

The estimating section 21 estimates levels of importance with respect to a respective plurality of regions which are included in a frame indicated by the input data that has been obtained by the obtaining section 20. The estimating section 21 is one that has been trained with reference to replaced data which has been obtained by replacing at least one of a plurality of regions, which are included in input data, with alternative data in accordance with levels of importance. That is, as the estimating section 21, the estimating section 11 which has been trained by the training section 14 of the information processing apparatus 1 described above can be used.

(Effect of Information Processing Apparatus 2)

As has been described, the information processing apparatus 2 in accordance with the present example embodiment employs a configuration such that the information processing apparatus 2 includes the obtaining section 20 and the estimating section 21. The obtaining section 20 obtains input data which includes at least one of image data and point cloud data. The estimating section 21 estimates levels of importance with respect to a respective plurality of regions which are included in a frame indicated by the input data that has been obtained by the obtaining section 20. Therefore, the information processing apparatus 2 in accordance with the present example embodiment brings about an effect that it is possible to provide a technique which makes it possible to suitably estimate an important region and a non-important region in an image.

(Flow of Information Processing Method S2)

Figure 4:
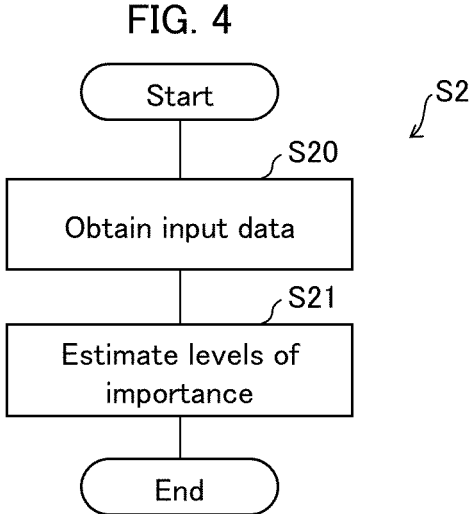
FIG. 4 is a flowchart illustrating a flow of an information processing method carried out by the another information processing apparatus in accordance with the first example embodiment of the present invention.

A flow of an information processing method (estimation method) S2 in accordance with the first example embodiment is described with reference to FIG. 4. FIG. 4 is a flowchart illustrating the flow of the information processing method S2 carried out by the information processing apparatus 2. As illustrated in FIG. 4, the information processing method S2 includes the following steps.

First, in a step S20, input data is obtained. Specifically, the obtaining section 20 obtains input data which includes at least one of image data and point cloud data.

Next, in a step S21, levels of importance are estimated. Specifically, the estimating section 21 estimates levels of importance with respect to a respective plurality of regions which are included in a frame indicated by the input data. Note that the estimating section 21 may be one that has been trained by the information processing apparatus 1 with reference to replaced data which has been obtained by replacing at least one of a plurality of regions, which are included in input data, with alternative data in accordance with levels of importance.

(Effect of Information Processing Method S2)

As has been described, the information processing method S2 in accordance with the present example embodiment employs a configuration such that: input data which includes at least one of image data and point cloud data is obtained; and levels of importance are estimated with respect to a respective plurality of regions which are included in a frame indicated by the input data. Therefore, the information processing apparatus 2 in accordance with the present example embodiment brings about an effect that it is possible to provide a technique which makes it possible to suitably estimate an important region and a non-important region in an image.

Second Example Embodiment

The following description will discuss, in detail, a second example embodiment of the present invention with reference to drawings. Note that descriptions of elements having the same functions as the elements described in the first example embodiment will be omitted as appropriate.

(Configuration of Information Processing Apparatus 3)

An information processing apparatus 3 described in the second example embodiment is an apparatus which evaluates levels of importance of a video (moving image) that has been captured by a video camera mounted on a self-driving vehicle. The self-driving vehicle is an example of a movable body which is autonomously operated by an autonomous operation controller on the basis of a video captured by a video camera. The video captured by the video camera is transmitted also to an operation monitoring center as a monitoring video, and is monitored on a monitor by a monitoring person. The monitoring person observes the monitoring video displayed on the monitor, and checks whether there is any abnormality. In a case where an abnormality has occurred or is likely to occur, the monitoring person takes action as appropriate, e.g., remotely operates the self-driving vehicle by him/herself. In this manner, it is possible to safely monitor or operate operation of the movable body.

The monitoring video is transmitted to the operation monitoring center via a wireless communication network which includes the Internet. However, wireless communication networks such as the Internet have been increasingly demanded in recent years. Therefore, there is no sufficient margin in the communication available band. In a case where the monitoring video during autonomous operation has a large data volume and such a monitoring video is transmitted, there is a possibility that, when the communication available band drops due to deterioration of a communication condition or the like, disturbance of the monitoring video occurs and sufficient monitoring cannot be carried out. Therefore, it is preferable to reduce such a possibility by transmitting the monitoring video having a minimum necessary data volume.

The information processing apparatus 3 is a learning apparatus that learns an important region and a non-important region, which is not important, in the video (monitoring video) so as to reduce a data volume of the video transmitted to an operation monitoring center. Note that the important region in the present embodiment refers to a region which is highly necessary to be monitored so as to ensure safe operation of the self-driving vehicle. Note also that the non-important region refers to a region which is lower in level of importance than the important region.

(Information Processing System 300)

Figure 5:
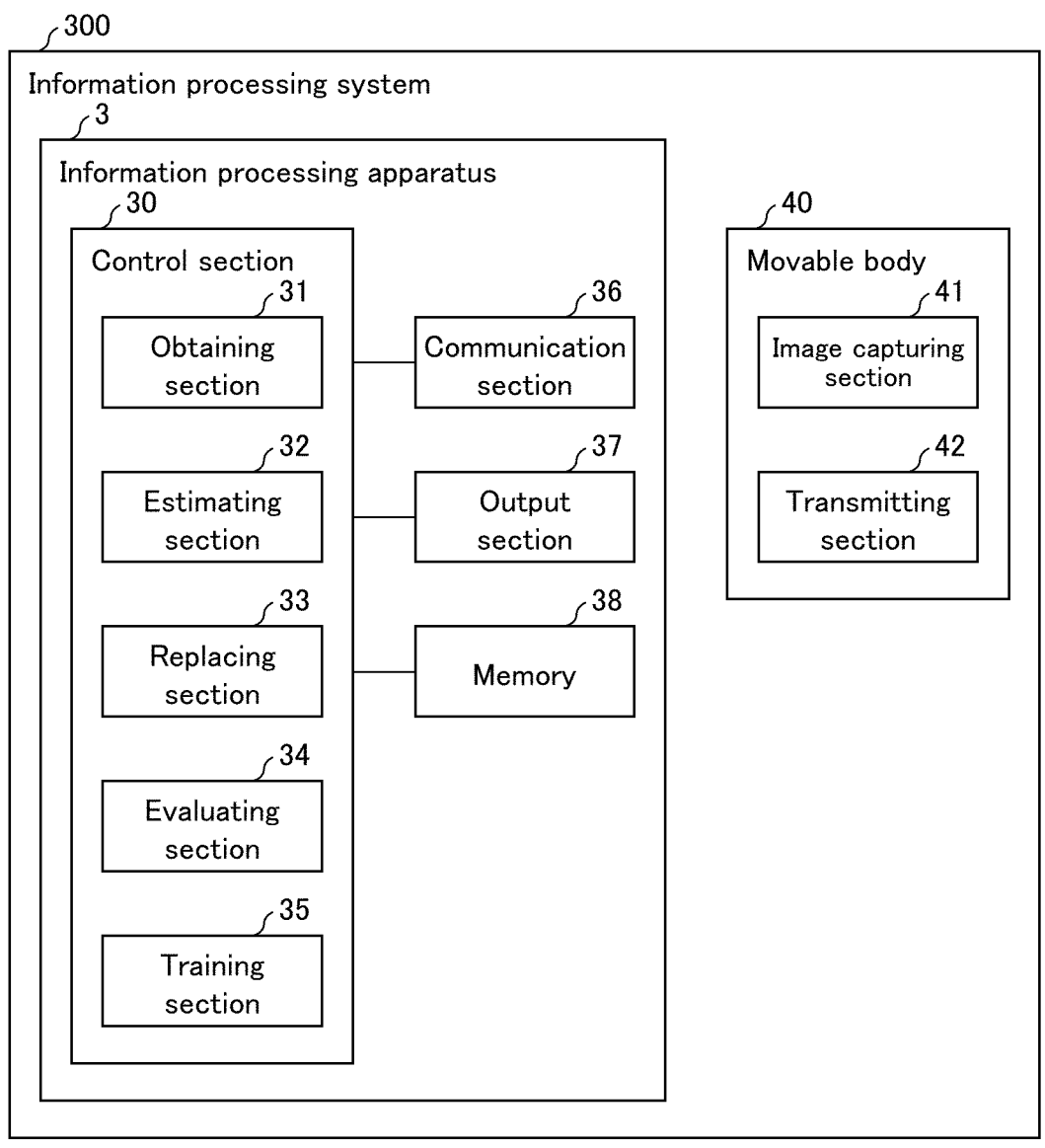
FIG. 5 is a block diagram illustrating a configuration of an information processing system which includes an information processing apparatus in accordance with a second example embodiment of the present invention.

A configuration of an information processing system 300 in accordance with the second example embodiment is described below. FIG. 5 is a block diagram illustrating the configuration of the information processing system 300 including an information processing apparatus 3. As illustrated in FIG. 5, the information processing system 300 includes the information processing apparatus 3 and a movable body 40. The information processing apparatus 3 includes a control section 30, a communication section 36, an output section 37, and a memory 38. The movable body 40 includes an image capturing section (video camera) 41 and a transmitting section 42. The video camera 41 is an in-vehicle camera mounted on the movable body 40. The transmitting section 42 transmits a video captured by the video camera 41 to the information processing apparatus 3 by, for example, wireless communication.

The control section 30 includes an obtaining section 31, an estimating section 32, a replacing section 33, an evaluating section 34, and a training section 35. These sections are described later.

The communication section 36 receives video data transmitted from the transmitting section 42. The communication section 36 may receive the video data by wireless communication or wired communication.

The output section 37 outputs at least a part of data generated in the information processing apparatus 3, such as obtained data, replaced data, various parameters which are set on the estimating section 32, information which relates to levels of importance that have been estimated by the estimating section 32, or an evaluation value. The outputted data may be displayed on a display apparatus or the like or may be transmitted outside.

In the memory 38, various programs, various kinds of data, and the like which are referred to by the control section 30 are transitorily or non-transitorily stored.

Next, elements included in the control section 30 are described. The obtaining section 31, the estimating section 32, the replacing section 33, the evaluating section 34, and the training section 35 of the control section 30 have functions equivalent to those of the obtaining section 10, the estimating section 11, the replacing section 12, the evaluating section 13, and the training section 14, respectively, of the information processing apparatus 1.

Figure 6A:
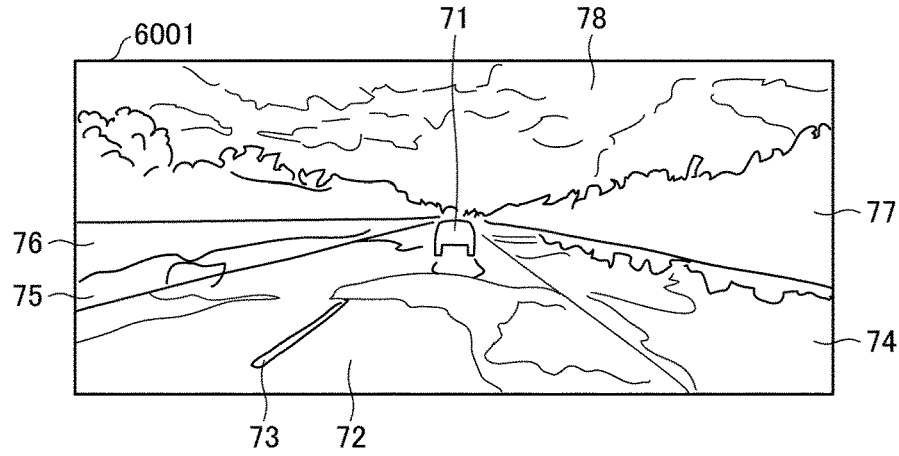
FIG. 6A illustrates an example of video data obtained by the information processing apparatus in accordance with the second example embodiment of the present invention.

The obtaining section 31 obtains the video data from the video camera 41. 6001 of FIG. 6A is a frame of the video obtained by the obtaining section 31 from the video camera 41. The frame 6001 shows a car 71 which travels ahead, a road 72, a center line 73, sidewalks 74 and 75, a field 76 which is located next to the sidewalk 75, a background 77, the sky 78, and the like.

Figure 6B:
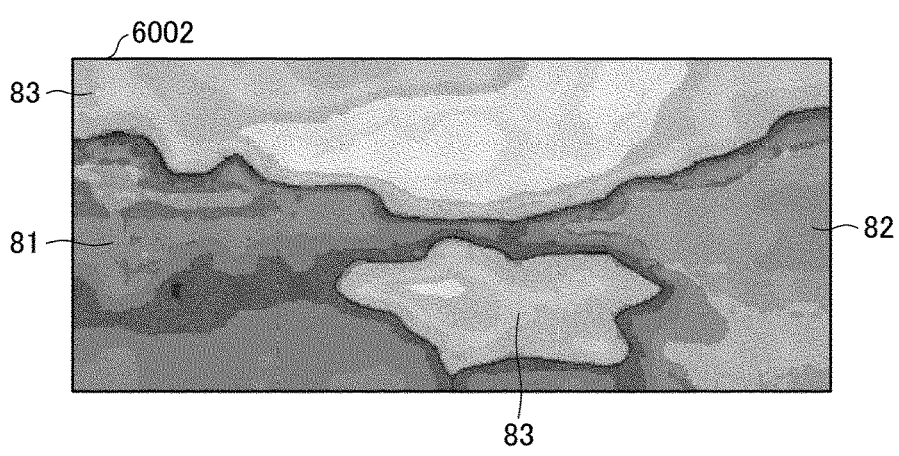
FIG. 6B illustrates an example of a result of evaluating levels of importance of the video data illustrated in FIG. 6A.

The estimating section 32 estimates levels of importance (necessity for monitoring) of respective regions in the image 6001 of the frame. 6002 illustrated in FIG. 6B is a heat map which shows the levels of importance that have been estimated by the estimating section 32. An actual heat map shows the levels of importance in colors. However, for convenience, the heat map 6002 shows the levels of importance with use of levels of shading, and a darker region has a higher level of importance. A region 81 of the heat map 6002 includes the car 71, the road 72 which includes the center line 73, the sidewalk 75, the field 76 which is located next to the sidewalk, and the like. Thus, it can be seen that the region 81 has a high level of importance. A region 82 includes the sidewalk 74 which is located on a traveling lane side, a part of the background 77, and the like. Thus, it can be seen that the region 82 has a high level of importance. A region 83 includes the sky and the road on which the car is not traveling. Thus, it can be seen that the region 83 has a relatively low level of importance as compared with the regions 81 and 82.

As an example, the estimating section 32 estimates the levels of importance with use of a self-attention module. The self-attention module is a known module that has an algorithm in which attention is paid to in-process calculation results of itself and the module determines data to read based on the calculation results. A function generated by the self-attention module includes a parameter for weighting. Note that a method of training the estimating section 32 is described later.

Figure 6C:
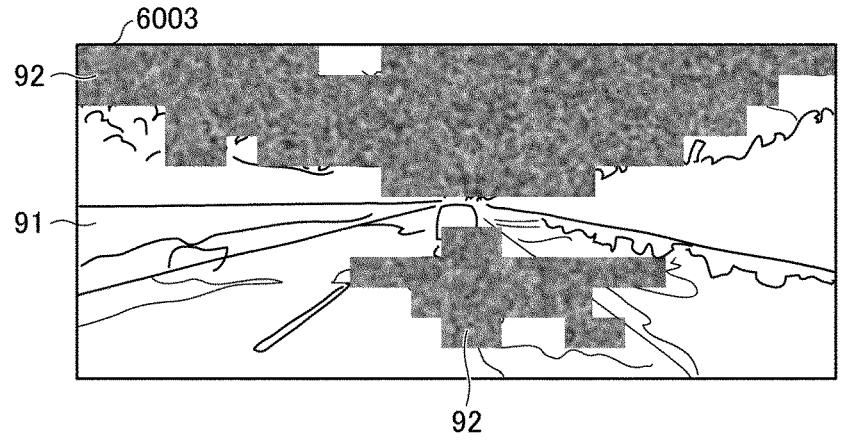
FIG. 6C is a drawing obtained by replacing a part of regions of the video data illustrated in FIG. 6B with noise in accordance with the levels of importance of the video data.

The replacing section 33 replaces, with alternative data, data of one or more regions in the image 6001 which have low levels of importance. Specifically, the replacing section 33 replaces, with the alternative data, one or more regions which have been selected in ascending order of the levels of importance and which have a given proportion in the frame. The alternative data is data which has a data volume (data size) that is reduced as compared with that of the original data. The replaced image 6003 illustrated in FIG. 6C includes a region 92 that is obtained by replacing, with noise data, the region 83 which is in the heat map 6002 and which has a low level of importance. A data size of the noise data is smaller than that of the original image data. A region 91 is a region of high importance. Therefore, the region 91 is a region which has not been replaced with the noise data.

Figure 7A:
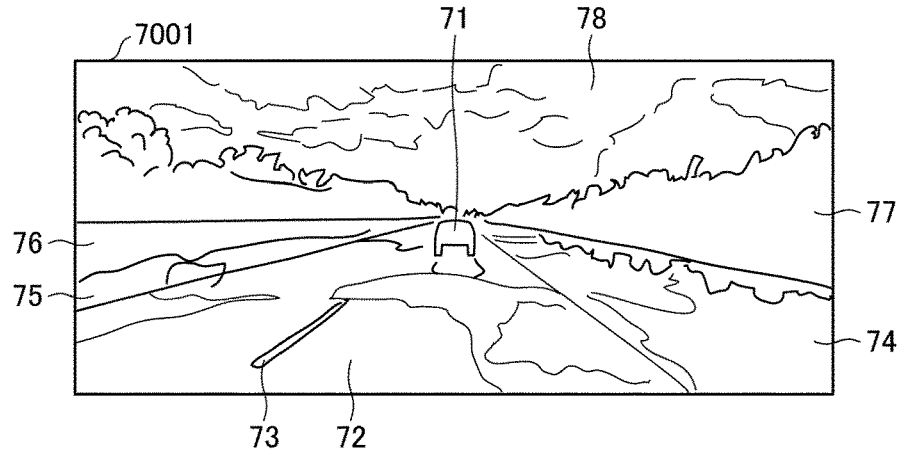
FIG. 7A illustrates an example of video data obtained by the information processing apparatus in accordance with the second example embodiment of the present invention.
Figure 7B:
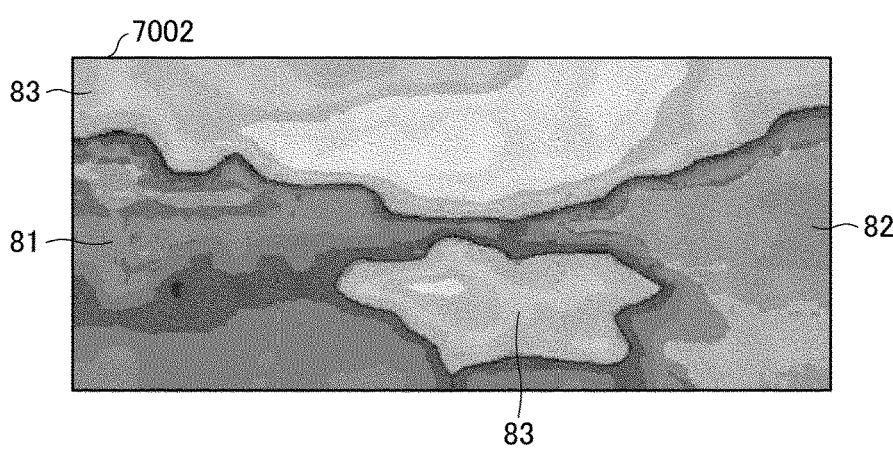
FIG. 7B illustrates an example of a result of evaluating levels of importance of the video data illustrated in FIG. 7A.
Figure 7C:
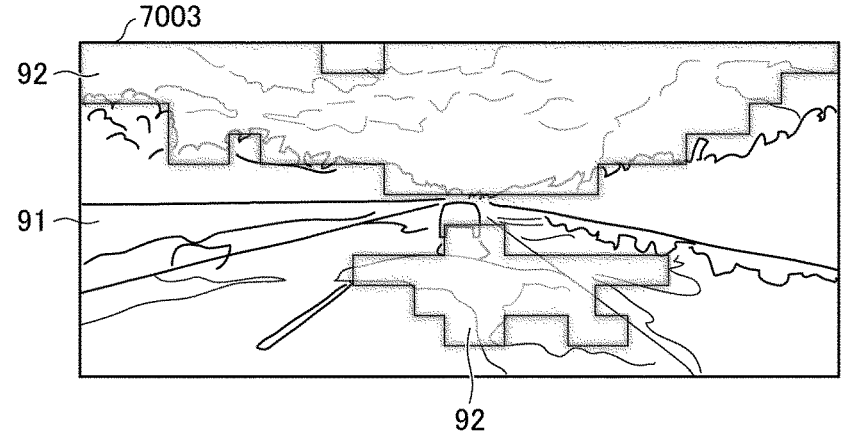
FIG. 7C is a drawing obtained by replacing a part of regions of the video data illustrated in FIG. 7B with an image that has a large quantization error, in accordance with the levels of importance of the video data.

The replacing section 33 may replace, with data other than noise, e.g., image data that has a large quantization error, the data of the one or more regions that have low levels of importance. That is, the alternative data used by the replacing section 33 is data which includes at least one of the noise and the image data that has a large quantization error. FIGS. 7A to 7C are drawings illustrating a method of replacing, with the image data that has a large quantization error, data of one or more regions in an image which have low levels of importance, by setting a quantum parameter large. An image 7001 of FIG. 7A and a heat map 7002 of FIG. 7B are the same as the image 6001 of FIG. 6A and the heat map 6002 of FIG. 6B, respectively. An image 7003 illustrated in FIG. 7C is an image obtained by replacing the region 83, which has a low level of importance, with the image data that has a large quantization error. By setting the quantum parameter large, it is possible to reduce data size.

The evaluating section 34 derives an evaluation value for a case where the replaced image 6003 or the replaced image 7003 is used. Specifically, the evaluating section 34 derives an evaluation value, for example, with reference to an output from a controller of the movable body into which controller the replaced image has been inputted. The replaced image 6003 or the replaced image 7003 is an image of which a part is the noise or the image which has a large quantization error. In a case where such a replaced image does not affect safe traveling of the self-driving vehicle, a high evaluation value is given to the replaced image. A detailed example of the evaluating section 34 is described later.

The training section 35 trains the estimating section 32 with reference to the evaluation value derived by the evaluating section 34. A detailed example of the training section 35 is described later.

Data obtained by the obtaining section 31 may be not moving image data but still image data. Alternatively, the data may be not image data but, for example, point cloud data which has been obtained by three-dimensional Lidar or the like. The three-dimensional Lidar is a distance measuring apparatus which derives directions of and distance to points on an object by emitting infrared rays, laser light, or the like and then receiving waves reflected by the respective points. The point cloud data is aggregated data of data which has been obtained by such a distance measuring apparatus and which indicates the directions of and the distances to the points on the object.

Figure 8:
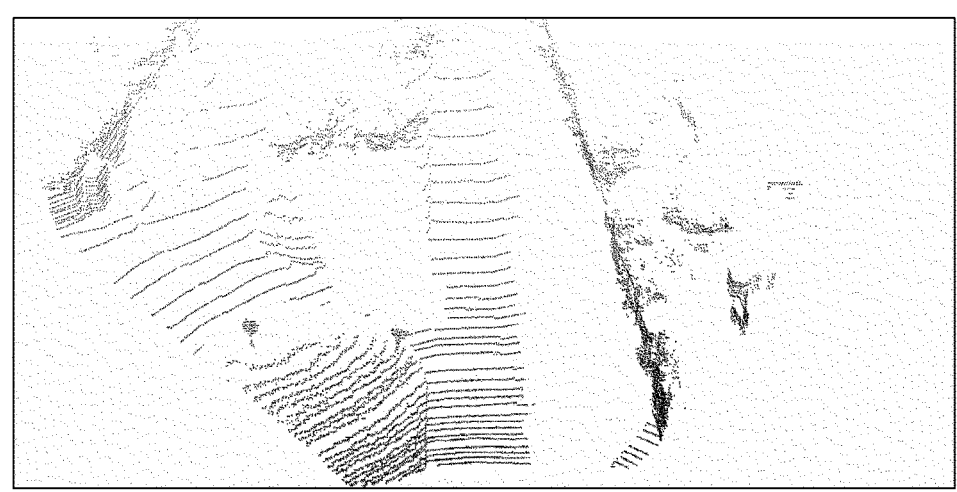
FIG. 8 is a drawing illustrating an example of point cloud data processed by the information processing apparatus in accordance with the second example embodiment of the present invention.

FIG. 8 illustrates an example of an image which can be processed by the information processing apparatus 3 and which shows point cloud data. FIG. 8 is a drawing obtained by imaging the point cloud data obtained by three-dimensional Lidar. As in an image, it is possible to estimate levels of importance with respect to respective regions of the point cloud data. In the case of the point cloud data, the replacing section 33 adds noise to point data in one or more regions which have low levels of importance.

In the information processing apparatus 3 described above, the image data obtained by the obtaining section 31 is the moving image data obtained from the video camera 41. However, the image data obtained by the obtaining section 31 is not limited to the moving image data. For example, the image data may be a virtual simulation image which has been created by a simulation computer and which simulates a video from the in-vehicle camera.

(Example Effects of Information Processing Apparatus 3)

As has been described, the information processing apparatus 3 in accordance with the second example embodiment employs a configuration such that the information processing apparatus 3 includes the control section 30, the communication section 36, the output section 37, and the memory 38. Therefore, the information processing apparatus 3 in accordance with the present example embodiment brings about, in addition to the effect brought about by the information processing apparatus 1 in accordance with the first example embodiment, the effect that it is possible to (i) output at least a part of data generated in the information processing apparatus 3, such as inputted data, replaced data, set various parameters, or an evaluation value, and (ii) check the at least a part of the data.

(Detailed Example of Training Method)

Figure 9:
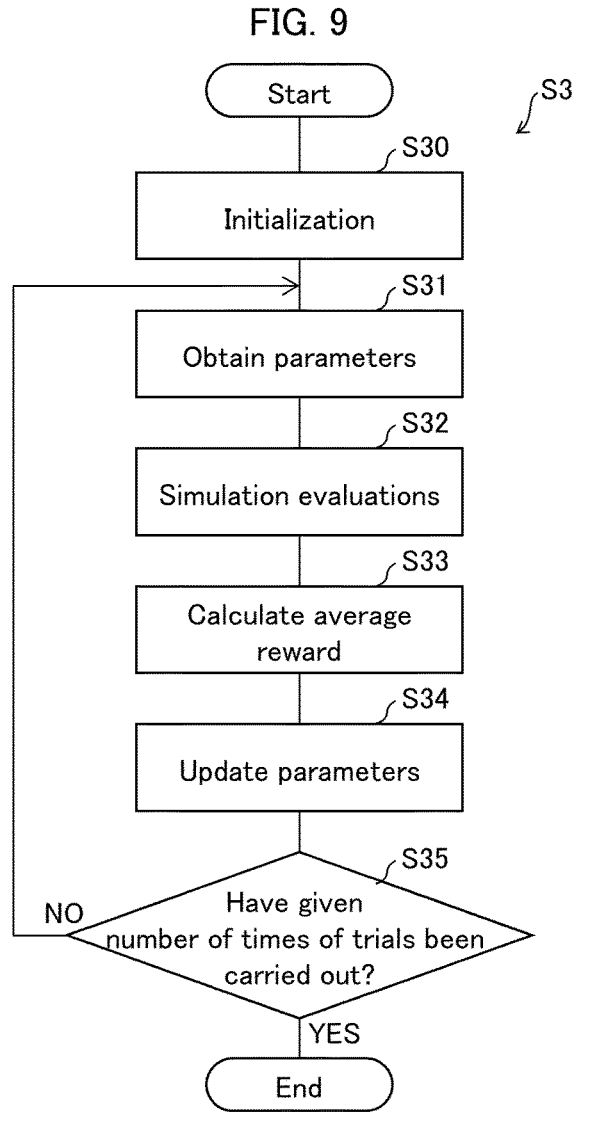
FIG. 9 is a flowchart illustrating an example of a flow of a training method which is carried out by the information processing apparatus in accordance with the second example embodiment of the present invention and which is a method of training a method of estimating levels of importance of data.

Next, a method S3 of training the estimating section 32 which includes the self-attention module is described with reference to a drawing. FIG. 9 is a flowchart illustrating an example of a flow of the training method (information processing method) S3 of training the estimating section 32. The training method S3 is a method of training the estimating section 32 with use of a simulated video that is used in an autonomous operation simulation.

First, in a step S30, the control section 30 initializes data of the self-attention module.

Next, in a step S31, the control section 30 obtains the parameters of the self-attention module. The parameters obtained in the first simulation are parameters which have been arbitrarily set and inputted by a user.

Next, in a step S32, the evaluating section 34 carries out simulations, and evaluates the simulations. In the present embodiment, each of the simulations carried out is a simulation of autonomous operation. The control section 30 derives a reward value from a result of each of the simulations. A detailed flow of the above simulation evaluations is described later with reference to another drawing.

Next, in a step S33, the evaluating section 34 calculates an average reward. The average reward is an average value of reward values which are, as evaluation values, repeatedly derived a given number of times in the simulation evaluations described later. Specifically, in the simulation evaluations, a series of simulation steps are repeatedly carried out the given number of times as described later. In so doing, the reward values derived in the respective simulation steps are accumulated. Then, a value obtained by dividing a final cumulative value of the reward values by the given number of times is the average value of the reward values.

Next, in a step S34, the control section 30 updates the parameters of the self-attention module. Specifically, the training section 35 updates the parameters, on the basis of the reward value derived in the step S33, so that the reward value become higher. Specifically, the training section 35 updates the parameters, on the basis of the average value of the reward values, so that the average value of the reward values becomes higher.

Next, in a step S35, the control section 30 determines whether or not the given number of times of trials of the simulation evaluations have been carried out. In a case where it is determined, in the step S35, that the given number of times of trials of the simulation evaluations have been carried out (step S35: YES), the training flow is ended. On the other hand, in a case where it is determined that the given number of times of trials of the simulation evaluations have not been carried out (step S35: NO), the flow returns to the step S31. In the step S31, the control section 30 obtains the parameters updated in the step S34.

Next, a detailed flow of the simulation evaluating step in the step S32 is described with reference to a drawing. FIG. 10 is a flowchart of a simulation evaluating method S4. In the present embodiment, the simulation evaluations are carried out with use of an autonomous operation simulator. The autonomous operation simulator is an apparatus which simulates, on a computer, autonomous operation carried out by an autonomous operation controller, on the basis of a video that simulates a video obtained by an in-vehicle camera. As the autonomous operation simulator, open source CARLA can be, for example, used.

First, in a step S40, the control section 30 initializes data of the autonomous operation simulator.

Next, in a step S41, the control section 30 obtains input data from the autonomous operation simulator. Specifically, the obtaining section 31 obtains, as the input data, simulated video data from the autonomous operation simulator, and transmits the simulated video data to the estimating section 32.

Next, in a step S42, the control section 30 estimates levels of importance of the obtained input data. Specifically, the estimating section 32 divides, into a plurality of regions, frame data that is included in the video data, and estimates the levels of importance with respect to the respective plurality of regions with use of the self-attention module.

Next, in a step S43, the control section 30 replaces, with alternative data, a given proportion of one or more regions in ascending order of the levels of importance. Specifically, it is assumed that the given proportion is set to, for example, 40%. In this case, the replacing section 33 selects one or more regions in ascending order of the levels of importance. In a case where the total data size of the selected one or more regions (or the total image area of the selected one or more regions) reaches 40% or more of all the regions, the replacing section 33 stops the selection. Then, the replacing section 33 replaces all the selected one or more regions with the alternative data.

Next, in a step S44, the control section 30 inputs a replaced image into the autonomous operation controller, and obtains a control command outputted by the autonomous operation controller.

Next, in a step S45, the evaluating section 34 obtains a reward by inputting the control command into the autonomous operation simulator, and adds the reward to a cumulative value of rewards. Cumulation of rewards means, for example, adding a reward value in the n-th (n is an integer of 2 or more) simulation step to the sum of reward values in the first to the n−1-th simulation steps. That is, a cumulative value of reward values in up to the n-th simulation steps is calculated by adding the reward value in the n-th simulation step to the sum of the reward values in the first to the n−1-th simulation steps.

In a case where an operation result from the autonomous operation simulator into which the control command has been inputted indicates safe operation, a high reward value is given. In contrast, a low reward value is given in a case where the operation result from the autonomous operation simulator indicates operation of which safety is threatened. Whether or not the operation result indicates safe operation may be considered with a focus on the presence or absence of an accident.

Next, in a step S46, the control section 30 determines whether or not all simulation steps have been completed. That is, the control section 30 determines whether or not all simulated videos possessed by the autonomous operation simulator have been subjected to the above replacing process and inputted into the controller. In a case where it is determined in the step S46 that all the simulation steps have been completed or that an accident has occurred (step S46: YES), the flow proceeds to a step S47. In a case where it is determined in the step S46 that all the simulation steps have not been completed (step S46: NO), the flow returns to the step S41.

In the step S47, the control section 30 determines whether or not a given number of times of simulations have been completed. The given number of times is, for example, a number of times that is sufficient to calculate an average reward. In a case where it is determined in the step S47 that the given number of times of simulations have been completed (step S47: YES), the simulation evaluating step is ended, and the flow proceeds to the step S33 in FIG. 9. In a case where it is determined in the step S47 that the given number of times of simulations have not been completed (step S47: NO), the flow returns to the step S40.

(First Modification of Training Method)

Instead of the simulation evaluating flow illustrated in FIG. 10, a simulation evaluating flow as follows may be used. That is, in the simulation evaluating method S4 described with reference to FIG. 10, the proportion of the one or more regions to be replaced with the alternative data is fixed to a given value. However, in a case where such a replacement proportion is fixed at a constant value, a trained method of estimating levels of importance may become extreme. Specifically, results of estimation of the levels of importance may be polarized. In this case, it is preferable to set a plurality of replacement proportions, carry out the simulation evaluations, and average results of the simulation evaluations. This method is described below.

FIG. 11 is a detailed flowchart of a simulation evaluating method S5 which is a modification of the simulation evaluating step. In the simulation evaluations, a plurality of replacement proportions are set in advance. For example, the replacement proportions are set in three patterns, i.e., 10%, 30%, and 40%. The number of times of simulations carried out with each of the replacement proportions is determined. For example, two times of simulations are carried out with a replacement proportion of 10%, two times of simulations are carried out with a replacement proportion of 30%, and two times of simulations are carried out with a replacement proportion of 40%. The replacing section 33 generates replaced data for each of the plurality of given proportions which differ from each other. Then, the evaluating section 34 derives a preliminary evaluation value with respect to each replaced data generated by the replacing section 33, and derives an evaluation value by averaging preliminary evaluation values. The preliminary evaluation value is an evaluation value which is obtained by carrying out an evaluation with a single replacement proportion. Then, an average of the preliminary evaluation values derived with all the replacement proportions is used as a final evaluation value. Note that the expression "preliminary evaluation value" is introduced in order to clarify a distinction from the "evaluation value" which is finally derived. The word "preliminary" does not limit the present example embodiment.

Under the above assumption, steps S50 to S57 are the same as the steps S40 to S47, respectively, in the flowchart of FIG. 10. A difference is that, in a case where a determination of YES is made in the step S57, the flow proceeds to a step S58. In the step S58, the estimating section 32 determines whether or not all the simulations with the given proportions have been completed. In a case where it is determined in the step S58 that all the simulations have been completed (step S58: YES), the simulation evaluating step is ended, and the flow proceeds to the step S33 in FIG. 9. In a case where it is determined in the step S58 that all the simulations have not been completed (step S58: NO), the flow returns to the step S50. Then, a given proportion with which a simulation has not been completed is set, and the simulation step is repeated. The training methods S3, S4, and S5 described above allow the estimating section 32 to learn the method of estimating levels of importance of respective regions of data.

(Information Processing System 400)

Figure 12:
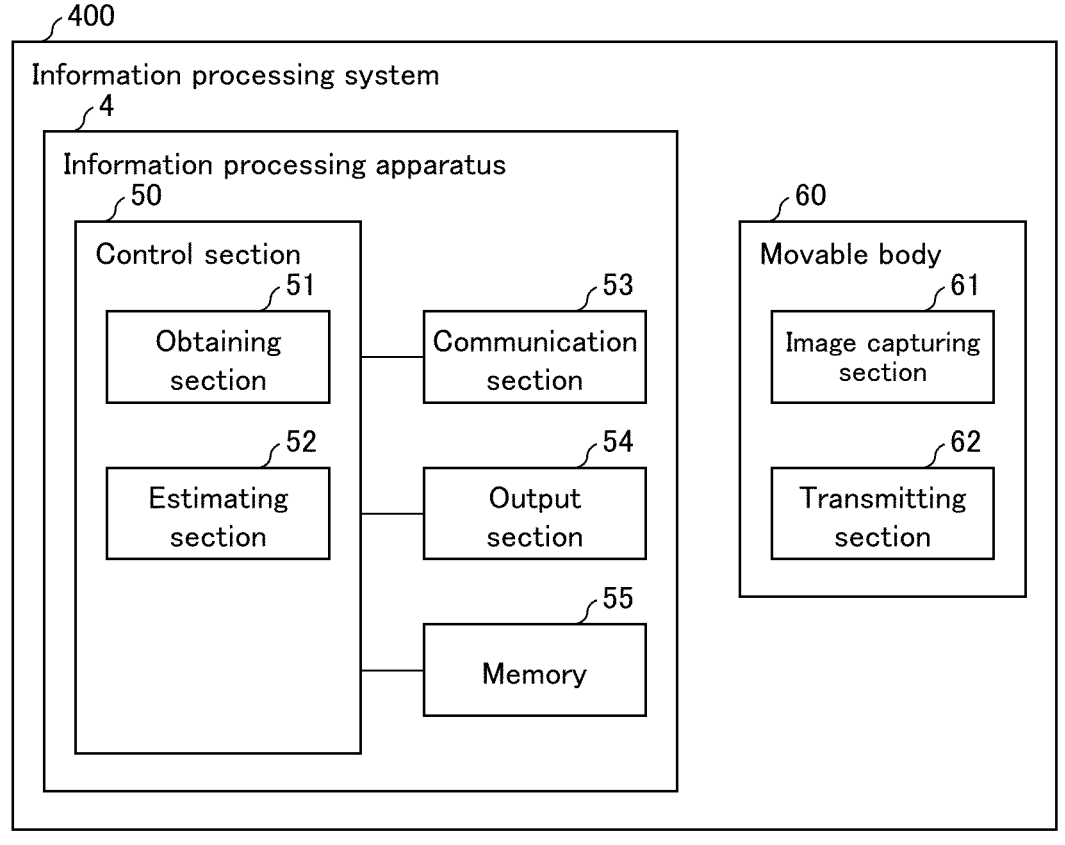
FIG. 12 is a block diagram illustrating a configuration of an information processing system in accordance with the second example embodiment.

Next, a configuration of an information processing system 400 in accordance with the second example embodiment is described. FIG. 12 is a block diagram illustrating the configuration of the information processing system 400 including an information processing apparatus. As illustrated in FIG. 12, the information processing system 400 includes the information processing apparatus 4 and a movable body 60. The information processing apparatus 4 is an apparatus which estimates levels of importance with respect to respective regions included in a frame indicated by input data.

The information processing apparatus 4 includes a control section 50, a communication section 53, an output section 54, and a memory 55. The movable body 60 includes an image capturing section (video camera) 61 and a transmitting section 62. The communication section 53, the memory 55, the video camera 61, and the transmitting section 62 have functions similar to those of the communication section 36, the memory 38, the video camera 41, and the transmitting section 42, respectively, described in connection with the information processing system 300, and therefore descriptions thereof are omitted.

The control section 50 includes an obtaining section 51 and an estimating section 52. The obtaining section 51 obtains a target image via the communication section 53. The estimating section 52 estimates levels of importance of respective regions of the image that has been obtained by the obtaining section 51. As the estimating section 52, the estimating section 32 which has been trained by the information processing system 300 described above can be used.

The information processing apparatus 4 outputs, from the output section 54, importance level information which indicates the levels of importance that have been estimated by the estimating section 52. The importance level information is at least a part of data that is generated in the information processing apparatus 4, such as obtained image data, various parameters which are set on the estimating section 52, or information which relates to the levels of importance that have been estimated by the estimating section 52. An output from the output section 54 may be in a form of an image in which the levels of importance are shown in the respective plurality of regions included in the target image, or may be a set of combinations of (i) region specifying information which is for distinguishing the plurality of regions from each other and (ii) the levels of importance of the respective plurality of regions. The outputted data may be displayed on a display apparatus or the like or may be transmitted outside.

An information processing method (estimating method) carried out by the information processing apparatus 4 is similar to the information processing method (estimating method) S2 described in the first embodiment, and therefore a description thereof is omitted.

According to the information processing system 300 and the information processing methods S3, S4, and S5 in accordance with the second example embodiment described above, it is possible to provide a technique which makes it possible to suitably estimate an important region and a non-important region in an image. Moreover, according to the information processing system 400 in accordance with the 25 second example embodiment, it is possible to provide a technique which makes it possible to suitably estimate an important region and a non-important region in an image. Specifically, it is possible to estimate levels of importance with respect to respective regions included in a video that has been captured by a video camera mounted on a movable body.

Third Example Embodiment

The following description will discuss, in detail, a third example embodiment of the present invention with reference to drawings. A configuration of an information processing apparatus 3A in accordance with the third example embodiment is the same as that of the information processing apparatus 3 described in the second example embodiment. Thus, a description of the configuration of the information processing apparatus 3A is omitted. In the following description, elements of the information processing apparatus 3A are described with use of the same reference signs as those of the elements of the information processing apparatus 3.

In the information processing apparatus 3A in accordance with the present embodiment, an evaluating section 34 derives an evaluation value further with reference to input data. The evaluating section 34 derives the evaluation value by referring to (i) an output obtained from a given controller in a case where the input data is inputted into the given controller and (ii) an output obtained from the given controller in a case where replaced data is inputted into the given controller. Specifically, the evaluating section 34 derives the evaluation value as a difference between (i) the output obtained from the given controller in the case where the input data is inputted into the given controller and (ii) the output obtained from the given controller in the case where the replaced data is inputted into the given controller. Then, a training section 35 trains an estimating section 32 so that the evaluation value becomes low.

(Detailed Example of Training Method)

Figure 13:
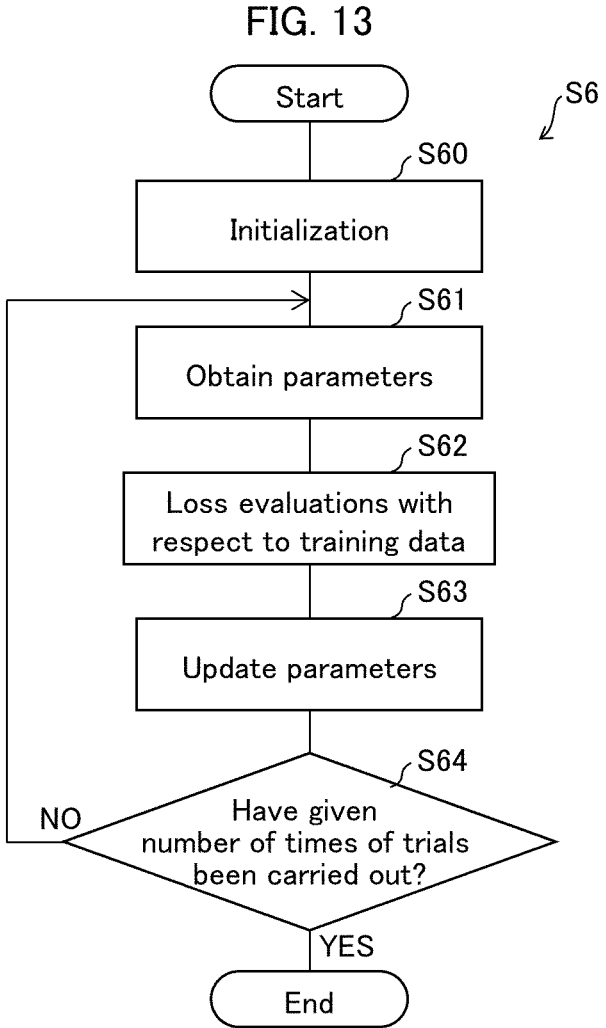
FIG. 13 is a flowchart illustrating an example of a flow of a training method which is carried out by an information processing apparatus in accordance with a third example embodiment of the present invention and which is a method of training a method of estimating levels of importance of data.

A detailed example of a training method of causing the estimating section 32 of the information processing apparatus 3A to learn is described with reference to a drawing. FIG. 13 is a flowchart illustrating an example of a flow of a training method (information processing method) S6 which is carried out by the information processing apparatus 3A in accordance with the third example embodiment and which is a method of training a method of estimating levels of importance of respective regions included in data.

First, in a step S60, a control section 30 initializes data of a self-attention module.

Next, in a step S61, the control section 30 obtains parameters of the self-attention module. The parameters obtained in the first simulation are parameters which have been arbitrarily set and inputted by a user.

Next, in a step S62, the control section 30 carries out simulations, and carries out loss evaluations with respect to training data. Each of the simulations carried out is a simulation of autonomous operation. The evaluating section 34 derives a loss value from a result of each of the simulations. That is, the loss value derived from an output from a controller is an evaluation value. A detailed flow of the loss evaluations is described later with reference to another drawing.

Next, in a step S63, the control section 30 updates the parameters of the self-attention module. Specifically, the training section 35 updates the parameters of the self-attention module so that accumulated loss values become low. That is, the training section 35 trains the estimating section 32 so that the loss value becomes low.

Next, in a step S64, the control section 30 determines whether or not a given number of times of trials of simulation evaluations have been carried out. In a case where it is determined, in the step S64, that the given number of times of trials of the simulation evaluations have been carried out (step S64: YES), a training flow is ended. On the other hand, in a case where it is determined that the given number of times of trials of the simulation evaluations have not been carried out (step S64: NO), the flow returns to the step S61. In the step S61, the estimating section 32 obtains the parameters updated in the step S63.

Figure 14:
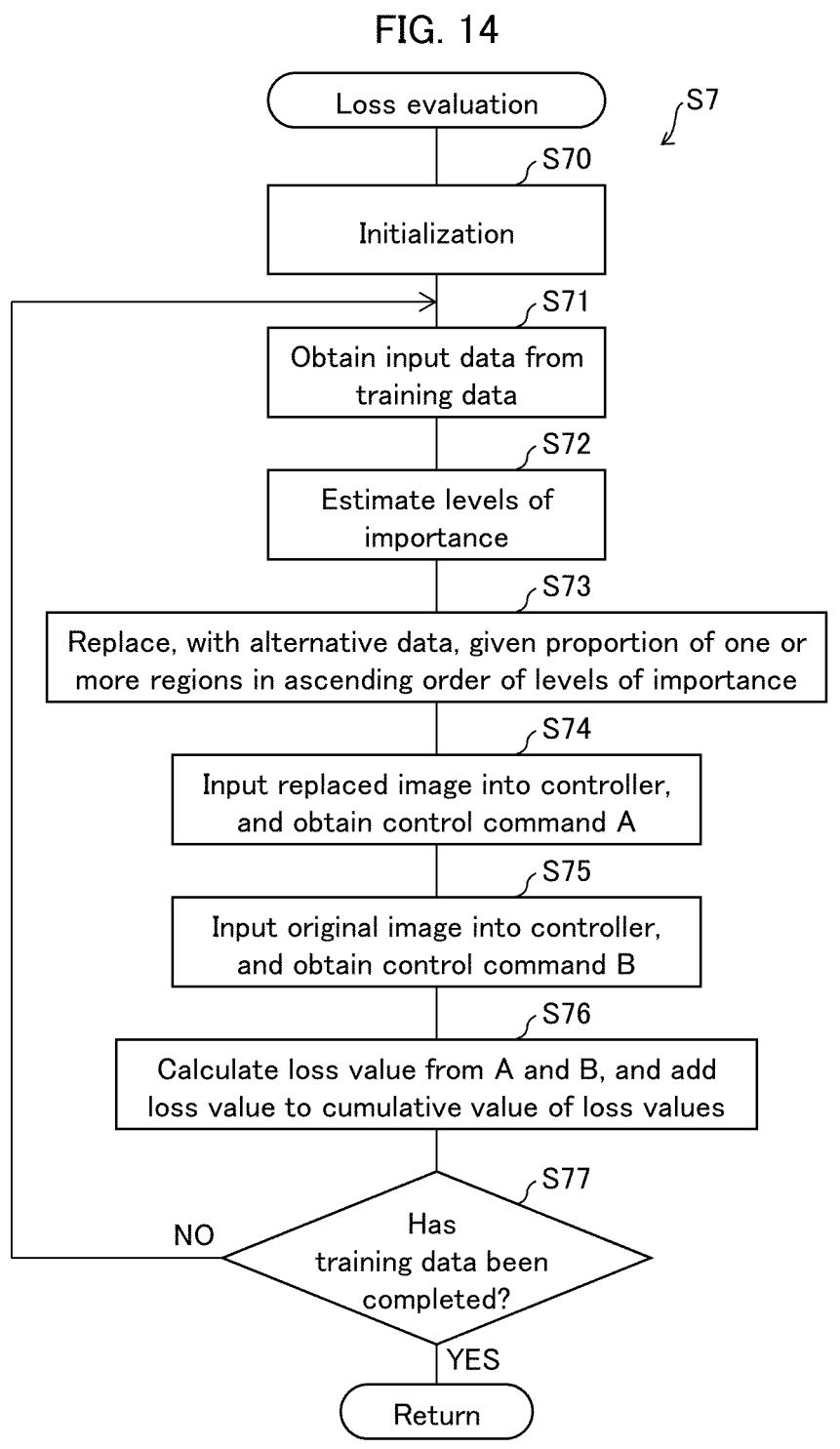
FIG. 14 is a flowchart of a loss evaluating step illustrated in FIG. 13.

Next, a detailed flow of the loss evaluating step in the step S62 is described with reference to a drawing. FIG. 14 is a flowchart of a loss evaluating method S7. The loss evaluations are carried out with use of an autonomous operation simulator.

First, in a step S70, the control section 30 initializes data of the autonomous operation simulator.

Next, in a step S71, the control section 30 obtains input data from training data. Specifically, as the input data, the estimating section 32 obtains, for example, frame data that has been selected from a simulated video which is of an in-vehicle camera and which is training data, via an obtaining section 31.

Next, in a step S72, the control section 30 estimates levels of importance of the obtained input data. Specifically, the estimating section divides the frame data into a plurality of regions, and estimates the levels of importance with respect to the respective plurality of regions with use of the self-attention module.

Next, in a step S73, the control section 30 replaces, with alternative data, a given proportion of one or more regions in ascending order of the levels of importance. Specifically, it is assumed that the given proportion is set to, for example, 40%. In this case, a replacing section 33 selects one or more regions in ascending order of the levels of importance. In a case where the total data size of the selected one or more regions (or the total image area of the selected one or more regions) reaches 40% or more of all the regions, the replacing section 33 stops the selection. Then, the replacing section 33 replaces all the selected one or more regions with the alternative data.

Next, in a step S74, the evaluating section 34 inputs a replaced image into an autonomous operation controller, and obtains a control command A outputted by the autonomous operation controller.

Next, in a step S75, the evaluating section 34 inputs an original image (image before replacement) into the autonomous operation controller, and obtains a control command B outputted by the autonomous operation controller.

Next, in a step S76, the evaluating section 34 calculates a loss value from the control command A and the control command B, and adds the loss value to a cumulative value of loss values. Cumulation of loss values means, for example, adding, to the sum of loss values obtained in a case where the first to the n−1-th (n is an integer of 2 or more) input data are used, a loss value obtained in a case where the n-th input data is used. That is, a cumulative value of loss values obtained in a case where up to the n-th input data are used is calculated by adding, to the sum of the loss values obtained in a case where the first to the n−1-th input data are used, the loss value obtained in a case where the n-th input data is used.

Next, in a step S77, the control section 30 determines whether or not all the training data has been completed. That is, the control section 30 determines whether or not all frame data selected from the simulated video have been subjected to the above replacing process and inputted into the controller. In a case where it is determined in the step S77 that all the training data has been completed (step S77: YES), the flow ends the loss evaluations, and proceeds to the step S63 in FIG. 13. In a case where it is determined in the step S77 that all the training data has not been completed (step S77: NO), the flow returns to the step S71.

(Detailed Examples of Steps S74 to S76)

Detailed examples of the steps S74 to S76 are described. Note, however, that the detailed examples do not limit to the present embodiment. A control command outputted in a case where an image is inputted into the autonomous operation controller includes, for example, three types of commands: a throttle opening command (acceleration command); a brake strength command (deceleration command); and a steering command (direction change command). In this case, it is assumed that a control command outputted in a case where an image before replacement is inputted includes an acceleration command of 0.0, a deceleration command of 1.0, and a direction change command of 0.0. Then, it is assumed that a control command outputted in a case where a replaced image is inputted includes an acceleration command of 0.5, a deceleration command of 0.0, and a direction change command of −0.1. In this case, the evaluating section 34 can use, for example, a mean square sum as the loss value. That is, it is possible to evaluate a loss as follows:

$$\text{loss value}=((0.5-0.0)^2+(0.0-1.0)^2+(-0.1-0.0)^2)/$$
$$3=0.42$$

(in the above equation, the symbol "/" represents a division).
(Second Modification of Training Method)

Instead of the loss evaluating flow illustrated in FIG. 14, a loss evaluating flow as follows may be used. That is, in the loss evaluating method S7 described with reference to FIG. 14, the proportion of the one or more regions to be replaced with the alternative data is fixed to a given value. However, for the reason described in the first modification of the training method in accordance with the second example embodiment, it is preferable to set a plurality of replacement proportions, carry out the loss evaluations, and average results of the loss evaluations. This method is described below.

Figure 15:
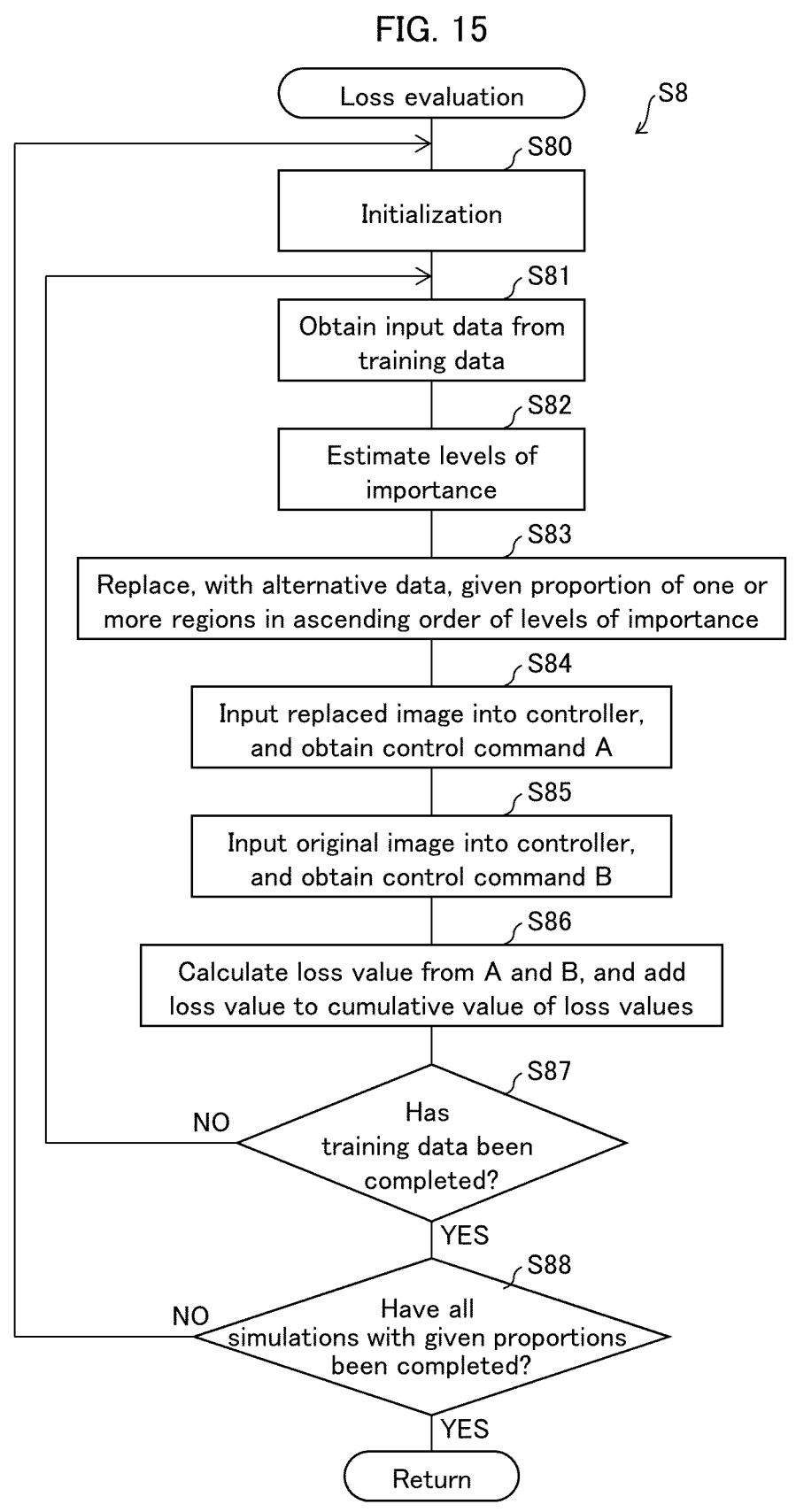
FIG. 15 is a flowchart of another example of the loss evaluating step illustrated in FIG. 13.

FIG. 15 is a detailed flowchart of a loss evaluating method S8 which is a modification of the simulation evaluating step. In the loss evaluations, a plurality of replacement proportions are set in advance. For example, the replacement proportions are set in three patterns, i.e., 10%, 30%, and 40%. Then, the number of times of simulations carried out with each of the replacement proportions is determined. For example, two times of simulations are carried out with a replacement proportion of 10%, two times of simulations are carried out with a replacement proportion of 30%, and two times of simulations are carried out with a replacement proportion of 40%. The replacing section 33 generates replaced data for each of the plurality of given proportions which differ from each other. Then, the evaluating section 34 derives a preliminary loss value with respect to each replaced data generated by the replacing section 33, and derives an evaluation value by averaging preliminary loss values. The preliminary loss value is a loss value which is obtained by carrying out an evaluation with a single replacement proportion. Then, an average of the preliminary loss values derived with all the replacement proportions is used as a final evaluation value.

Under the above assumption, steps S80 to S87 are the same as the steps S70 to S77, respectively, in the flowchart of FIG. 14. A difference is that, in a case where a determination of YES is made in the step S87, the flow proceeds to a step S88. In the step S88, the control section 30 determines whether or not all the simulations with the given proportions have been completed. In a case where it is determined in the step S88 that all the simulations have been completed (step S88: YES), the loss evaluating step is ended, and the flow proceeds to the step S63 in FIG. 13. In a case where it is determined in the step S88 that all the simulations have not been completed (step S88: NO), the flow returns to the step S80. Then, a given proportion with which a simulation has not been completed is set, and the simulation step is repeated. The training methods S6, S7, and S8 described above allow the estimating section 32 to learn a method of estimating levels of importance of respective regions included in data.

According to the information processing apparatus 3A and the information processing methods S6, S7, and S8 in accordance with the third example embodiment described above, it is possible to provide a technique which makes it possible to suitably estimate an important region and a non-important region in an image.

Fourth Example Embodiment

The following description will discuss, in detail, a fourth example embodiment of the present invention with reference to drawings. A configuration of an information processing apparatus 5 in accordance with the fourth example embodiment is the same as that of the information processing apparatus 3 described in the second example embodiment. Thus, a description of the configuration of the information processing apparatus 5 is omitted. In the following description, elements of the information processing apparatus 5 are described with use of the same reference signs as those of the elements of the information processing apparatus 3.

In the information processing apparatus 5 in accordance with the present embodiment, an evaluating section 34 derives an evaluation value further with reference to a data size of replaced data. Then, a training section 35 trains an estimating section 32 so that the replaced data has a small data size. Even in a case where one or more regions with respect to which low levels of importance have been estimated by the estimating section 32 trained with use of a reward, a loss value, or the like are replaced with noise or the like, the data size is not necessarily reduced in some cases. For example, even in a case where the sky and the like each of which changes a little are replaced with noise, such replacement may not contribute to a reduction in data size. Replacing, with noise, one or more regions which have low levels of importance is for reducing the data size. Therefore, it is impossible to achieve the purpose. Therefore, it may be preferable to cause the estimating section 32 to learn an estimating method in consideration of the data size after replacement.

(Detailed Example of Training Method)

Figure 16:
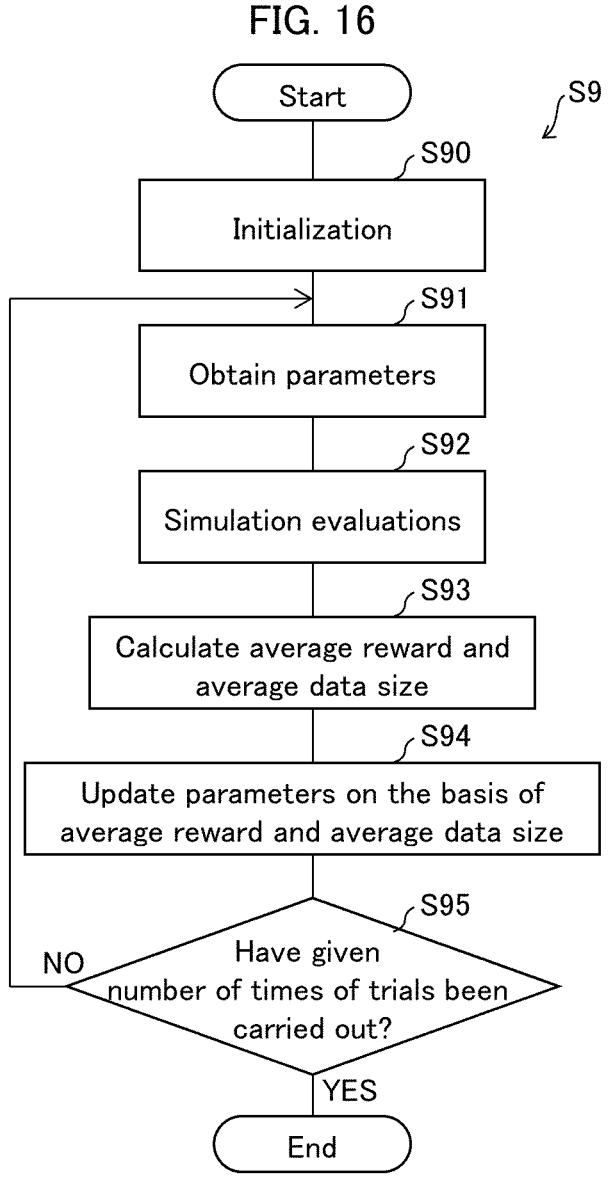
FIG. 16 is a flowchart illustrating an example of a flow of a training method which is carried out by an information processing apparatus in accordance with a fourth example embodiment of the present invention and which is a method of training a method of estimating levels of importance of respective regions included in data.

A detailed example of a training method of causing the estimating section 32 of the information processing apparatus 5 to learn is described with reference to a drawing. FIG. 16 is a flowchart illustrating an example of a flow of a training method (information processing method) S9 which is carried out by the information processing apparatus 5 in accordance with the fourth example embodiment and which is a method of training a method of estimating levels of importance of data.

First, in a step S90, a control section 30 initializes data of a self-attention module.

Next, in a step S91, the control section 30 obtains parameters of the self-attention module. The parameters obtained in the first simulation are parameters which have been arbitrarily set and inputted by a user.

Next, in a step S92, the control section 30 carries out simulations, and evaluates the simulations. In the present embodiment, each of the simulations carried out is a simulation of autonomous operation. The control section 30 derives a reward value and a data size from a result of each of the simulations. A detailed flow of the above simulation evaluations is described later with reference to another drawing.

Next, in a step S93, the evaluating section 34 calculates an average reward and an average data size. The average reward is as described in the second example embodiment. The data size is a data size after replacement. The average data size is obtained by averaging data sizes obtained in the plurality of times of simulation evaluations. In this case, in a case where it is assumed that the average reward is represented by Ra, the average data size is represented by Va, and a given coefficient is represented by α (α>0), an evaluation value is represented by $$Ra-\alpha Va.$$

That is, as the average data size becomes smaller, the evaluation value becomes higher. Note, here, that a detailed value of the given coefficient can be set as appropriate in accordance with, as an example, a possible range of the average reward, a possible range of the average data size, a desired data size after encoding, and the like. However, this example does not limit the present example embodiment.

Next, in a step S94, the control section 30 updates the parameters of the self-attention module. Specifically, the training section 35 updates the parameters, on the basis of the evaluation value derived from the average reward and the average data size in the step S93, so that the evaluation value become higher.

Next, in a step S95, the control section 30 determines whether or not a given number of times of trials of the simulation evaluations have been carried out. In a case where it is determined, in the step S95, that the given number of times of trials of the simulation evaluations have been carried out (step S95: YES), a training flow is ended. On the other hand, in a case where it is determined that the given number of times of trials of the simulation evaluations have not been carried out (step S95: NO), the flow returns to the step S91. In the step S91, the control section 30 obtains the parameters updated in the step S94.

Figure 17:
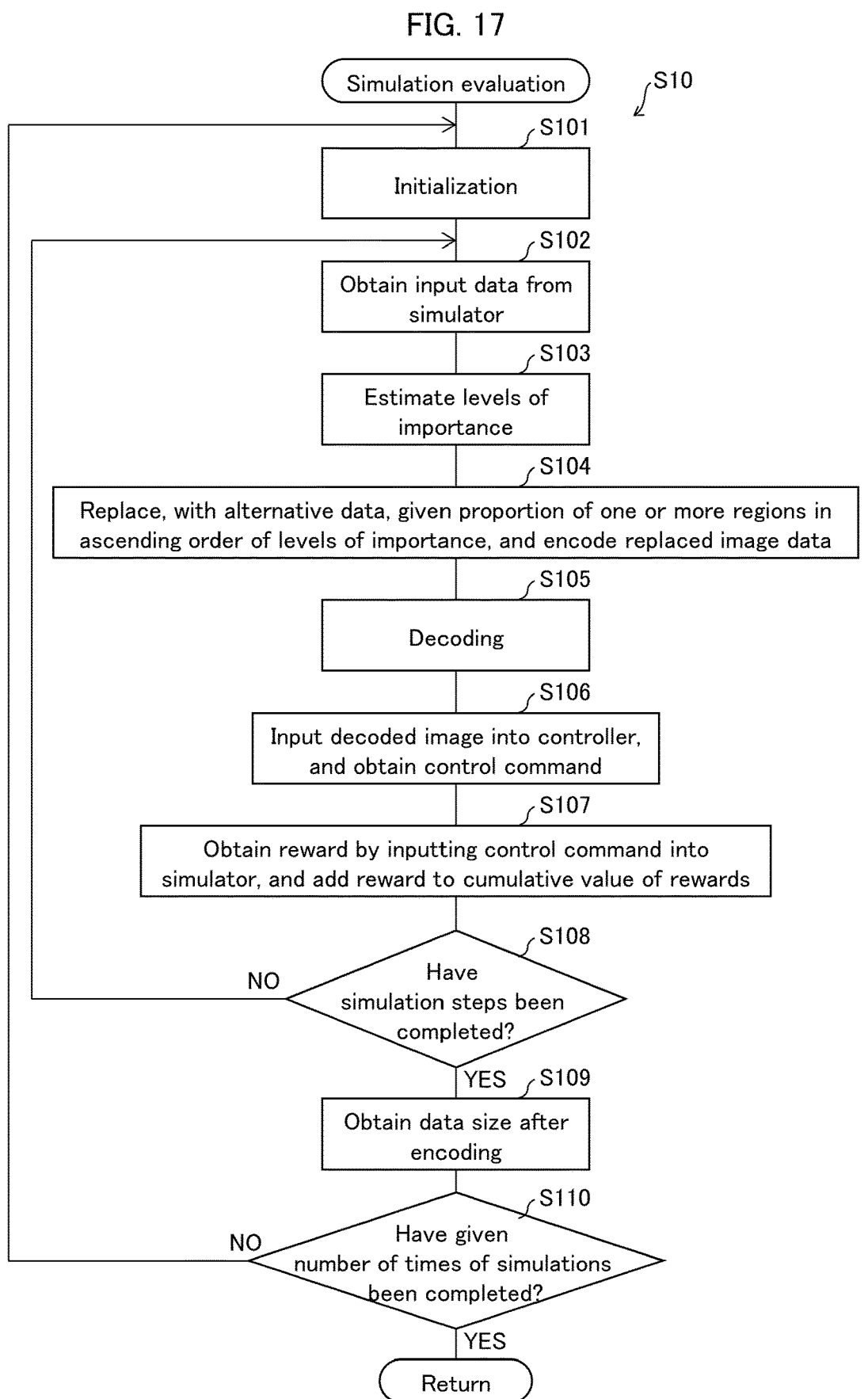
FIG. 17 is a flowchart of a simulation evaluating step illustrated in FIG. 16.

Next, a detailed flow of the simulation evaluating step in the step S92 is described with reference to a drawing. FIG. 17 is a flowchart of a simulation evaluating method S10. In the present embodiment, the simulation evaluations are carried out with use of an autonomous operation simulator.

First, in a step S101, the control section 30 initializes data of the autonomous operation simulator.

Next, in a step S102, the control section 30 obtains input data from the autonomous operation simulator. Specifically, the obtaining section 31 obtains, as the input data, simulated video data from the autonomous operation simulator, and transmits the simulated video data to the estimating section 32.

Next, in a step S103, the control section 30 estimates levels of importance of respective regions of the obtained input data. Specifically, the estimating section 32 divides, into a plurality of regions, frame data that is included in the video data, and estimates the levels of importance with respect to the respective plurality of regions with use of the self-attention module.

Next, in a step S104, the control section 30 replaces, with alternative data, a given proportion of one or more regions in ascending order of the levels of importance. Then, the control section 30 replaces all the selected one or more regions with the alternative data. Subsequently, the control section 30 encodes replaced image data.

Next, in a step S105, the control section 30 decodes the encoded data. That is, the control section 30 returns the encoded data to the replaced image data.

Next, in a step S106, the control section 30 inputs the decoded image data into an autonomous operation controller, and then obtains a control command.

Next, in a step S107, the control section 30 obtains a reward by inputting the control command into the autonomous operation simulator, and adds the reward to a cumulative value of rewards. Cumulation of rewards is as described in the first example embodiment.

Next, in a step S108, the control section 30 determines whether or not all simulation steps have been completed. That is, the control section 30 determines whether or not all simulated videos possessed by the autonomous operation simulator have been subjected to the above replacing process and inputted into the controller. In a case where it is determined in the step S108 that all the simulation steps have been completed or that an accident has occurred (step S108: YES), the flow proceeds to a step S109. In a case where it is determined in the step S108 that all the simulation steps have not been completed (step S108: NO), the flow returns to the step S102.

In the step S109, the control section 30 obtains a data size after encoding. Specifically, the evaluating section 34 obtains the data size of the replaced image data which has been encoded in the step S104.

In a step S110, the control section 30 determines whether or not a given number of times of simulations have been completed. The given number of times is, for example, a number of times that is sufficient to calculate an average reward and an average data size after encoding. In a case where it is determined in the step S110 that the given number of times of simulations have been completed (step S110: YES), the simulation evaluating step is ended, and the flow proceeds to the step S93 in FIG. 16. In a case where it is determined in the step S110 that the given number of times of simulations have not been completed (step S110: NO), the flow returns to the step S101.

According to the information processing apparatus 5 and the information processing methods S9 and S10 in accordance with the fourth example embodiment described above, it is possible to provide a technique which makes it possible to suitably estimate an important region and a non-important region in an image.

Fifth Example Embodiment

The following description will discuss, in detail, a fifth example embodiment of the present invention with reference to drawings. The present example embodiment is one example embodiment of an image display system. An image display system 10b in accordance with the present example embodiment estimates levels of importance and quality parameters with respect to a respective plurality of regions included in an obtained image, and then determines quality parameters with reference to the estimated levels of importance and the estimated quality parameters. The image display system 10b transmits encoded data that has been encoded with use of the determined quality parameters, and displays the encoded data in a display section.
(Configuration of Image Display System)

Figure 18:
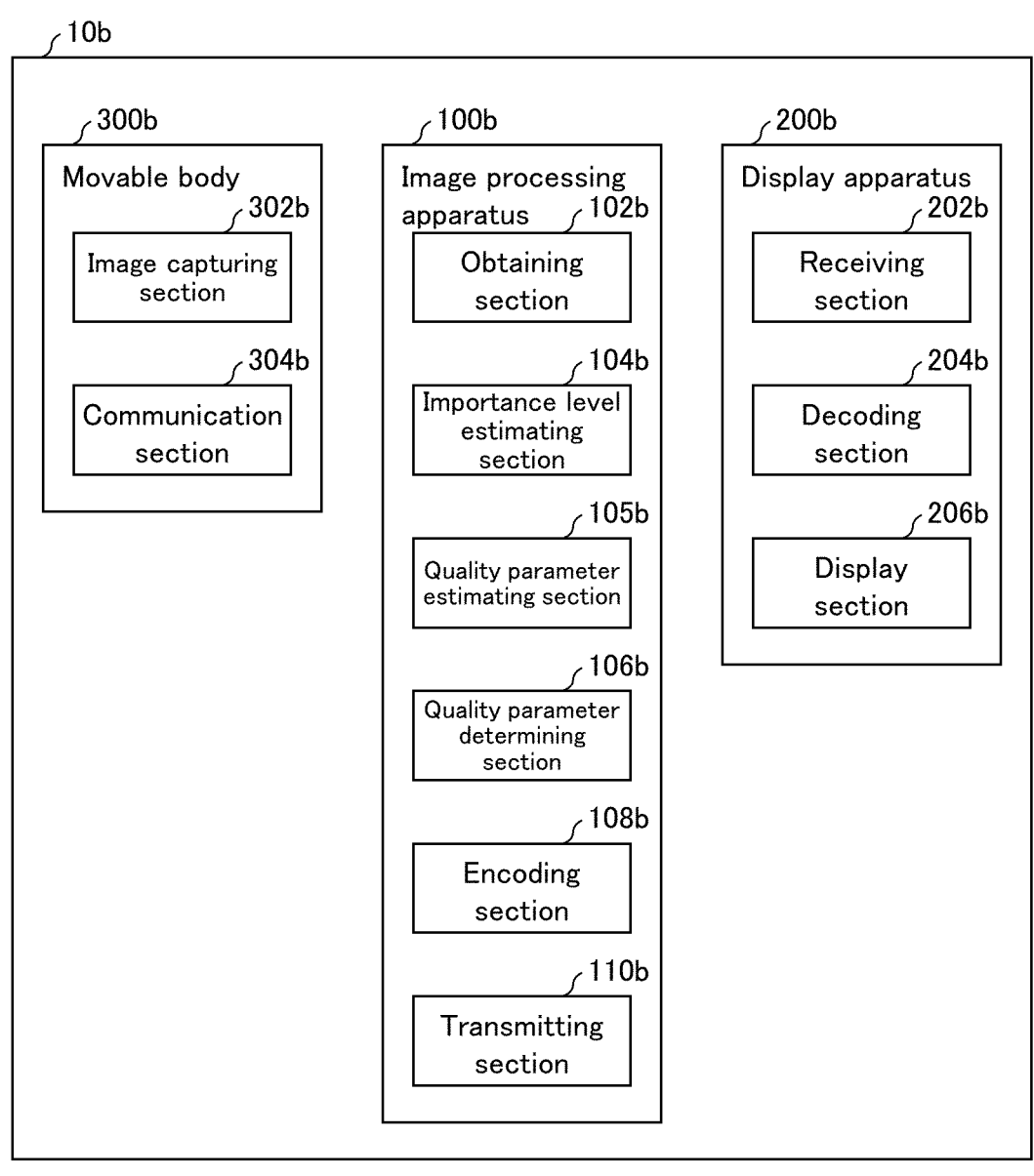
FIG. 18 is a block diagram illustrating a configuration of an image processing system in accordance with a fifth example embodiment of the present invention.

A configuration of the image display system 10b in accordance with the fifth example embodiment is described with reference to FIG. 18. FIG. 18 is a block diagram illustrating the configuration of the image display system 10b. As illustrated in FIG. 18, the image display system 10b includes an image processing apparatus 100b, a display apparatus 200b, and a movable body 300b.

As an example, the image display system 10b can be used to remotely control a movable body such as a self-driving vehicle, a robot, or a drone. In such remote control, for example, an image which has been captured by a camera provided to the movable body is processed by the image processing apparatus 100b, and the processed image is transmitted to a remote location such as an operation monitoring center. The transmitted image is received by the display apparatus 200b disposed at the remote location, and is displayed by a display section 206b. This makes it possible for a person to monitor, from the remote location, whether the movable body is appropriately operated.

Note that, as the display section 206b, a liquid crystal display panel or the like each of which displays an image can be used. Note, however, that the display section 206b is not limited to this example.

The image processing apparatus 100*b* and the display apparatus 200*b* included in the image display system 10*b* are described below.

(Description of Movable Body)

In the fifth example embodiment, the movable body 300*b* is illustrated and added to the description. As illustrated in FIG. 18, the movable body 300*b* includes an image capturing section 302*b* and a communication section 304*b*. Each of these sections is described below.

The image capturing section 302*b* may be, as an example, an image capturing apparatus such as a camera. The image capturing section 302*b* may obtain a still image or may obtain a moving image. The image capturing section 302*b* preferably obtains an image which includes an angle of view in a direction of traveling of the movable body 300*b* (i.e., forward of the movable body 300*b*). However, this does not limit the present example embodiment. As an example, the image capturing section 302*b* may obtain an image which includes an angle of view of a side opposite to the direction of traveling of the movable body 300*b* (i.e., rearward of the movable body 300*b*) or may obtain an image which includes an angle of view in a direction perpendicular to the direction of traveling of the movable body (i.e., sideward of the movable body).

The communication section 304*b* transmits, to the image processing apparatus 100*b*, the image obtained by the image capturing section 302*b*. The communication section 304*b* can be configured to, as an example, include an antenna and transmit encoded data with use of wireless communication. However, this does not limit the present embodiment. Wired communication may be used or a combination of wireless communication and wired communication may be used.

(Configuration of Image Processing Apparatus)

The image processing apparatus 100*b* includes an obtaining section 102*b*, an importance level estimating section 104*b*, a quality parameter estimating section 105*b*, a quality parameter determining section 106*b*, an encoding section 108*b*, and a transmitting section 110*b*, as illustrated in FIG. 18. Each of these sections is described below.

(Obtaining Section)

The obtaining section 102*b* obtains an image. The image obtained by the obtaining section 102*b* is an image which has been captured from the movable body 300*b*. A detailed example process carried out by the obtaining section 102*b* is described later.

(Importance Level Estimating Section)

The importance level estimating section 104*b* estimates levels of importance with respect to a respective plurality of regions included in the image which has been obtained by the obtaining section 102*b*. The importance level estimating section 104*b* in accordance with the present example embodiment has a configuration similar to those of the estimating sections 11 and 21 described in the first example embodiment and the estimating sections 32 and 52 described in the second example embodiment. As an example, the importance level estimating section 104*b* can be configured with use of an inference model that has been trained by the following training process.

(Replacing Step)

At least one of a plurality of regions included in an image for training which has been obtained by the obtaining section 102*b* is replaced with alternative data in accordance with levels of importance estimated by the importance level estimating section 104*b*. This generates replaced data.

(Evaluating Step)

An evaluation value is derived by referring to the replaced data. Note, here, that, in this evaluating step, the image for training which has been obtained by the obtaining section 102*b* and which has not been replaced may be further referred to.

(Training Step)

The importance level estimating section 104*b* is trained with reference to the evaluation value. Note, here, that training of the importance level estimating section 104*b* can be carried out by updating various parameters, which are possessed by the inference model that functions as the importance level estimating section 104*b*, in accordance with the evaluation value. A detailed example process carried out by the importance level estimating section 104*b* is described later.

(Quality Parameter Estimating Section)

The quality parameter estimating section 105*b* estimates preliminary quality parameters with respect to a respective plurality of regions included in the image which has been obtained by the obtaining section 102*b*. As an example, the quality parameter estimating section 105 estimates the preliminary quality parameters so that encoding efficiency in a case where the image is encoded is improved. As an example, estimation of the preliminary quality parameters, which is carried out prior to determination of quality parameters, can be carried out with use of a moving image encoding technique such as H265. However, this does not limit the present example embodiment.

Note that, in the present example embodiment, the expression "preliminary quality parameter" is formally introduced in order not to cause literal confusion with the "quality parameter" which is determined by the quality parameter determining section 106*b* (described later). The word "preliminary" does not represent any tangible limitation in the moving image encoding technique.

In the present example embodiment, similarly to the "quality parameter", the "preliminary quality parameter" can be, as an example, a quantum parameter (QP) for specifying roughness of a quantization process that is applied to a target image.

Note also that the "plurality of regions" which are referred to by the quality parameter estimating section 105*b* do not need to be the same as the "plurality of regions" which are referred to by the importance level estimating section 104*b*. As an example, the "plurality of regions" which are referred to by the quality parameter estimating section 105*b* may be regions which are referred to as "encoding units", "macroblocks", or the like which are generated or referred to in the moving image encoding technique. Meanwhile, the "plurality of regions" which are referred to by the importance level estimating section 104*b* may be, as an example, individual attention regions which are generated or referred to by a self-attention algorithm.

A detailed process carried out by the quality parameter estimating section 105*b* is described later with reference to other drawings.

(Quality Parameter Determining Section)

The quality parameter determining section 106*b* determines quality parameters with respect to the respective plurality of regions with reference to the levels of importance and the estimated preliminary quality parameters. The quality parameter determining section 106*b* in accordance with the present example embodiment determines the quality parameters with reference to not only the levels of importance but also the preliminary quality parameters. As an example, the quality parameter determining section 106*b* can set the quality parameters so that the levels of importance which have been estimated by the importance level estimating section 104 and the preliminary quality parameters which have been estimated by the quality parameter estimating section have a positive correlation. That is, the quality parameter determining section 106b can set the quality parameters so that as the levels of importance which have been estimated by the importance level estimating section 104b become higher, the image quality of the regions becomes higher.

Note that, as described above, in general, there can be a case where the "plurality of regions" which are referred to by the quality parameter estimating section 105b and the "plurality of regions" which are referred to by the importance level estimating section 104b are not the same. In other words, there can be a case where each of the plurality of regions (e.g., regions R1a, R2a, R3a . . . ) with respect to which the quality parameter estimating section 105b gives the preliminary quality parameters does not completely overlap with each of the plurality of regions (e.g., regions Rib, R2b, and R3b) with respect to which the importance level estimating section 104b has given the levels of importance.

In such a case, the quality parameter determining section 106b can be configured to determine a quality parameter of each region with respect to which the quality parameter estimating section 105b has given a preliminary quality parameter, with reference to a region which is included in or overlaps with the region and with respect to which the importance level estimating section 104b has given the level of importance.

As an example, the quality parameter determining section 106b can be configured such that, in a case where the regions R1b and R2b with respect to which the importance level estimating section 104b has given levels of importance are included in or overlap the region R1a with respect to which the quality parameter estimating section 105b has given a preliminary quality parameter, the quality parameter determining section 106b determines a quality parameter of the region R1a with reference to at least one of the levels of importance which have been given to the regions R1b and R2b.

(Encoding Section)

The encoding section 108b generates encoded data by encoding the target image with use of the quality parameters determined by the quality parameter determining section 106b.

(Transmitting Section)

The transmitting section 110b transmits the encoded data generated by the encoding section 108b.

The transmitting section 110b can be configured to, as an example, include an antenna and transmit the encoded data with use of wireless communication. However, this does not limit the present embodiment. Wired communication may be used or a combination of wireless communication and wired communication may be used.

(Configuration of Display Apparatus)

The display apparatus 200b includes a receiving section 202b, a decoding section 204b, and a display section 206b.

Note that the receiving section 202b is an embodiment of a receiving means recited in the claims. The display section 206b is an embodiment of a display means recited in the claims.

The receiving section 202b receives the encoded data that has been transmitted from the transmitting section 110b.

The decoding section 204b decodes the encoded data received by the receiving section 202b, thereby converting the encoded data into image data.

A detailed decoding algorithm employed by the decoding section 204b is preferably an algorithm which corresponds to an encoding algorithm employed by the encoding section 108b. However, this does not limit the present example embodiment. The decoding section 204b can also employ a configuration such that the decoding section 204b carries out a decoding process with respect to each of the plurality of regions with reference to a corresponding one of the quality parameters which have been determined by the quality parameter determining section 106b with respect to the respective plurality of regions and which are included in the encoded data.

This causes the quality of the image obtained after decoding by the decoding section 204b to correspond to the quality parameters which have been determined by the quality parameter determining section 106b.

The display section 206b displays the image obtained after decoding by the decoding section 204b.

(Effect of Image Display System)

According to the image display system 10b configured as described above, the image processing apparatus 100b is capable of specifying, in accordance with a corresponding level of importance, roughness of an encoding process with respect to each of a plurality of regions included in a target image which has been captured from a movable body. This suitably reduces image data which has been obtained by capturing from the movable body and then encoded. It is therefore possible to suitably suppress a transmission load.

A flow of a display method in the image display system 10b in accordance with the fifth example embodiment is described below with reference to FIGS. 19 to 21.

(Description of Display Method in Image Display System)

Figures 19, 20A:
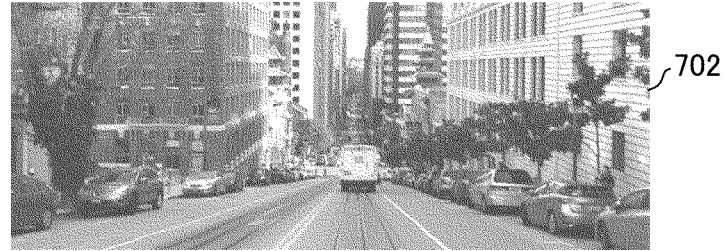
FIG. 19 is a flowchart illustrating a flow of an image processing method in accordance with the fifth example embodiment of the present invention.
FIG. 20A is a drawing illustrating an example of an image obtained in a step S102*b* of the processing method in accordance with the fifth example embodiment of the present invention.

FIG. 19 is a flowchart illustrating the flow of the display method in the image display system 10b in accordance with the fifth example embodiment. FIG. 19 shows a flowchart S100b which illustrates a flow of a process in the image processing apparatus 100b and a flowchart S200b which illustrates a flow of a process in the display apparatus 200b. As illustrated in FIG. 19, the flowchart S100b which illustrates the flow of the process in the image processing apparatus 100b in accordance with the fifth example embodiment includes steps S102b to S110b.

The flowchart S200b which illustrates the flow of the process in the display apparatus 200b in accordance with the fifth example embodiment includes steps S202b, S204b, and S206b.

Figures 20B, 20C, 21A:
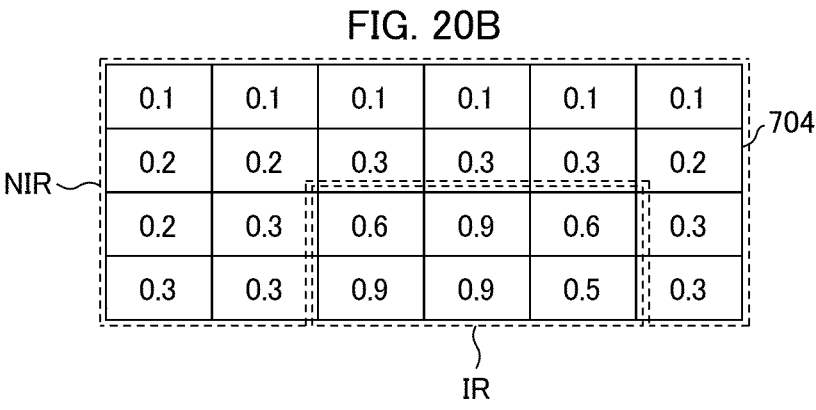
FIG. 20B is a schematic view illustrating examples of levels of importance estimated in a step S104*b* in accordance with the fifth example embodiment of the present invention.
FIG. 20C is a schematic view illustrating preliminary quality parameters estimated in a step S105*b* in accordance with the fifth example embodiment of the present invention.
FIG. 21A is a flowchart illustrating an example process 1 in a flow S106*b* of the processing method in accordance with the fifth example embodiment of the present invention.

FIGS. 20A to 20C are drawings each illustrating a detailed example of the display method in the image display system 10b in accordance with the fifth example embodiment. An image and schematic views illustrated in these drawings have correspondence with each other. An image 702 illustrated in FIG. 20A is an example of an image which has been captured from the movable body and which has been obtained by the obtaining section 102b in the step S102b. A schematic view 704 illustrated as FIG. 20B shows levels of importance which have been estimated by the importance level estimating section 104b in the step S104b with respect to a respective plurality of regions. A schematic view 706 illustrated as FIG. 20C shows preliminary quality parameters which have been estimated by the quality parameter estimating section 105b in the step S105b with respect to the respective plurality of regions. A flow of an example process is described later with reference to these drawings.

FIGS. 21A and 21B each show an example process in the step S106b of the display method in the image display system 10b in accordance with the fifth example embodiment. A flowchart S1060a illustrated as FIG. 21A shows a flow of the example process of determining quality parameters in the step S106b illustrated in FIG. 19. A schematic view 802 illustrated as FIG. 21B shows quality parameters determined by the example process in the step S106b with respect to the respective plurality of regions in the schematic view 706 illustrated as FIG. 21C.

The flow of the display method in the image display system 10b in accordance with the fifth example embodiment is described below with reference to FIGS. 19 to 21.

(Description of Flow of Process in Image Processing Apparatus)

(Step S102b)

In the process in the image processing apparatus 100b in accordance with the fifth example embodiment, in the step S102b, the obtaining section 102b obtains a captured image. A configuration of the obtaining section 102b in accordance with the present example embodiment is similar to the configuration of the obtaining section 10 described in the first example embodiment. Thus, the description already described is omitted.

An example of the image obtained in this step S102b is shown in FIG. 20A as the image 702. The image 702 is an image which has been captured by the image capturing section 302 of the movable body 300b. In this detailed example, the movable body 300b is a traveling vehicle. The image 702 is a still image which includes an angle of view of the direction of traveling of the movable body 300b (traveling vehicle) (i.e., forward of the movable body 300b). In the vicinity of a central part of the image 702, a preceding vehicle which travels ahead is shown.

(Step S104b)

In the process in the image processing apparatus 100b in accordance with the fifth example embodiment, in the step S104b, the importance level estimating section 104b estimates levels of importance with respect to a respective plurality of regions included in the image. A process carried out by the importance level estimating section 104b in this step includes a process similar to that described in connection with the image display system 10b. Therefore, the description already described is omitted.

Examples of the levels of importance which have been estimated by the importance level estimating section 104b in this step S104b are illustrated as the schematic view 704 in FIG. 20B. The importance level estimating section 104b divides the image 702, which has been obtained in the step S102b, into, as an example, 24 regions with 6 columns and 4 rows as illustrated in the schematic view 704 in FIG. 20B, and then estimates the levels of importance with respect to the respective 24 regions.

In this importance level estimating process, the importance level estimating section 104b classifies each of the plurality of regions, which are included in the image 702 that has been obtained in the step S102b, into one of an important region (IR) and a non-important region (NIR) in accordance with a corresponding one of the levels of importance.

As an example, the importance level estimating section 104b classifies the 24 regions of the image 702 into 6 important regions (IR) and the other non-important regions (NIR), as illustrated in the schematic view 704 illustrated in FIG. 20B. The 6 important regions (IR) include (i) regions in which the preceding vehicle is shown and (ii) regions in the vicinities thereof.

The importance level estimating section 104b gives, to a region which is the highest in level of importance (regions in which the preceding vehicle is shown), a level of importance which has the highest value (in this schematic view 704, 0.9 shown in three regions). Similarly, the importance level estimating section 104b gives, to a region which has been estimated as being relatively high in level of importance (regions in the vicinities of the regions in which the preceding vehicle is shown), a relatively high level of importance (in this schematic view 704, 0.5 and 0.6 shown in the other three regions).

Further, the importance level estimating section 104b gives, to a region which has been estimated as being the lowest in level of importance (regions in the top row in the schematic view 704), a level of importance which has the lowest value (0.1 in the schematic view 704). The importance level estimating section 104b gives a level of importance which has a low value (0.2 in the schematic view 704) to a region which has been estimated by the importance level estimating section 104b as being low in level of importance among the other non-important regions (NIR) and which is far from the important regions (IR) among such target regions. The importance level estimating section 104b gives a level of importance which has a relatively low value (0.3 in the schematic view 704) to a region which has been estimated as being relatively low in level of importance and which is adjacent to the important regions (IR).

(Step S105b)

In the process in the image processing apparatus 100b in accordance with the fifth example embodiment, in the step S105b, the quality parameter estimating section 105b estimates preliminary quality parameters with respect to the respective plurality of regions included in the image. As an example, the quality parameter estimating section 105b estimates the preliminary quality parameters so that encoding efficiency in a case where the image is encoded is improved. The quality parameter estimating section 105b in accordance with the present example embodiment is similar to, in the process, the quality parameter estimating section 105b described in connection with the configuration of the image processing apparatus 100b of the fifth example embodiment. Therefore, the description already described is omitted.

Examples of the preliminary quality parameters which have been estimated by the quality parameter estimating section 105b in this step S105b are illustrated as the schematic view 706 in FIG. 20C. The quality parameter estimating section 105b divides the image 702, which has been obtained in the step S102b, into, as an example, 24 regions with 6 columns and 4 rows as illustrated in the schematic view 706 of FIG. 20C, and then estimates the preliminary quality parameters with respect to the respective 24 regions. Here, in the detailed examples illustrated in FIGS. 20A to 20C, the "plurality of regions" which are referred to by the quality parameter estimating section 105b and the "plurality of regions" which are referred to by the importance level estimating section 104b are divided in 24 regions with 6 columns and 4 rows in the same manner. However, this does not limit the present example embodiment. As has been described, in general, these "plurality of regions" can differ from each other.

Note that, in the example illustrated in the schematic view 706 of FIG. 20C, the regions which have been given smaller quality parameters are higher in quality than the regions which have been given larger quality parameters. That is, in the schematic view 706, the quality of the regions which have been given the quality parameters indicated by 40 is the lowest. The quality of the regions which have been given the quality parameters indicated by 10 are the highest.

(Step S106b)

In the process in the image processing apparatus 100b in accordance with the fifth example embodiment, in the step S106b, the quality parameter determining section 106b determines quality parameters with respect to the respective plurality of regions with reference to the levels of importance which have been estimated by the importance level estimating section 104b and the preliminary quality parameters which have been estimated by the quality parameter estimating section 105b.

In the present example embodiment, the step S106b is described with reference to a detailed example.

(Example Process in Step S106b)

FIG. 21A illustrates the flowchart showing the example process in the step S106b (in some cases, this example process is denoted by a reference sign "S1060a") and the schematic view 802. Hereinafter, the example process S1060a is described in more detail with reference to FIG. 21A.

(Step S1061a)

This step S1061a is a start of a loop process with respect to the plurality of regions. In the loop process, each of the plurality of regions included in the target image is sequentially processed in given order.

(Step S1062a)

Subsequently, in a step S1062a, the quality parameter determining section 106b determines whether or not a level of importance of a target region is equal to or higher than a threshold. Here, the target region refers to a region to be processed, out of the plurality of regions with respect to which the quality parameter estimating section 105b has estimated the preliminary quality parameters. In a case where the level of importance of the target region is equal to or higher than the threshold (corresponding to YES in this determining step), the quality parameter determining section 106b does not carry out any process with respect to the target region, and the process proceeds to a next process. That is, in the target region which has the level of importance that is equal to or higher than the threshold, a preliminary quality parameter is determined, as it is, as a quality parameter. In a case where the level of importance of the target region is not equal to or higher than the threshold (i.e., a value of the level of importance is lower than the threshold) (corresponding to NO in the determining step), the process proceeds to a step S1063a.

Note that, as an example, a detailed value of the threshold can be determined in advance in accordance with a desired encoded data volume. However, this does not limit the present example embodiment.

The schematic view 802 illustrated as FIG. 21B shows how, in this example process, the quality parameters have been determined in the respective regions illustrated in the schematic view 706 of FIG. 20C. As illustrated in the schematic view 802 of FIG. 21B, in the important regions (IR), the preliminary quality parameters shown in the schematic view 706 of FIG. 20C are set, as they are, as quality parameters. That is, in the target region which has the level of importance that is equal to or higher than the threshold (important region IR), the preliminary quality parameter is determined, as it is, as the quality parameter.

(Step S1063a)

In the step S1063a, the quality parameter determining section 106b determines the quality parameter so that the image quality of the target region is reduced. That is, in the target region which has the level of importance that is lower than the threshold, the quality parameter which has a value that is higher than a value of the preliminary quality parameter given to the target region is given to the target region.

As illustrated in the schematic view 802 of FIG. 21B, as an example, the quality parameter determining section 106b gives, to the respective regions included in the non-important regions (NIR), the quality parameters which have values higher than those of the preliminary quality parameters shown in the schematic view 706 of FIG. 20C.

(Step S1065a)

This step S1065a is an end of the loop process with respect to the plurality of regions.

Here, a step subsequent to the step S106b is described with reference to FIG. 19.

(Step S108b)

In the process in the image processing apparatus 100b in accordance with the fifth example embodiment, in the step S108b, the encoding section 108b encodes the image into encoded data with use of the quality parameters which have been determined by the quality parameter determining section 106b.

(Step S110b)

In the process in the image processing apparatus 100b in accordance with the fifth example embodiment, in the step S110b, the transmitting section 110b transmits the encoded data that has been encoded by the encoding section 108. A process carried out by the transmitting section 110b in this step is the same as that carried out by the transmitting section 110b described in connection with the configuration of the image processing apparatus 100b in accordance with the third example embodiment. Thus, a detailed description of the process is omitted.

(Description of Flow of Process in Display Apparatus)

The flow of the process in the display apparatus 200b is described below step-by-step.

(Step S202b)

In the process in the display apparatus 200b in accordance with the fifth example embodiment, in the step S202b, the receiving section 202b receives the encoded data that has been transmitted from the transmitting section 110b. Since a process carried out by the receiving section 202b in this step is similar to the process described in connection with the display apparatus 200b of the third example embodiment, a detailed description is omitted here.

(Step S204b)

In the process in the display apparatus 200b in accordance with the fifth example embodiment, in the step S204b, the decoding section 204b decodes the encoded data received by the receiving section 202b, thereby converting the encoded data into image data.

(Step S206b)

In the process in the display apparatus 200b in accordance with the fifth example embodiment, in the step S206b, the display section 206b displays the image on the basis of the image data obtained from the decoding section 204b.

(Effect of Display Method in Image Display System)

As has been described, according to the display method in the image display system 10b, it is possible to specify, in accordance with a corresponding level of importance, roughness of an encoding process with respect to each of a plurality of regions included in a target image which has been captured from a movable body. In particular, in the example process S1060a of the fifth example embodiment, image data which has been obtained by capturing from a movable body and which has been encoded is suitably reduced. Therefore, according to the display method in the image display system 10b, it is possible to suitably suppress a transmission load. Moreover, in the example process S1060b of the fifth example embodiment, it is possible to suitably suppress a transmission load by suitably reducing image data which has been obtained by capturing from a movable body and which has been encoded, and possible to display an image of an important region with high quality.

Sixth Example Embodiment (Information Processing System 500)

Figure 22:
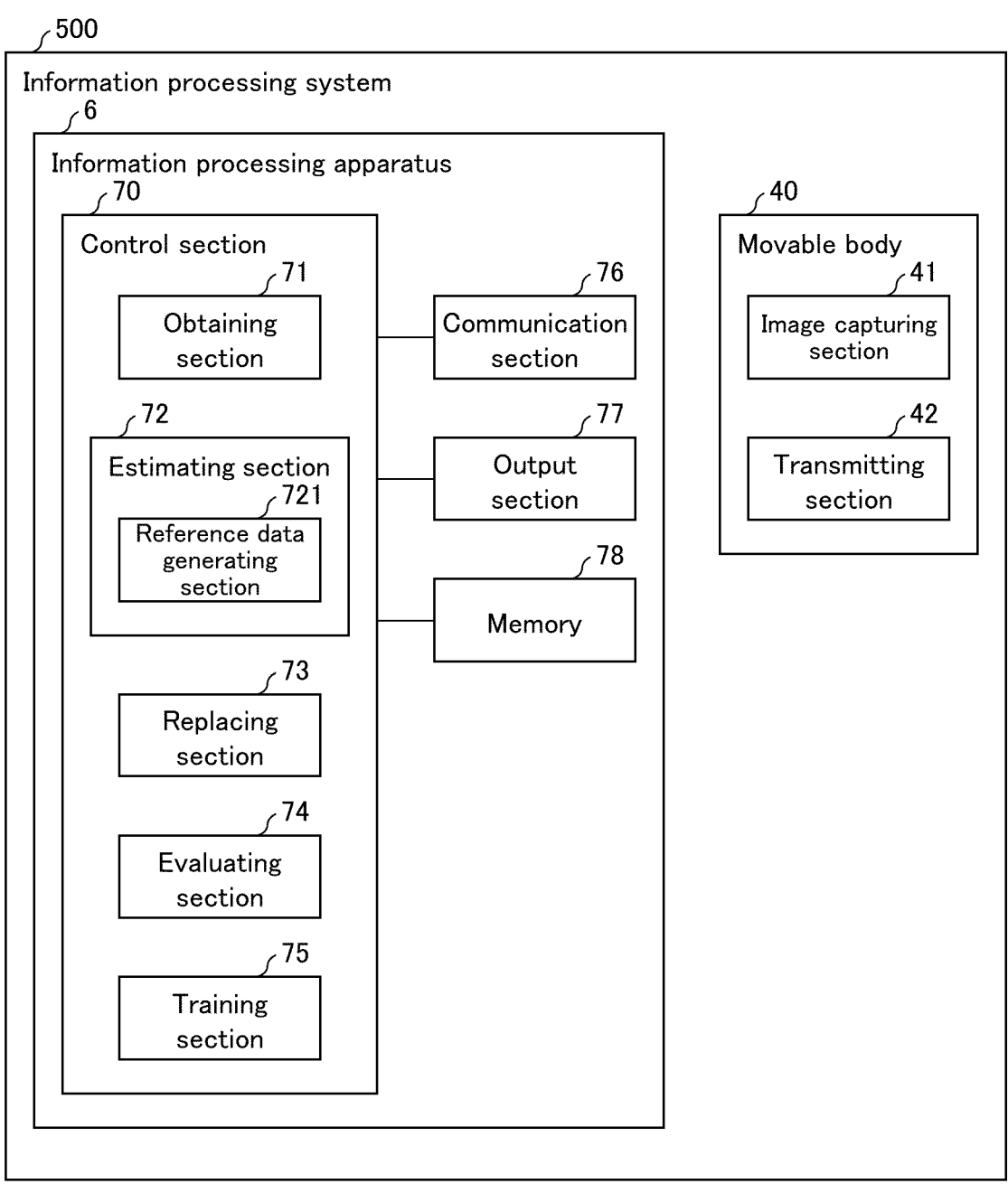
FIG. 22 is a block diagram illustrating a configuration of an information processing system in accordance with a sixth example embodiment of the present invention.

The following description will discuss, in detail, a sixth example embodiment of the present invention with reference to drawings. FIG. 22 is a block diagram illustrating a configuration of an information processing system 500 in accordance with the sixth example embodiment. As illustrated in FIG. 22, the information processing system 500 includes an information processing apparatus 6 and a movable body 40. The information processing apparatus 6 includes a control section 70, a communication section 76, an output section 77, and a memory 78. The movable body 40 includes an image capturing section (video camera) 41 and a transmitting section 42. The communication section 76, the output section 77, and the memory 78 of the information processing apparatus 6 have configurations similar to those of the communication section 36, the output section 37, and the memory 38, respectively, described in the second example embodiment, and therefore descriptions thereof are omitted. The image capturing section 41 and the transmitting section 42 of the movable body 40 have configurations similar to those of the image capturing section 41 and the transmitting section 42, respectively, described in the second example embodiment, and therefore descriptions thereof are omitted.

The control section 70 includes an obtaining section 71, an estimating section 72, a replacing section 73, an evaluating section 74, and a training section 75. The obtaining section 71, the replacing section 73, the evaluating section 74, and the training section 75 have configurations similar to those of the obtaining section 31, the replacing section 33, the evaluating section 34, and the training section 35, respectively, of the control section 30 described in the second example embodiment, and therefore descriptions thereof are omitted.

The estimating section 72 includes a reference data generating section 721, in addition to the configuration of the estimating section 32 described in the second example embodiment. With use of video data (example of input data) which has been obtained by the obtaining section 71, the reference data generating section 721 generates reference data relating to a frame indicated by the video data. The reference data is data obtained by preprocessing the video data (input data) so as to make it easier for the estimating section 72 to estimate levels of importance with respect to a respective plurality of regions of the video data.

The reference data may have an information volume that is reduced as compared with that of the video data which has not been preprocessed. In order to estimate the levels of importance with respect to the respective plurality of regions of the video data, the estimating section 72 can estimate the levels of importance with respect to respective given regions with use of the reference data obtained by reducing the information volume of the video data. That is, the estimating section 72 estimates the levels of importance with respect to the respective plurality of regions which are included in the frame indicated by the input data (video data), with use of the reference data relating to the frame.

Figure 23A:
FIG. 23A illustrates a frame of a moving image which has been captured by an image capturing section.
Figure 23B:
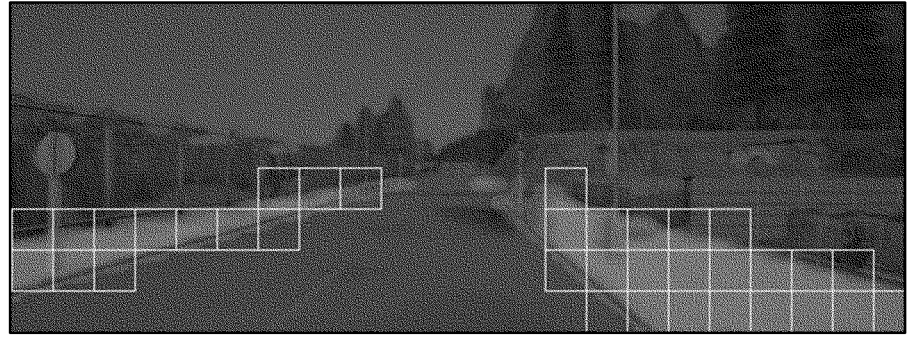
FIG. 23B illustrates an example of a result of estimating, with use of reference data, regions which are high in level of importance.
Figure 23C:
FIG. 23C illustrates an example of a drawing obtained by replacing, with alternative data, regions other than the regions which have been estimated to be high in level of importance.

FIG. 23 illustrates an example of a step in which the information processing apparatus 6 replaces one or more regions of the video data with alternative data in accordance with the levels of importance. FIG. 23A illustrates a frame of a moving image which has been captured by the image capturing section 41. FIG. 23B illustrates an example of a result obtained by the estimating section 72 estimating regions which are high in level of importance, with use of reference data generated by the reference data generating section 721. Regions enclosed by white quadrangles in FIG. 23B are regions which have been estimated to be high in level of importance by the estimating section 72. FIG. 23C illustrates an example of a drawing obtained by the replacing section 73 replacing, with alternative data, regions other than the regions which have been estimated to be high in level of importance by the estimating section 72. In an image illustrated in FIG. 23C, an image of the regions other than the regions which have been estimated to be high in level of importance are replaced with an image which has a decreased resolution.

The reference data generated or obtained by the reference data generating section 721 includes, as an example, a segmentation image obtained by applying a segmentation process to the frame. The reference data also includes, as an example, a depth map corresponding to the frame. The reference data also includes, as an example, an object detecting result obtained by applying, to the frame, a process of detecting an object. Note, however, that the type of the reference data is not limited to these examples. For example, the reference data may be data which specifies a moving object or a direction of movement of the object from a plurality of frame images. Since it is highly possible that the moving object is a vehicle or a human, a level of importance of the moving object is considered high. The estimating section 72 may estimate the levels of importance with respect to the respective plurality of regions which are included in the frame, with use of at least one or all of the above types of the reference data.

(Segmentation Process)

Figure 24A:
FIG. 24A illustrates a frame image which has not been preprocessed.
Figure 24B:
FIG. 24B illustrates an example of an image obtained by applying a segmentation process to the frame image which has not been preprocessed.
Figure 24C:
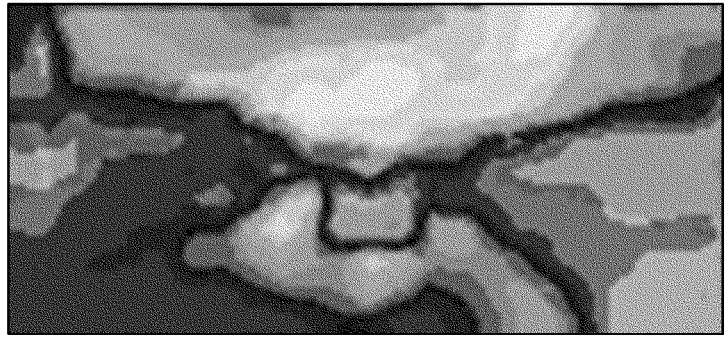
FIG. 24C illustrates an example of a heat map which shows levels of importance that have been estimated with use of a segmentation image.

FIG. 24 illustrates an example of estimating the levels of importance with use of the reference data which has been generated by applying the segmentation process to the frame. FIG. 24A illustrates a frame image which has not been preprocessed. FIG. 24B illustrates an example of an image obtained by the reference data generating section 721 applying the segmentation process to the image. FIG. 24C illustrates an example of a heat map which shows levels of importance that have been estimated by the estimating section 72 with use of the segmentation image generated. As illustrated in FIG. 24C, the heat map which shows high levels of importance with respect to a vehicle ahead, a sidewalk, a boundary between a road and the sidewalk, and the like is obtained.

The segmentation process is a process of dividing an image into coherent regions. The segmentation process includes, but is not particularly limited to, semantic segmentation in which a class label is predicted for each pixel, instance segmentation in which a class label is predicted for each object, and panoptic segmentation in which the semantic segmentation and the instance segmentation are combined.

(Depth Map)

Figure 25A:
FIG. 25A illustrates a frame image which has not been preprocessed.
Figure 25B:
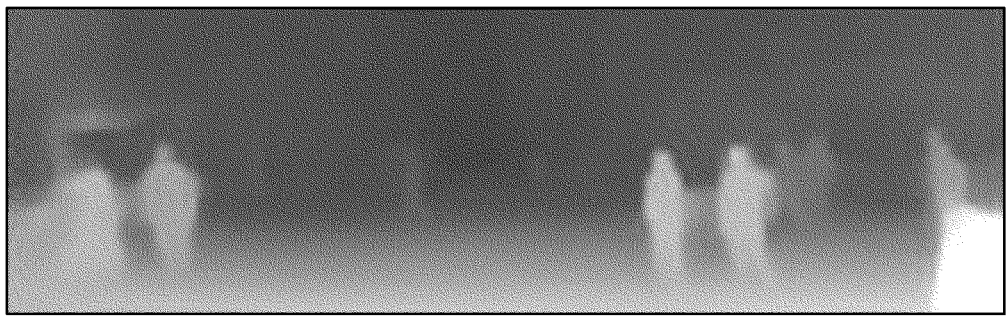
FIG. 25B illustrates an example of a depth map generated or obtained from the frame image which has not been preprocessed.
Figure 25C:
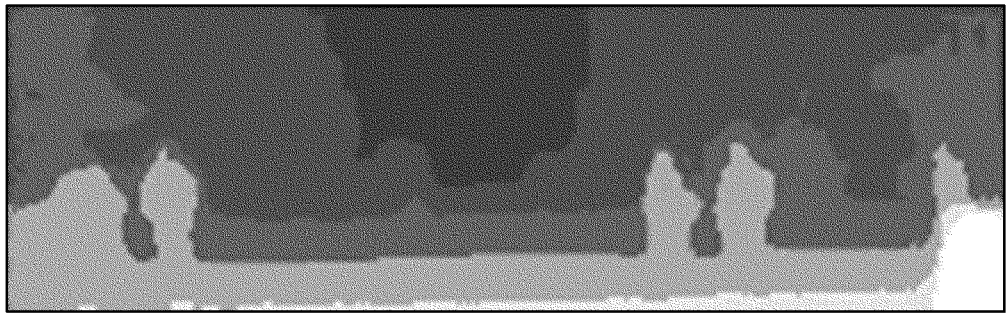
FIG. 25C illustrates an example of a heat map which shows levels of importance that have been estimated with use of a depth map.
Figure 26A:
FIG. 26A illustrates a frame image which has not been preprocessed.
Figure 26B:
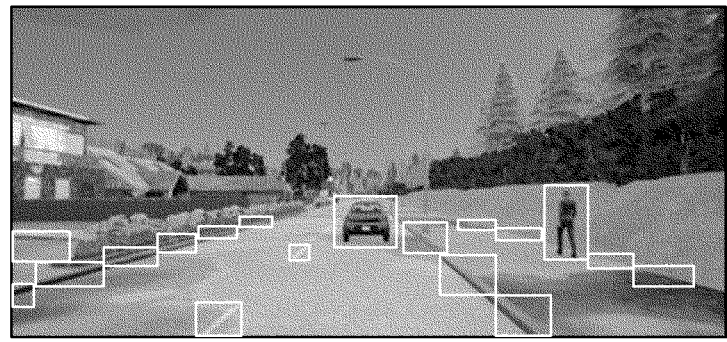
FIG. 26B illustrates an example of a result of carrying out a process of detecting an object from the frame image which has not been preprocessed.
Figure 26C:
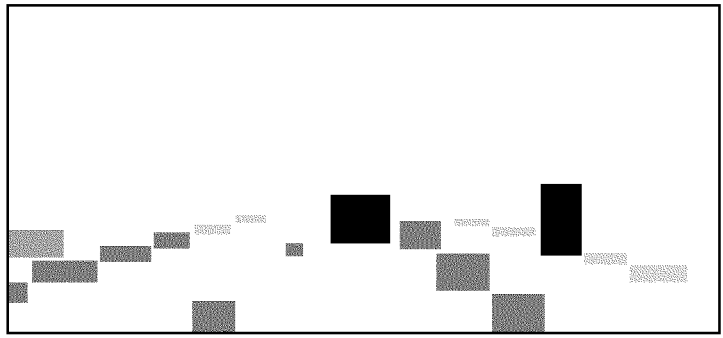
FIG. 26C illustrates an example of a drawing obtained by classifying, in accordance with levels of importance, merely bounding boxes obtained as an object detecting result.
Figure 26D:
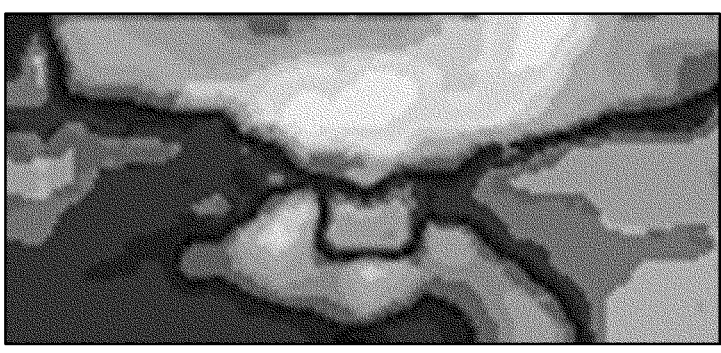
FIG. 26D illustrates a heat map which shows the levels of importance that have been estimated on the basis of arrangement of the bounding boxes that have been classified.

FIG. 25 illustrates an example of estimating the levels of importance with use of, as the reference data, the depth map corresponding to the frame. FIG. 25A illustrates a frame image which has not been preprocessed. FIG. 25B illustrates an example of a depth map generated by the reference data generating section 721 from the image. In the depth map illustrated in FIG. 25B, a closer region is represented by a lighter color. FIG. 25C illustrates an example of a heat map which shows levels of importance that have been estimated by the estimating section 72 with use of the depth map. In this example, the heat map is obtained in which the closer region or a region in which a human exists are estimated to be high in level of importance by the estimating section 72.

Note that, in the example illustrated in FIG. 25, described is an example in which the reference data generating section 721 generates the depth map from an RGB (Red, Green, Blue) image. However, a method of obtaining the depth map is not limited to this example, and the depth map may be obtained with use of a depth camera. For example, in a case where the image capturing section 41 is a stereo camera (depth camera), three-dimensional Lidar, or the like, the estimating section 72 may estimate the levels of importance with use of a depth image (depth data) obtained from the image capturing section 41 by the obtaining section 71. In this case, the reference data generating section 721 may not generate the reference data.

The information processing apparatus 6 may estimate the levels of importance with respect to the respective plurality of regions of the video data with use of the depth map (or depth data). That is, the information processing apparatus 6 includes the control section 70, and the control section 70 includes the obtaining section 71, the estimating section 72, the replacing section 73, the evaluating section 74, and the training section 75. The obtaining section 71 obtains the input data which includes at least one of image data and point cloud data. The estimating section 72 estimates, with use of the depth map, the levels of importance with respect to the respective plurality of regions which are included in the frame indicated by the input data. The replacing section 73 generates replaced data by replacing at least one of the plurality of regions, which are included in the input data, with the alternative data in accordance with the levels of importance. The evaluating section 74 derives an evaluation value by referring to the replaced data. The training section 75 trains the estimating section 72 with reference to the evaluation value.

Note that the information processing apparatus 6 may include the reference data generating section 721 which generates or obtains the depth map. The reference data generating section 721 generates or obtains, from the input data, the depth map as the reference data relating to the frame. The reference data generating section 721 may generate the depth map from the RGB image which is the input data, or may obtain the depth data from an apparatus which can measure a distance, such as a depth camera or three-dimensional Lidar. The reference data generating section 721 may be a part of the estimating section 72.

(Process of Detecting Object)

FIG. 26 illustrates an example of estimating the levels of importance with use of, as the reference data, the object detecting result obtained by applying, to the frame, the process of detecting an object. FIG. 26A illustrates a frame image which has not been preprocessed. FIG. 26B illustrates an example of a drawing which shows a result obtained by the reference data generating section 721 carrying out the process of detecting an object with respect to the image. As illustrated in FIG. 26B, objects which have been detected are enclosed by bounding boxes. Note that all of objects in the frame may not be detected. Next, the estimating section 72 classifies merely the bounding boxes obtained as the object detecting result, in accordance with the levels of importance, as illustrated in FIG. 26C. In an example illustrated in FIG. 26C, regions which are higher in level of importance are displayed as darker bounding boxes, and it can be seen that a car, a human, and the like are estimated to be more important. Furthermore, as illustrated in FIG. 26D, the estimating section 72 estimates the levels of importance with respect to the respective regions on the basis of arrangement of the bounding boxes which have been classified.

Note that the reference data generating section 721 may carry out the process of detecting an object. Alternatively, the obtaining section 71 may carry out the process of detecting an object. In this case, the information processing apparatus 6 may not include the reference data generating section 721.

Note that, in the above example, described is an example in which the reference data generating section 721 carries out any one of the segmentation process, the generation of the depth map, and the process of detecting an object. However, the reference data generating section 721 is not limited to this example, and may carry out two or more or all of the segmentation process, the generation of the depth map, the process of detecting an object, and the other processes. Then, the estimating section 72 may estimate the levels of importance with respect to the respective plurality of regions which are included in the frame, with reference to a plurality of types of the reference data generated or obtained by the reference data generating section 721. This also applies to example embodiments described below.

The estimating section 72 may estimate the levels of importance with respect to the respective plurality of regions which are included in the frame, with use of the input data which has not been preprocessed, in addition to one or more types of the reference data generated or obtained by the reference data generating section 721. This also applies to example embodiments described below.

(Simulation Evaluating Method S4A)

Next, a training method of training the estimating section 72 is described. As a training method of training the estimating section 72, the training method (information processing method) S3 described in the second example embodiment with reference to FIG. 9 can be used as an example. Specifically, the training method S3 is a method in which training is carried out with use of a simulated video that is used in an autonomous operation simulation so that a calculated reward becomes higher. Details of the training method S3 are as described in the second example embodiment. Thus, descriptions thereof are omitted here, and another example embodiment of the simulation evaluating method S4 in the step S32 of the information processing method S3 is described with reference to a drawing.

FIG. 27 illustrates an example of a flowchart illustrating a flow of a simulation evaluating method S4A in the training method of training the estimating section 72. The simulation evaluating method S4A in accordance with the present example embodiment is a method of carrying out evaluations with use of an autonomous operation simulator. As the autonomous operation simulator, open source CARLA can be, for example, used.

As illustrated in FIG. 27, the simulation evaluating method S4A includes the following steps. In a step S40, the control section 70 initializes data of the autonomous operation simulator.

Next, in a step S41, the control section 70 obtains input data from the autonomous operation simulator. Specifically, the obtaining section 71 obtains, as the input data, simulated video data from the autonomous operation simulator, and transmits the simulated video data to the estimating section 72.

Next, in a step S421, the control section 70 determines whether or not to generate or obtain, from the obtained input data, reference data relating to a frame. In a case where it is determined, in the step S421, that the reference data is to be generated or obtained (step S421: YES), the flow proceeds to a step S422, in which the reference data generating section 721 generates or obtains the reference data relating to the frame indicated by the input data. Next, in a step S423, the estimating section 72 estimates levels of importance with use of the reference data. Specifically, the estimating section 72 divides the reference data into a plurality of regions, and estimates the levels of importance with respect to the respective plurality of regions with use of a self-attention module. Thereafter, the flow proceeds to a step S43.

In a case where it is determined, in the step S421, that the reference data is not to be generated or obtained (step S421: NO), the flow proceeds to a step S424, in which the estimating section 72 estimates the levels of importance with respect to a respective plurality of regions included in the frame of the input data. Thereafter, the flow proceeds to the step S43.

In the step S421, a criterion on which it is determined whether or not to generate or obtain the reference data may be, but is not particularly limited to, the number of objects (segmentation target regions) included in the input data, as an example. That is, it is possible that, in a case where many small objects are included in an image, there are many combinations of the objects included in divided regions with respect to which levels of importance are estimated, and therefore training efficiency may decrease. In such a case, it is preferable to evaluate the levels of importance with use of reference data which has a reduced information volume. For example, in a case where the input data is a moving image from a vehicle traveling on a road in an urban area, it is predicted that the moving image has an information volume that is relatively large as compared with a moving image from a vehicle traveling in a suburban area. Thus, it may be determined that the reference data is to be generated or obtained. In contrast, in a case where the input data is a moving image from a vehicle traveling in a suburban area or on a road exclusive to vehicles, it is predicted that the moving image has a relatively small information volume. Thus, it may be determined that the reference data is not to be generated or obtained.

Next, in the step S43, the control section 70 replaces, with alternative data, a given proportion of one or more regions in ascending order of the levels of importance. Specifically, it is assumed that the given proportion is set to, for example, 40%. In this case, the replacing section 73 selects one or more regions in ascending order of the levels of importance. In a case where the total data size of the selected one or more regions (or the total image area of the selected one or more regions) reaches 40% or more of all the regions, the replacing section 73 stops the selection. Then, the replacing section 73 replaces all the selected one or more regions with the alternative data.

Next, in a step S44, the control section 70 inputs a replaced image into the autonomous operation controller, and obtains a control command outputted by the autonomous operation controller.

Next, in a step S45, the evaluating section 74 obtains a reward by inputting the control command into the autonomous operation simulator, and adds the reward to a cumulative value of rewards. Cumulation of rewards means, for example, adding a reward value in the n-th (n is an integer of 2 or more) simulation step to the sum of reward values in the first to the n−1-th simulation steps. That is, a cumulative value of reward values in up to the n-th simulation steps is calculated by adding the reward value in the n-th simulation step to the sum of the reward values in the first to the n−1-th simulation steps.

In a case where an operation result from the autonomous operation simulator into which the control command has been inputted indicates safe operation, a high reward value is given. In contrast, a low reward value is given in a case where the operation result from the autonomous operation simulator indicates operation of which safety is threatened. Whether or not the operation result indicates safe operation may be considered with a focus on the presence or absence of an accident.

Next, in a step S46, the control section 70 determines whether or not all simulation steps have been completed. That is, the control section 70 determines whether or not all simulated videos possessed by the autonomous operation simulator have been subjected to the above replacing process and inputted into the controller. In a case where it is determined in the step S46 that all the simulation steps have been completed or that an accident has occurred (step S46: YES), the flow proceeds to a step S47. In a case where it is determined in the step S46 that all the simulation steps have not been completed (step S46: NO), the flow returns to the step S41.

In the step S47, the control section 70 determines whether or not a given number of times of simulations have been completed. The given number of times is, for example, a number of times that is sufficient to calculate an average reward. In a case where it is determined in the step S47 that the given number of times of simulations have been completed (step S47: YES), the simulation evaluating step is ended, and the flow proceeds to the step S33 in FIG. 9. In a case where it is determined in the step S47 that the given number of times of simulations have not been completed (step S47: NO), the flow returns to the step S40. By repeating the simulation evaluations in this manner, it is possible to calculate the average reward.

(Simulation Evaluating Method S5A)

Instead of the simulation evaluating flow illustrated in FIG. 27, a simulation evaluating flow as follows may be used. That is, in the simulation evaluating method S4A described with reference to FIG. 27, the proportion of the one or more regions to be replaced with the alternative data is fixed to a given value. However, in a case where such a replacement proportion is fixed at a constant value, a trained method of estimating levels of importance may become extreme. Specifically, results of estimation of the levels of importance may be polarized. In this case, it is preferable to set a plurality of replacement proportions, carry out the simulation evaluations, and average results of the simulation evaluations. This method is described below.

FIG. 28 illustrates an example of a flowchart of a simulation evaluating method S5A. In the simulation evaluations, a plurality of replacement proportions are set in advance. For example, the replacement proportions are set in three patterns, i.e., 10%, 30%, and 40%. The number of times of simulations carried out with each of the replacement proportions is determined. For example, two times of simulations are carried out with a replacement proportion of 10%, two times of simulations are carried out with a replacement proportion of 30%, and two times of simulations are carried out with a replacement proportion of 40%. The replacing section 73 generates replaced data for each of the plurality of given proportions which differ from each other. Then, the evaluating section 74 derives a preliminary evaluation value with respect to each replaced data generated by the replacing section 73, and derives an evaluation value by averaging preliminary evaluation values. The preliminary evaluation value is an evaluation value which is obtained by carrying out an evaluation with a single replacement proportion.

Then, an average of the preliminary evaluation values derived with all the replacement proportions is used as a final evaluation value. Note that the expression "preliminary evaluation value" is introduced in order to clarify a distinction from the "evaluation value" which is finally derived. The word "preliminary" does not limit the present example embodiment.

Under the above assumption, steps S50 to S57 are the same as the steps S40 to S47, respectively, in the flowchart of FIG. 27. A difference is that, in a case where a determination of YES is made in the step S57, the flow proceeds to a step S58. In the step S58, the estimating section 72 determines whether or not all the simulations with the given proportions have been completed. In a case where it is determined in the step S58 that all the simulations have been completed (step S58: YES), the simulation evaluating step is ended, and the flow proceeds to the step S33 in FIG. 9. In a case where it is determined in the step S58 that all the simulations have not been completed (step S58: NO), the flow returns to the step S50. Then, a given proportion with which a simulation has not been completed is set, and the simulation step is repeated. By repeating the simulation evaluations in this manner, it is possible to calculate an average reward.

(Simulation Evaluating Method S10A)

In the fourth example embodiment, the example in which the evaluating section 34 of the information processing apparatus 5 derives an evaluation value further with reference to a data size of replaced data, and the training section 35 trains the estimating section 32 with use of an average reward and an average data size has been described with reference to FIGS. 16 and 17. In the present example embodiment, described is a modification of the simulation evaluating method in which the estimating section 72 including the reference data generating section 721 estimates levels of importance with use of reference data generated by the reference data generating section 721.

FIG. 29 illustrates an example of a flowchart illustrating a flow of a simulation evaluating method S10A. In the simulation evaluating method S10A, the evaluating section 74 derives an evaluation value further with reference to a data size of replaced data and the training section 75 trains the estimating section 72 so that the data size of the replaced data becomes small. Here, a case where simulation evaluations are carried out with use of an autonomous operation simulator is described.

First, in a step S101, the control section 70 initializes data of the autonomous operation simulator.

Next, in a step S102, the control section 70 obtains input data from the autonomous operation simulator. Specifically, the obtaining section 71 obtains, as the input data, simulated video data from the autonomous operation simulator, and transmits the simulated video data to the estimating section 72.

Next, in a step S1021, the control section 70 determines whether or not to generate or obtain, from the obtained input data, reference data relating to a frame. In a case where it is determined, in the step S1021, that the reference data is to be generated or obtained (step S1021: YES), the flow proceeds to a step S1022, in which the reference data generating section 721 generates or obtains the reference data relating to the frame indicated by the input data. Next, in a step S1023, the estimating section 72 estimates levels of importance with use of the reference data. Specifically, the estimating section 72 divides the reference data into a plurality of regions, and estimates the levels of importance with respect to the respective plurality of regions with use of a self-attention module. Thereafter, the flow proceeds to a step S104.

In a case where it is determined, in the step S1021, that the reference data is not to be generated or obtained (step S1021: NO), the flow proceeds to a step S1024, in which the estimating section 72 estimates the levels of importance with respect to a respective plurality of regions included in the frame of the input data. Thereafter, the flow proceeds to the step S104.

Next, in the step S104, the control section 70 replaces, with alternative data, a given proportion of one or more regions in ascending order of the levels of importance. Then, the control section 70 replaces all the selected one or more regions with the alternative data. Subsequently, the control section 70 encodes replaced image data.

Next, in a step S105, the control section 70 decodes the encoded data. That is, the control section 70 returns the encoded data to the replaced image data.

Next, in a step S106, the control section 70 inputs the decoded image data into an autonomous operation controller, and then obtains a control command.

Next, in a step S107, the control section 70 obtains a reward by inputting the control command into the autonomous operation simulator, and adds the reward to a cumulative value of rewards. Cumulation of rewards is as described in the first example embodiment.

Next, in a step S108, the control section 70 determines whether or not all simulation steps have been completed. That is, the control section 70 determines whether or not all simulated videos possessed by the autonomous operation simulator have been subjected to the above replacing process and inputted into the controller. In a case where it is determined in the step S108 that all the simulation steps have been completed or that an accident has occurred (step S108: YES), the flow proceeds to a step S109. In a case where it is determined in the step S108 that all the simulation steps have not been completed (step S108: NO), the flow returns to the step S102.

In the step S109, the control section 70 obtains a data size after encoding. Specifically, the evaluating section 74 obtains the data size of the replaced image data which has been encoded in the step S104.

In a step S110, the control section 70 determines whether or not a given number of times of simulations have been completed. The given number of times is, for example, a number of times that is sufficient to calculate an average reward and an average data size after encoding. In a case where it is determined in the step S110 that the given number of times of simulations have been completed (step S110: YES), the simulation evaluating step is ended, and the flow proceeds to the step S93 in FIG. 16. In a case where it is determined in the step S110 that the given number of times of simulations have not been completed (step S110: NO), the flow returns to the step S101. By repeating the simulation evaluations in this manner, it is possible to calculate the average reward.

(Loss Evaluating Method S7A)

In the third example embodiment, the training method in which loss evaluations are carried out with respect to training data by carrying out simulations has been described with reference to FIG. 13. Also in the loss evaluations in the step S62 of this training method, it is possible to estimate levels of importance with use of the above-described reference data.

Figure 30:
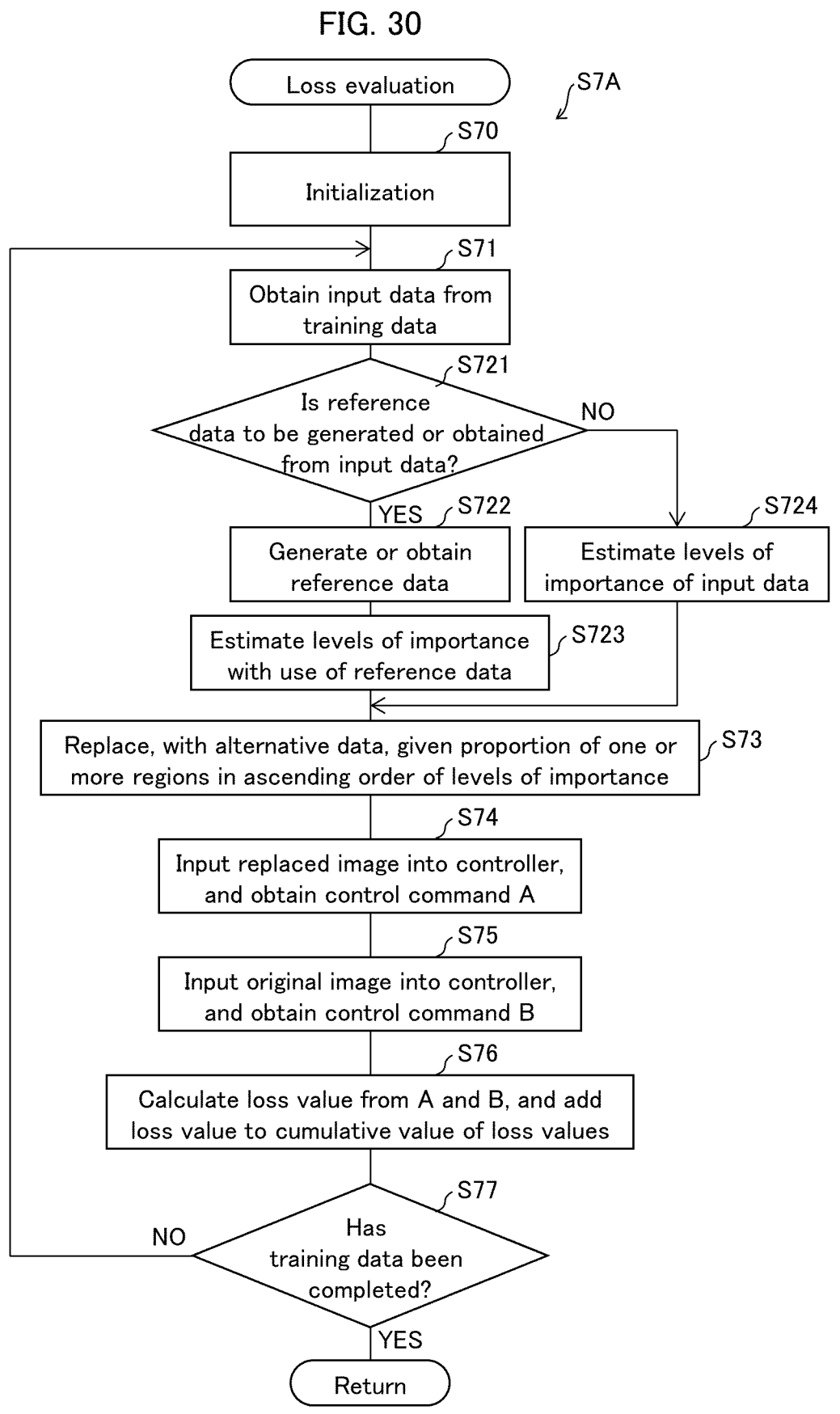
FIG. 30 illustrates an example of a flowchart illustrating a flow of a loss evaluating method S7A in a simulation.

FIG. 30 illustrates an example of a flowchart illustrating a flow of a loss evaluating method S7A in a simulation. The loss evaluations are carried out with use of an autonomous operation simulator.

First, in a step S70, the control section 70 initializes data of the autonomous operation simulator.

Next, in a step S71, the control section 70 obtains input data from training data. Specifically, as the input data, the estimating section 72 obtains, for example, frame data that has been selected from a simulated video which is of an in-vehicle camera and which is training data, via an obtaining section 71.

Next, in a step S721, the estimating section 72 determines whether or not to generate or obtain, from the obtained input data, reference data relating to a frame. In a case where it is determined, in the step S721, that the reference data is to be generated or obtained (step S721: YES), the flow proceeds to a step S722, in which the reference data generating section 721 generates or obtains the reference data relating to the frame indicated by the input data. Next, in a step S723, the estimating section 72 estimates levels of importance with use of the reference data. Specifically, the estimating section 72 divides the reference data into a plurality of regions, and estimates the levels of importance with respect to the respective plurality of regions with use of a self-attention module. Thereafter, the flow proceeds to a step S73.

In a case where it is determined, in the step S721, that the reference data is not to be generated or obtained (step S721: NO), the flow proceeds to a step S724, in which the estimating section 72 estimates the levels of importance with respect to a respective plurality of regions included in the frame of the input data. Thereafter, the flow proceeds to the step S73.

Next, in the step S73, the control section 70 replaces, with alternative data, a given proportion of one or more regions in ascending order of the levels of importance. Specifically, it is assumed that the given proportion is set to, for example, 40%. In this case, the replacing section 73 selects one or more regions in ascending order of the levels of importance. In a case where the total data size of the selected one or more regions (or the total image area of the selected one or more regions) reaches 40% or more of all the regions, the replacing section 73 stops the selection. Then, the replacing section 73 replaces all the selected one or more regions with the alternative data.

Next, in a step S74, the evaluating section 74 inputs a replaced image into an autonomous operation controller, and obtains a control command A outputted by the autonomous operation controller.

Next, in a step S75, the evaluating section 74 inputs an original image (image before replacement) into the autonomous operation controller, and obtains a control command B outputted by the autonomous operation controller.

Next, in a step S76, the evaluating section 74 calculates a loss value from the control command A and the control command B, and adds the loss value to a cumulative value of loss values. Cumulation of loss values means, for example, adding, to the sum of loss values obtained in a case where the first to the n−1-th (n is an integer of 2 or more) input data are used, a loss value obtained in a case where the n-th input data is used. That is, a cumulative value of loss values obtained in a case where up to the n-th input data are used is calculated by adding, to the sum of the loss values obtained in a case where the first to the n−1-th input data are used, the loss value obtained in a case where the n-th input data is used.

Next, in a step S77, the control section 70 determines whether or not all the training data has been completed. That is, the control section 70 determines whether or not all frame data selected from the simulated video have been subjected to the above replacing process and inputted into the controller. In a case where it is determined in the step S77 that all the training data has been completed (step S77: YES), the flow ends the loss evaluations, and proceeds to the step S63 in FIG. 13. In a case where it is determined in the step S77 that all the training data has not been completed (step S77: NO), the flow returns to the step S71. By repeating the loss evaluations in this manner, it is possible to calculate the cumulative value of the loss values.

(Loss Evaluating Method S8A)

In the loss evaluating method S7A, the proportion of the input data to be replaced with the alternative data is fixed to a given proportion. FIG. 31 illustrates an example of a detailed flowchart of a loss evaluating method S8A which is a modification of the simulation evaluating step. In the loss evaluations, a plurality of replacement proportions are set in advance. For example, the replacement proportions are set in three patterns, i.e., 10%, 30%, and 40%. Then, the number of times of simulations carried out with each of the replacement proportions is determined. For example, two times of simulations are carried out with a replacement proportion of 10%, two times of simulations are carried out with a replacement proportion of 30%, and two times of simulations are carried out with a replacement proportion of 40%. The replacing section 73 generates replaced data for each of the plurality of given proportions which differ from each other. Then, the evaluating section 74 derives a preliminary loss value with respect to each replaced data generated by the replacing section 73, and derives an evaluation value by averaging preliminary loss values. The preliminary loss value is a loss value which is obtained by carrying out an evaluation with a single replacement proportion. Then, an average of the preliminary loss values derived with all the replacement proportions is used as a final evaluation value.

Under the above assumption, steps S80 to S87 are the same as the steps S70 to S77, respectively, in the flowchart of FIG. 30. A difference is that, in a case where a determination of YES is made in the step S87, the flow proceeds to a step S88. In the step S88, the control section 70 determines whether or not all the simulations with the given proportions have been completed. In a case where it is determined in the step S88 that all the simulations have been completed (step S88: YES), the loss evaluating step is ended, and the flow proceeds to the step S63 in FIG. 13. In a case where it is determined in the step S88 that all the simulations have not been completed (step S88: NO), the flow returns to the step S80. Then, a given proportion with which a simulation has not been completed is set, and the simulation step is repeated. By repeating the loss evaluations in this manner, it is possible to calculate a cumulative value of loss values.

The evaluation methods S4A, S5A, S10A, S7A, and S8A each include a step in which the control section 70 determines whether or not to generate or obtain, from obtained input data, reference data relating to a frame. However, each of the methods does not necessarily need to include this step. For example, this step may be a step of generating or obtaining the reference data relating to the frame without carrying out determination. In this case, the step S424, the step S524, the step S1024, the step S724, and the step S824 are unnecessary. Whether or not to carry out the determination of whether or not to generate or obtain the reference data can be set in advance by a user.

Further, the reference data generated is not limited to a single type of the reference data, but a plurality types of the reference data may be generated, as described above. Further, the estimating section 72 is not limited to a case where merely the reference data or merely the input data is used, and may estimate the levels of importance with use of one or more types of the reference data and the input data.

According to the information processing system 500 and the training methods S4A, S5A, S10A, S7A, and S8A in accordance with the sixth example embodiment, the estimating section 72 can learn a method of estimating levels of importance with respect to a respective plurality of regions which are included in a frame indicated by input data, with use of reference data relating to the frame. The reference data is data obtained by preprocessing the input data so as to make it easier to estimate the levels of importance. Therefore, the information processing system 500 and the training methods S4A, S5A, S10A, S7A, and S8A bring about an effect that it is possible to suitably estimate an important region and a non-important region in an image even in a case where the input data is a video that is difficult to learn because, for example, the video has a large information volume.

Seventh Example Embodiment (Information Processing System 600)

Figures 32, 33:
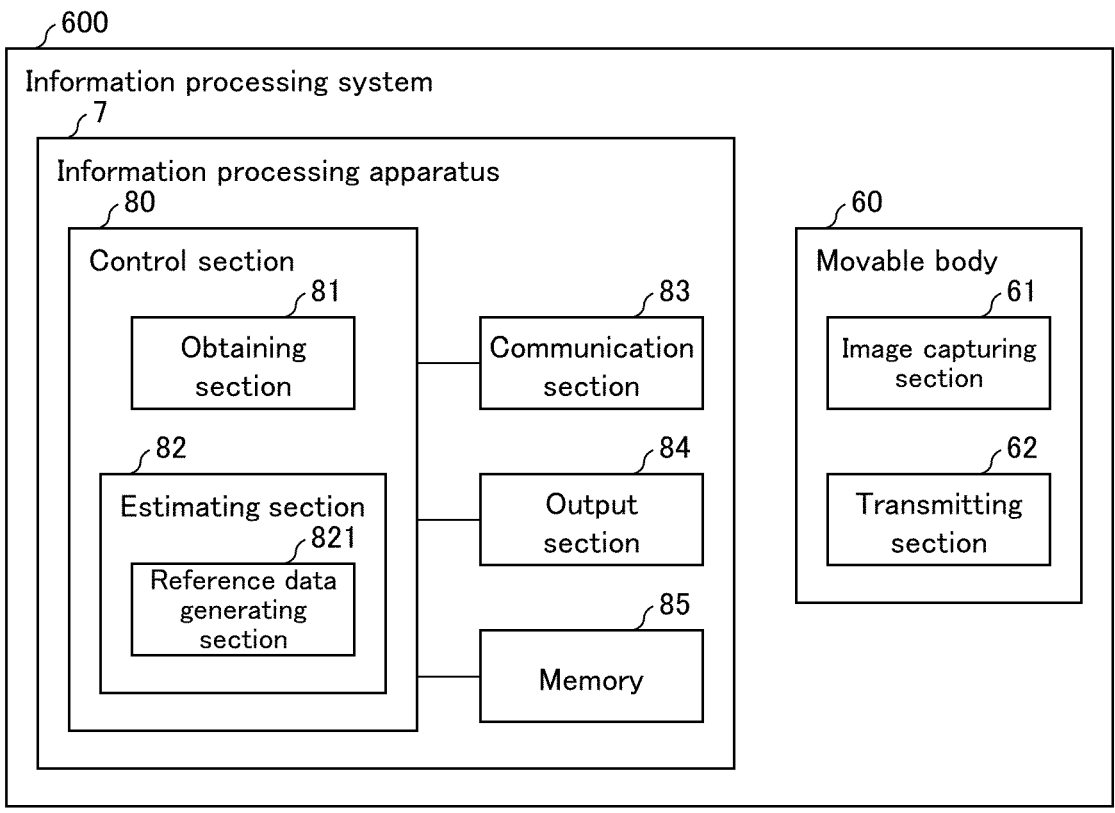
FIG. 32 is a block diagram illustrating a configuration of an information processing system 600 in accordance with a seventh example embodiment of the present invention.
FIG. 33 is a block diagram for realizing an information processing apparatus and an image processing apparatus by software.

The following description will discuss, in detail, a seventh example embodiment of the present invention with reference to drawings. FIG. 32 is a block diagram illustrating a configuration of an information processing system 600 in accordance with the seventh example embodiment. As illustrated in FIG. 32, the information processing system 600 includes an information processing apparatus 7 and a movable body 60. The information processing apparatus 7 is an apparatus which estimates levels of importance with respect to respective regions which are included in a frame indicated by input data. The information processing apparatus 7 includes a control section 80, a communication section 83, an output section 84, and a memory 85. The movable body 60 includes an image capturing section (video camera) 61 and a transmitting section 62. The communication section 83, the memory 85, the video camera 61, and the transmitting section 62 have functions similar to those of the communication section 36, the memory 38, the video camera 41, and the transmitting section 42, respectively, described in connection with the information processing system 300 of the second example embodiment, and therefore descriptions thereof are omitted.

The control section 80 includes an obtaining section 81 and an estimating section 82. The obtaining section 81 obtains a target image via the communication section 83. The estimating section 82 estimates levels of importance of respective regions of the image that has been obtained by the obtaining section 81. The estimating section 82 includes a reference data generating section 821. The reference data generating section 821 generates reference data relating to a frame indicated by video data (example of input data) which has been obtained by the obtaining section 81, with use of the video data. The reference data is data obtained by preprocessing the video data (input data) so as to make it easier for the estimating section 82 to estimate the levels of importance with respect to a respective plurality of regions of the video data. The estimating section 82 estimates the levels of importance with respect to the respective plurality of regions which are included in the frame indicated by the input data, with use of the reference data relating to the frame. As the estimating section 82, the estimating section 72 which has been trained by the information processing system 500 described above can be used.

The information processing apparatus 7 outputs, from the output section 84, importance level information which indicates the levels of importance that have been estimated by the estimating section 82. The importance level information is at least a part of data that is generated in the information processing apparatus 7, such as obtained image data, various parameters which are set on the estimating section 82, or information which relates to the levels of importance that have been estimated by the estimating section 82. An output from the output section 84 may be in a form of an image in which the levels of importance are shown in the respective plurality of regions included in the target image, or may be a set of combinations of (i) region specifying information which is for distinguishing the plurality of regions from each other and (ii) the levels of importance of the respective plurality of regions. The outputted data may be displayed on a display apparatus or the like or may be transmitted outside.

The reference data generated or obtained by the reference data generating section 821 includes, as an example, a segmentation image obtained by applying a segmentation process to the frame. The reference data also includes, as an example, a depth map corresponding to the frame. The reference data also includes, as an example, an object detecting result obtained by applying, to the frame, a process of detecting an object. Note, however, that the type of the reference data is not limited to these examples. For example, the reference data may be data which specifies a moving object or a direction of movement of the object from a plurality of frame images. Since it is highly possible that the moving object is a vehicle or a human, a level of importance of the moving object is considered high. The estimating section 82 may estimate the levels of importance with respect to the respective plurality of regions which are included in the frame, with use of at least one or all of the above types of the reference data. The segmentation process, the depth map, and the process of detecting an object are as described above in the sixth example embodiment.

(Information Processing Method S2A)

Next, an information processing method (estimation method) S2A carried out by the information processing apparatus 7 is described with reference to FIG. 4 with reference to which the information processing method (estimation method) S2 in accordance with the first embodiment has been described.

First, in a step S20, the obtaining section 81 obtains input data. Specifically, the obtaining section 81 obtains input data which includes at least one of image data and point cloud data.

Next, in a step S21, the estimating section 82 estimates levels of importance. Specifically, the reference data generating section 821 of the estimating section 82 generates or obtains reference data relating to a frame indicated by the input data (video data). The estimating section 82 then estimates the levels of importance with respect to a respective plurality of regions which are included in the frame indicated by the input data, with use of the reference data relating to the frame. Note that, as the estimating section 82, the estimating section 72 which has been caused to learn levels of importance with use of reference data by the information processing apparatus 6 described in the sixth example embodiment can be used.

(Effects of Information Processing System 600 and Information Processing Method S2A)

The information processing system 600 and the training method S2A in accordance with the seventh example embodiment each employ a configuration such that the estimating section 82 estimates levels of importance with respect to a respective plurality of regions which are included in a frame indicated by input data, with use of reference data relating to the frame. The reference data is data obtained by preprocessing the input data so as to make it easier to estimate the levels of importance. Therefore, the information processing system 600 and the training method S2A bring about an effect that it is possible to suitably estimate an important region and a non-important region in an image even in a case where the input data is a video in which it is difficult to estimate the levels of importance because, for example, the video has a large information volume.

[Software Implementation Example]

A part or all of the functions of each of the information processing apparatuses 1, 2, 3, 4, 5, 6, and 7 and the image processing apparatus 100*b* (hereinafter, referred to as "information processing apparatus 1 etc.") may be realized by hardware such as an integrated circuit (IC chip) or may be alternatively realized by software.

In the latter case, the information processing apparatus 1 etc. are each realized by, for example, a computer that executes instructions of a program that is software realizing the functions. FIG. 33 illustrates an example of such a computer (hereinafter, referred to as "computer C"). The computer C includes at least one processor C1 and at least one memory C2. In the memory C2, a program P for causing the computer C to operate as each of the information processing apparatus 1 etc. is recorded. In the computer C, the functions of each of the information processing apparatus 1 etc. are realized by the processor C1 reading the program P from the memory C2 and executing the program P.

The processor C1 can be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 can be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface via which the computer C transmits and receives data to and from another apparatus. The computer C may further include an input/output interface via which the computer C is connected to an input/output apparatus such as a keyboard, a mouse, a display, and a printer.

The program P can also be recorded in a non-transitory tangible recording medium M from which the computer C can read the program P. Such a recording medium M can be, for example, a tape, a disk, a card, a semiconductor memory, a programmable logic circuit, or the like. The computer C can acquire the program P via such a recording medium M. The program P can also be transmitted via a transmission medium. Such a transmission medium can be, for example, a communication network, a broadcast wave, or the like. The computer C can acquire the program P via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as follows. Note, however, that the present invention is not limited to the following example aspects.

An information processing apparatus in accordance with a first aspect includes: an obtaining means for obtaining input data which includes at least one of image data and point cloud data; an estimating means for estimating levels of importance with respect to a respective plurality of regions which are included in a frame indicated by the input data; a replacing means for generating replaced data by replacing at least one of the plurality of regions, which are included in the input data, with alternative data in accordance with the levels of importance; an evaluating means for deriving an evaluation value by referring to the replaced data; and a training means for training the estimating means with reference to the evaluation value.

According to the above configuration, it is possible to provide a technique which makes it possible to suitably estimate an important region and a non-important region in an image.

The information processing apparatus in accordance with a second aspect employs, in addition to the configuration of the first aspect, a configuration such that the evaluating means derives the evaluation value by further referring to the input data.

According to the above configuration, it is possible to train estimation of an important region and a non-important region with reference to not only the replaced data but also the input data.

The information processing apparatus in accordance with a third aspect employs, in addition to the configuration of the second aspect, a configuration such that the evaluating means derives the evaluation value by referring to an output obtained from a given controller in a case where the input data is inputted into the given controller and an output obtained from the given controller in a case where the replaced data is inputted into the given controller.

According to the above configuration, it is possible to train estimation of an important region and a non-important region with reference to the outputs from the given controller.

The information processing apparatus in accordance with a fourth aspect employs, in addition to the configuration of the third aspect, a configuration such that: the evaluating means derives the evaluation value as a difference between (i) the output obtained from the given controller in the case where the input data is inputted into the given controller and (ii) the output obtained from the given controller in the case where the replaced data is inputted into the given controller; and the training means trains the estimating means so that the evaluation value becomes low.

According to the above configuration, it is possible to train estimation of an important region and a non-important region on the basis of the difference between the outputs from the given controller.

The information processing apparatus in accordance with a fifth aspect employs, in addition to the configuration of any one of the first through fourth aspects, a configuration such that the replacing means replaces, with the alternative data, one or more of the plurality of regions which one or more have been selected in ascending order of the levels of importance and have a given proportion in the frame.

According to the above configuration, it is possible to train estimation of an important region and a non-important region with use of data of which a given proportion has been replaced.

The information processing apparatus in accordance with a sixth aspect employs, in addition to the configuration of the fifth aspect, a configuration such that: the replacing means generates the replaced data for each of a plurality of given proportions which differ from each other; and the evaluating means derives a preliminary evaluation value with respect to each replaced data generated by the replacing means, and derives the evaluation value by averaging preliminary evaluation values.

According to the above configuration, it is possible to train estimation of an important region and a non-important region with use of data of which a plurality of given proportions have been each replaced.

The information processing apparatus in accordance with a seventh aspect employs, in addition the configuration of any one of the first through sixth aspects, a configuration such that the evaluating means derives the evaluation value further with reference to a data size of the replaced data.

According to the above configuration, it is possible to train estimation of an important region and a non-important region in consideration of the data size.

The information processing apparatus in accordance with an eighth aspect employs, in addition to the configuration of the seventh aspect, a configuration such that the training means trains the estimating means so that the data size of the replaced data becomes small.

According to the above configuration, it is possible to train estimation of an important region and a non-important region so that the data size becomes small.

The information processing apparatus in accordance with a ninth aspect employs, in addition to the configuration of any one of the first through eighth aspects, a configuration such that the alternative data used by the replacing means is data which includes at least one of noise and image data that has a large quantization error.

According to the above configuration, it is possible to train estimation of an important region and a non-important region so that the data size becomes small.

The information processing apparatus in accordance with a tenth aspect employs, in addition to the configuration of any one of the first through ninth aspects, a configuration such that the estimating means estimates the levels of importance with respect to the respective plurality of regions which are included in the frame indicated by the input data, with use of reference data relating to the frame.

According to the above configuration, it is possible to suitably estimate an important region and a non-important region in an image even in a case where the input data is a video that is difficult to learn because, for example, the video has a large information volume.

The information processing apparatus in accordance with an eleventh aspect employs, in the tenth aspect, a configuration such that the reference data includes a segmentation image which is obtained by applying a segmentation process to the frame.

According to the above configuration, it is possible to bring about an effect similar to that brought about by the configuration of the tenth aspect.

The information processing apparatus in accordance with a twelfth aspect employs, in the tenth or eleventh aspect, a configuration such that the reference data includes a depth map which corresponds to the frame.

According to the above configuration, it is possible to bring about an effect similar to that brought about by the configuration of the tenth aspect.

The information processing apparatus in accordance with a thirteenth aspect employs, in any one of the tenth through twelfth aspects, a configuration such that the reference data includes an object detecting result which is obtained by applying, to the frame, a process of detecting an object.

According to the above configuration, it is possible to bring about an effect similar to that brought about by the configuration of the tenth aspect.

The information processing apparatus in accordance with a fourteenth aspect employs, in addition to the configuration of any one of the first through thirteenth aspects, a configuration such that the estimating means estimates the levels of importance with use of a self-attention module.

According to the above configuration, it is possible to train estimation of an important region and a non-important region with use of the self-attention module.

The information processing apparatus in accordance with a fifteenth aspect employs, in addition to the configuration of any one of the first through fourteenth aspects, a configuration such that the evaluating means derives the evaluation value with reference to an output obtained from a controller of a movable body into which the replaced data has been inputted.

According to the above configuration, it is possible to train estimation of an important region and a non-important region with use of the controller of the movable body.

The information processing apparatus in accordance with a sixteenth aspect employs, in addition to the configuration of the fifteenth aspect, a configuration such that: the evaluation value includes a reward value derived from the output; and the training means trains the estimating means so that the reward value becomes high.

According to the above configuration, it is possible to train the estimating means so that the reward value derived from a value outputted from the controller becomes high.

The information processing apparatus in accordance with a seventeenth aspect employs, in addition to the configuration of the sixteenth aspect, a configuration such that: the evaluation value is a loss value derived from the output; and the training means trains the estimating means so that the loss value becomes low.

According to the above configuration, it is possible to train the estimating means with use of the loss value.

An information processing apparatus in accordance with a eighteenth aspect includes: an obtaining means for obtaining input data which includes at least one of image data and point cloud data; and an estimating means for estimating levels of importance with respect to a respective plurality of regions which are included in a frame indicated by the input data, the estimating means having been trained with reference to replaced data that has been obtained by replacing at least one of the plurality of regions, which are included in the input data, with alternative data in accordance with the levels of importance.

According to the above configuration, it is possible to provide a technique which makes it possible to suitably estimate an important region and a non-important region in an image.

The information processing apparatus in accordance with a nineteenth aspect employs, in addition to the configuration of the eighteenth aspect, a configuration such that the estimating means estimates the levels of importance with respect to the respective plurality of regions which are included in the frame indicated by the input data, with use of reference data relating to the frame.

According to the above configuration, it is possible to suitably estimate an important region and a non-important region in an image even in a case where the input data is a video in which it is difficult to estimate the levels of importance because, for example, the video has a large information volume.

The information processing apparatus in accordance with a twentieth aspect employs, in the nineteenth aspect, a configuration such that the reference data includes a segmentation image which is obtained by applying a segmentation process to the frame.

According to the above configuration, it is possible to bring about an effect similar to that brought about by the configuration of the eighteenth aspect.

The information processing apparatus in accordance with a twenty-first aspect employs, in the nineteenth or twentieth aspect, a configuration such that the reference data includes a depth map which corresponds to the frame.

According to the above configuration, it is possible to bring about an effect similar to that brought about by the configuration of the eighteenth aspect.

The information processing apparatus in accordance with a twenty-second aspect employs, in any one of the nineteenth through twenty-first aspects, a configuration such that the reference data includes an object detecting result which is obtained by applying, to the frame, a process of detecting an object.

According to the above configuration, it is possible to bring about an effect similar to that brought about by the configuration of the eighteenth aspect.

An information processing method in accordance with a twenty-third aspect includes: obtaining input data which includes at least one of image data and point cloud data; estimating levels of importance with respect to a respective plurality of regions which are included in a frame indicated by the input data; generating replaced data by replacing at least one of the plurality of regions, which are included in the input data, with alternative data in accordance with the levels of importance; deriving an evaluation value by referring to the replaced data; and training an estimating means with reference to the evaluation value.

According to the above configuration, it is possible to provide a technique which makes it possible to suitably estimate an important region and a non-important region in an image.

An information processing method in accordance with a twenty-fourth aspect includes: obtaining input data which includes at least one of image data and point cloud data; and estimating levels of importance with respect to a respective plurality of regions which are included in a frame indicated by the input data, the levels of importance being estimated with use of an estimating means which has been trained with reference to replaced data that has been obtained by replacing at least one of the plurality of regions, which are included in the input data, with alternative data in accordance with the levels of importance.

According to the above configuration, it is possible to provide a technique which makes it possible to suitably estimate an important region and a non-important region in an image.

A recording medium in accordance with a twenty-fifth aspect is a computer-readable non-transitory recording medium in which a program is recorded, the program being for causing a computer to function as: an obtaining means for obtaining input data which includes at least one of image data and point cloud data; an estimating means for estimating levels of importance with respect to a respective plurality of regions which are included in a frame indicated by the input data; a replacing means for generating replaced data by replacing at least one of the plurality of regions, which are included in the input data, with alternative data in accordance with the levels of importance; an evaluating means for deriving an evaluation value by referring to the replaced data; and a training means for training the estimating means with reference to the evaluation value.

According to the above configuration, it is possible to provide a technique which makes it possible to suitably estimate an important region and a non-important region in an image.

A recording medium in accordance with a twenty-sixth aspect is a computer-readable non-transitory recording medium in which a program is recorded, the program being for causing a computer to function as: an obtaining means for obtaining input data which includes at least one of image data and point cloud data; and an estimating means for estimating levels of importance with respect to a respective plurality of regions which are included in a frame indicated by the input data, the estimating means estimating the levels of importance with use of an estimating means which has been trained with reference to replaced data that has been obtained by replacing at least one of the plurality of regions, which are included in the input data, with alternative data in accordance with the levels of importance.

According to the above configuration, it is possible to provide a technique which makes it possible to suitably estimate an important region and a non-important region in an image.

A program in accordance with a twenty-seventh aspect is a program for causing a computer to function as: an obtaining means for obtaining input data which includes at least one of image data and point cloud data; an estimating means for estimating levels of importance with respect to a respective plurality of regions which are included in a frame indicated by the input data; a replacing means for generating replaced data by replacing at least one of the plurality of regions, which are included in the input data, with alternative data in accordance with the levels of importance; an evaluating means for deriving an evaluation value by referring to the replaced data; and a training means for training the estimating means with reference to the evaluation value.

According to the above configuration, it is possible to provide a technique which makes it possible to suitably estimate an important region and a non-important region in an image.

A program in accordance with a twenty-eighth aspect is a program for causing a computer to function as: an obtaining means for obtaining input data which includes at least one of image data and point cloud data; and an estimating means for estimating levels of importance with respect to a respective plurality of regions which are included in a frame indicated by the input data, the estimating means estimating the levels of importance with use of an estimating means which has been trained with reference to replaced data that has been obtained by replacing at least one of the plurality of regions, which are included in the input data, with alternative data in accordance with the levels of importance.

According to the above configuration, it is possible to provide a technique which makes it possible to suitably estimate an important region and a non-important region in an image.

An information processing apparatus in accordance with a twenty-ninth aspect includes: an obtaining means for obtaining input data which includes at least one of image data and point cloud data; a reference data generating means for generating or obtaining, from the input data, a depth map as reference data relating to a frame; an estimating means for estimating levels of importance with respect to a respective plurality of regions which are included in the frame indicated by the input data, with use of the reference data; a replacing means for generating replaced data by replacing at least one of the plurality of regions, which are included in the input data, with alternative data in accordance with the levels of importance; an evaluating means for deriving an evaluation value by referring to the replaced data; and a training means for training the estimating means with reference to the evaluation value.

According to the above configuration, it is possible to suitably estimate an important region and a non-important region in an image even in a case where the input data is a video in which it is difficult to estimate the levels of importance because, for example, the video has a large information volume.

Additional Remark 3

The whole or part of the example embodiments disclosed above can also be expressed as follows.

An information processing apparatus including at least one processor, the at least one processor carrying out: an obtaining process of obtaining input data which includes at least one of image data and point cloud data; an estimating process of estimating levels of importance with respect to a respective plurality of regions which are included in a frame indicated by the input data; a generating process of generating replaced data by replacing at least one of the plurality of regions, which are included in the input data, with alternative data in accordance with the levels of importance; a deriving process of deriving an evaluation value by referring to the replaced data; and a training process of training an estimating means with reference to the evaluation value.

Note that this information processing apparatus may further include a memory, and, in this memory, a program may be stored which is for causing the at least one processor to carry out the obtaining process, the estimating process, the generating process, the deriving process, and the training process. Alternatively, this program may be recorded in a computer-readable non-transitory tangible recording medium.

REFERENCE SIGNS LIST

1, 2, 3, 4, 5, 6, 7 Information processing apparatus
10, 20, 31, 51, 71, 81 Obtaining section
11, 21, 32, 52, 72, 82 Estimating section
12, 33, 73 Replacing section
13, 34, 74 Evaluating section
14, 35, 75 Training section
30, 50, 70, 80 Control section
36, 53, 76, 83 Communication section
37, 54, 77, 84 Output section
38, 55, 78, 85 Memory
41, 61 Image capturing section

42, 62 Transmitting section
300, 400, 500, 600 Information processing system
721, 821 Reference data generating section

What is claimed is:

1. An information processing apparatus comprising at least one processor, the at least one processor carrying out:

an obtaining process of obtaining input data which includes at least one of image data and point cloud data;

an estimating process of estimating, with use of an estimation model, levels of importance with respect to a respective plurality of regions which are included in a frame indicated by the input data;

a replacing process of generating replaced data by replacing at least one of the plurality of regions, which are included in the input data, with alternative data in accordance with the levels of importance, wherein the alternative data has a data size smaller than a data size of the input data for the at least one of the plurality of regions;

an evaluating process of deriving an evaluation value by referring to the replaced data; and a training process of training the estimation model with reference to the evaluation value, wherein in the evaluating process, the at least one processor derives the evaluation value by referring to an output obtained from a given controller in a case where the input data is inputted into the given controller and an output obtained from the given controller in a case where the replaced data is inputted into the given controller, wherein the given controller is an autonomous operation controller of a movable body, and the output is a control command for the movable body.

2. The information processing apparatus as set forth in claim 1, wherein in the evaluating process, the at least one processor derives the evaluation value by further referring to the input data.

3. The information processing apparatus as set forth in claim 1, wherein:

in the evaluating process, the at least one processor derives the evaluation value as a difference between (i) the output obtained from the given controller in the case where the input data is inputted into the given controller and (ii) the output obtained from the given controller in the case where the replaced data is inputted into the given controller; and in the training process, the at least one processor trains the estimation model so that the evaluation value becomes low.

4. The information processing apparatus as set forth in claim 1, wherein in the replacing process, the at least one processor replaces, with the alternative data, one or more of the plurality of regions which one or more have been selected in ascending order of the levels of importance and have a given proportion in the frame.

5. The information processing apparatus as set forth in claim 4, wherein:

in the replacing process, the at least one processor generates the replaced data for each of a plurality of given proportions which differ from each other; and in the evaluating process, the at least one processor derives a preliminary evaluation value with respect to each replaced data generated in the replacing, and derives the evaluation value by averaging preliminary evaluation values.

6. The information processing apparatus as set forth in claim 1, wherein in the evaluating process, the at least one processor derives the evaluation value further with reference to a data size of the replaced data.

7. The information processing apparatus as set forth in claim 6, wherein in the training process, the at least one processor trains the estimation model so that the data size of the replaced data becomes small.

8. The information processing apparatus as set forth in claim 1, wherein the alternative data used in the replacing process is data which includes at least one of noise and image data that has a large quantization error than that in the input data.

9. The information processing apparatus as set forth in claim 1, wherein in the estimating process, the at least one processor estimates the levels of importance with respect to the respective plurality of regions which are included in the frame indicated by the input data, with use of reference data relating to the frame.

10. The information processing apparatus as set forth in claim 9, wherein the reference data includes a segmentation image which is obtained by applying a segmentation process to the frame.

11. The information processing apparatus as set forth in claim 9, wherein the reference data includes a depth map which corresponds to the frame.

12. The information processing apparatus as set forth in claim 9, wherein the reference data includes an object detecting result which is obtained by applying, to the frame, a process of detecting an object.

13. The information processing apparatus as set forth in claim 1, wherein in the estimating process, the at least one processor estimates the levels of importance with use of a self-attention module.

14. The information processing apparatus as set forth in claim 1, wherein:

the evaluation value includes a reward value derived from the output; and in the training process, the at least one processor trains the estimation model so that the reward value becomes high.

15. The information processing apparatus as set forth in claim 1, wherein:

the evaluation value is a loss value derived from the output; and in the training process, the at least one processor trains the estimation model so that the loss value becomes low.

16. An information processing method comprising:

obtaining input data which includes at least one of image data and point cloud data;

estimating, with use of an estimation model, levels of importance with respect to a respective plurality of regions which are included in a frame indicated by the input data;

generating replaced data by replacing at least one of the plurality of regions, which are included in the input data, with alternative data in accordance with the levels of importance, wherein the alternative data has a data size smaller than a data size of the input data for the at least one of the plurality of regions;

deriving an evaluation value by referring to the replaced data; and training the estimation model with reference to the evaluation value, wherein the evaluation value is derived by referring to an output obtained from a given controller in a case where the input data is inputted into the given controller and an output obtained from the given controller in a case where the replaced data is inputted into the given controller, wherein the given controller is an autonomous operation controller of a movable body, and the output is a control command for the movable body.

17. A computer-readable non-transitory recording medium in which a program is recorded, the program being for causing a computer to carry out:

an obtaining process of obtaining input data which includes at least one of image data and point cloud data;

an estimating process of estimating, with use of an estimation model, levels of importance with respect to a respective plurality of regions which are included in a frame indicated by the input data;

a replacing process of generating replaced data by replacing at least one of the plurality of regions, which are included in the input data, with alternative data in accordance with the levels of importance, wherein the alternative data has a data size smaller than a data size of the input data for the at least one of the plurality of regions;

an evaluating process of deriving an evaluation value by referring to the replaced data; and a training process of training the estimation model with reference to the evaluation value, wherein in the evaluating process, the computer derives the evaluation value by referring to an output obtained from a given controller in a case where the input data is inputted into the given controller and an output obtained from the given controller in a case where the replaced data is inputted into the given controller, wherein the given controller is an autonomous operation controller of a movable body, and the output is a control command for the movable body.

* * * * *